US010152321B2

(12) United States Patent
Ould-Ahmed-Vall et al.

(10) Patent No.: US 10,152,321 B2
(45) Date of Patent: Dec. 11, 2018

(54) INSTRUCTIONS AND LOGIC FOR BLEND AND PERMUTE OPERATION SEQUENCES

(71) Applicant: Intel Corporation, Santa Clara, CA (US)

(72) Inventors: Elmoustapha Ould-Ahmed-Vall, Chandler, AZ (US); Suleyman Sair, Chandler, AZ (US); Joonmoo Huh, Chandler, AZ (US)

(73) Assignee: Intel Corporation, Santa Clara, CA (US)

(*) Notice: Subject to any disclaimer, the term of this patent is extended or adjusted under 35 U.S.C. 154(b) by 325 days.

(21) Appl. No.: 14/974,729

(22) Filed: Dec. 18, 2015

(65) Prior Publication Data

US 2017/0177344 A1 Jun. 22, 2017

(51) Int. Cl.
*G06F 9/30* (2018.01)

(52) U.S. Cl.
CPC ........ *G06F 9/30029* (2013.01); *G06F 9/3016* (2013.01); *G06F 9/30036* (2013.01); *G06F 9/30101* (2013.01)

(58) Field of Classification Search
CPC . G06F 9/30036; G06F 9/30101; G06F 9/3016
See application file for complete search history.

(56) References Cited

U.S. PATENT DOCUMENTS 8,432,409 B1 * 4/2013 Dunlap .................. G09G 5/393 345/537
2004/0181646 A1 9/2004 Ben-David et al.
2004/0186980 A1 9/2004 Ansari
2009/0172364 A1 7/2009 Sprangle et al.
2009/0249026 A1 10/2009 Smelyanskiy et al.
(Continued)

FOREIGN PATENT DOCUMENTS

WO 2017105719 A1 6/2017

OTHER PUBLICATIONS

Intel Corporation, IA-32 Intel® Architecture Software Developer's Manual—vol. 2: Instruction Set Reference, 978 pages, 2003.
(Continued)

*Primary Examiner* — Aimee Li
*Assistant Examiner* — William V Nguyen
(74) *Attorney, Agent, or Firm* — Alliance IP, LLC

(57) ABSTRACT

A processor includes a core to execute an instruction and logic to determine that the instruction will require strided data converted from source data in memory. The strided data is to include corresponding indexed elements from structures in the source data to be loaded into a same register to be used to execute the instruction. The core also includes logic to load source data into preliminary vector registers. The source data is to be unaligned as resident in the vector registers. The core includes logic to apply blend instructions to contents of the preliminary vector registers to cause corresponding indexed elements from the plurality of structures to be loaded into respective interim vector registers, and to apply further blend instructions to contents of the interim vector registers to cause additional indexed elements from the structures to be loaded into respective source vector registers.

20 Claims, 33 Drawing Sheets

(56) References Cited

U.S. PATENT DOCUMENTS

| | | | | |
|---|---|---|---|---|
| 2012/0254591 | A1* | 10/2012 | Hughes | G06F 9/30018 712/205 |
| 2014/0181464 | A1* | 6/2014 | Forsyth | G06F 9/30018 711/214 |
| 2015/0052333 | A1 | 2/2015 | Hughes et al. | |
| 2017/0031865 | A1* | 2/2017 | Eyole | G06F 15/8076 |

OTHER PUBLICATIONS

International Search Report and Written Opinion for PCT Patent Application No. PCT/US2016/061965, dated Feb. 22, 2017; 10 pages, dated Feb. 22, 2017.

* cited by examiner 127 112 111 96 95 80 79 64 63 48 47 32 31 16 15 0

Figure 3B:
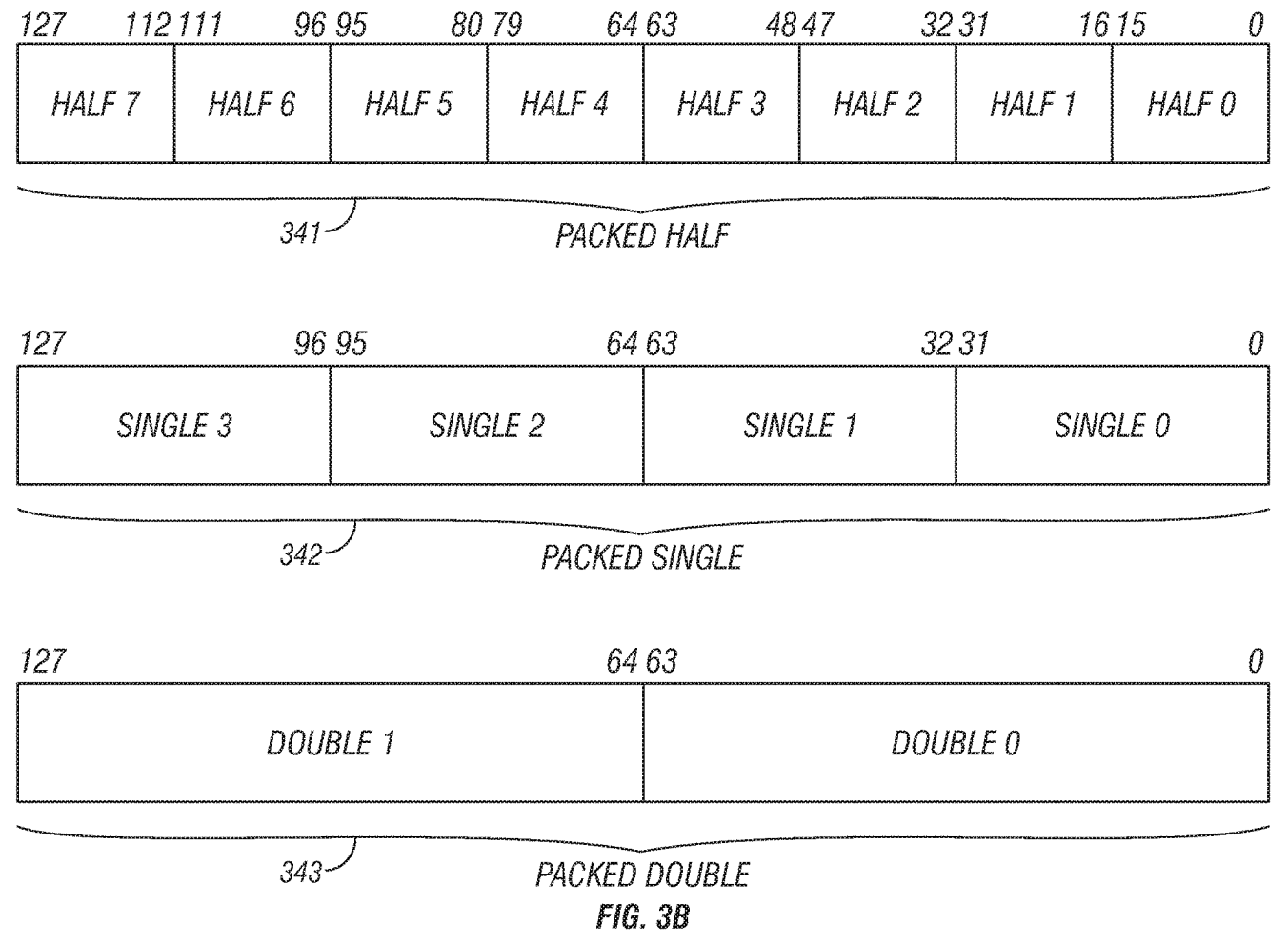

HALF 7 | HALF 6 | HALF 5 | HALF 4 | HALF 3 | HALF 2 | HALF 1 | HALF 0

PACKED HALF

341

127 96 95 64 63 32 31 0

SINGLE 3 | SINGLE 2 | SINGLE 1 | SINGLE 0

PACKED SINGLE

342

127 64 63 0

DOUBLE 1 | DOUBLE 0

PACKED DOUBLE

Figure 3C:
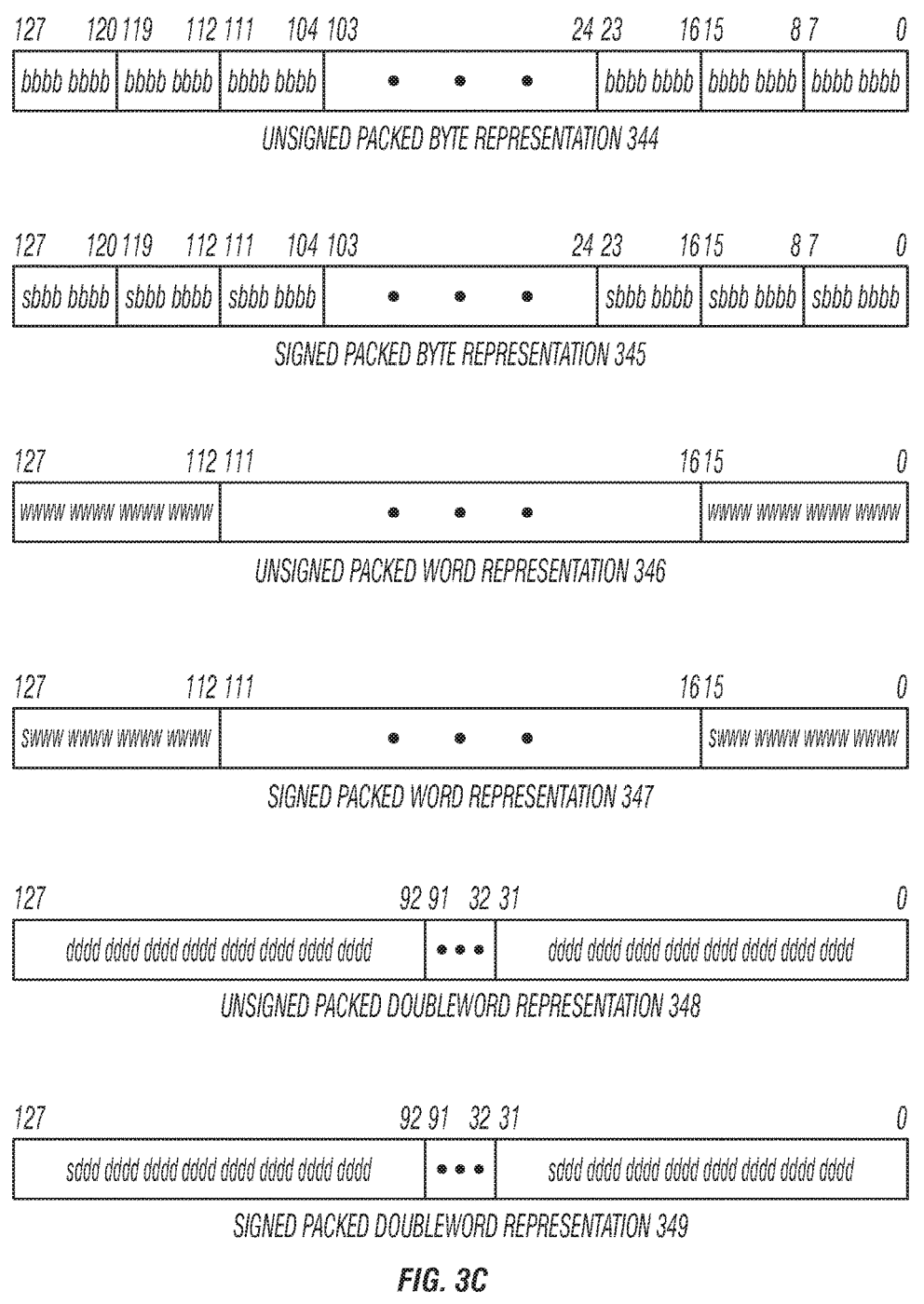

| bbbb bbbb | bbbb bbbb | bbbb bbbb | • • • | bbbb bbbb | bbbb bbbb | bbbb bbbb |
|---|---|---|---|---|---|---|

UNSIGNED PACKED BYTE REPRESENTATION 344

127 120 119 112 111 104 103 24 23 16 15 8 7 0

| sbbb bbbb | sbbb bbbb | sbbb bbbb | • • • | sbbb bbbb | sbbb bbbb | sbbb bbbb |
|---|---|---|---|---|---|---|

SIGNED PACKED BYTE REPRESENTATION 345

127 112 111 16 15 0

| wwww wwww wwww wwww | • • • | wwww wwww wwww wwww |
|---|---|---|

UNSIGNED PACKED WORD REPRESENTATION 346

127 112 111 16 15 0

| swww wwww wwww wwww | • • • | swww wwww wwww wwww |
|---|---|---|

SIGNED PACKED WORD REPRESENTATION 347

127 92 91 32 31 0

| dddd dddd dddd dddd dddd dddd dddd dddd | • • • | dddd dddd dddd dddd dddd dddd dddd dddd |
|---|---|---|

UNSIGNED PACKED DOUBLEWORD REPRESENTATION 348

127 92 91 32 31 0

| sddd dddd dddd dddd dddd dddd dddd dddd | • • • | sddd dddd dddd dddd dddd dddd dddd dddd |
|---|---|---|

SIGNED PACKED DOUBLEWORD REPRESENTATION 349

| 511 — 256 | 255 — 128 | 127 — 0 |
|---|---|---|
| ZMM0 | YMM0 | XMM0 |
| ZMM1 | YMM1 | XMM1 |
| ZMM2 | YMM2 | XMM2 |
| ZMM3 | YMM3 | XMM3 |
| ZMM4 | YMM4 | XMM4 |
| ZMM5 | YMM5 | XMM5 |
| ZMM6 | YMM6 | XMM6 |
| ZMM7 | YMM7 | XMM7 |
| ZMM8 | YMM8 | XMM8 |
| ZMM9 | YMM9 | XMM9 |
| ZMM10 | YMM10 | XMM10 |
| ZMM11 | YMM11 | XMM11 |
| ZMM12 | YMM12 | XMM12 |
| ZMM13 | YMM13 | XMM13 |
| ZMM14 | YMM14 | XMM14 |
| ZMM15 | YMM15 | XMM15 |
| ZMM16 | YMM16 | XMM16 |
| ZMM17 | YMM17 | XMM17 |
| ZMM18 | YMM18 | XMM18 |
| ZMM19 | YMM19 | XMM19 |
| ZMM20 | YMM20 | XMM20 |
| ZMM21 | YMM21 | XMM21 |
| ZMM22 | YMM22 | XMM22 |
| ZMM23 | YMM23 | XMM23 |
| ZMM24 | YMM24 | XMM24 |
| ZMM25 | YMM25 | XMM25 |
| ZMM26 | YMM26 | XMM26 |
| ZMM27 | YMM27 | XMM27 |
| ZMM28 | YMM28 | XMM28 |
| ZMM29 | YMM29 | XMM29 |
| ZMM30 | YMM30 | XMM30 |
| ZMM31 | YMM31 | XMM31 |

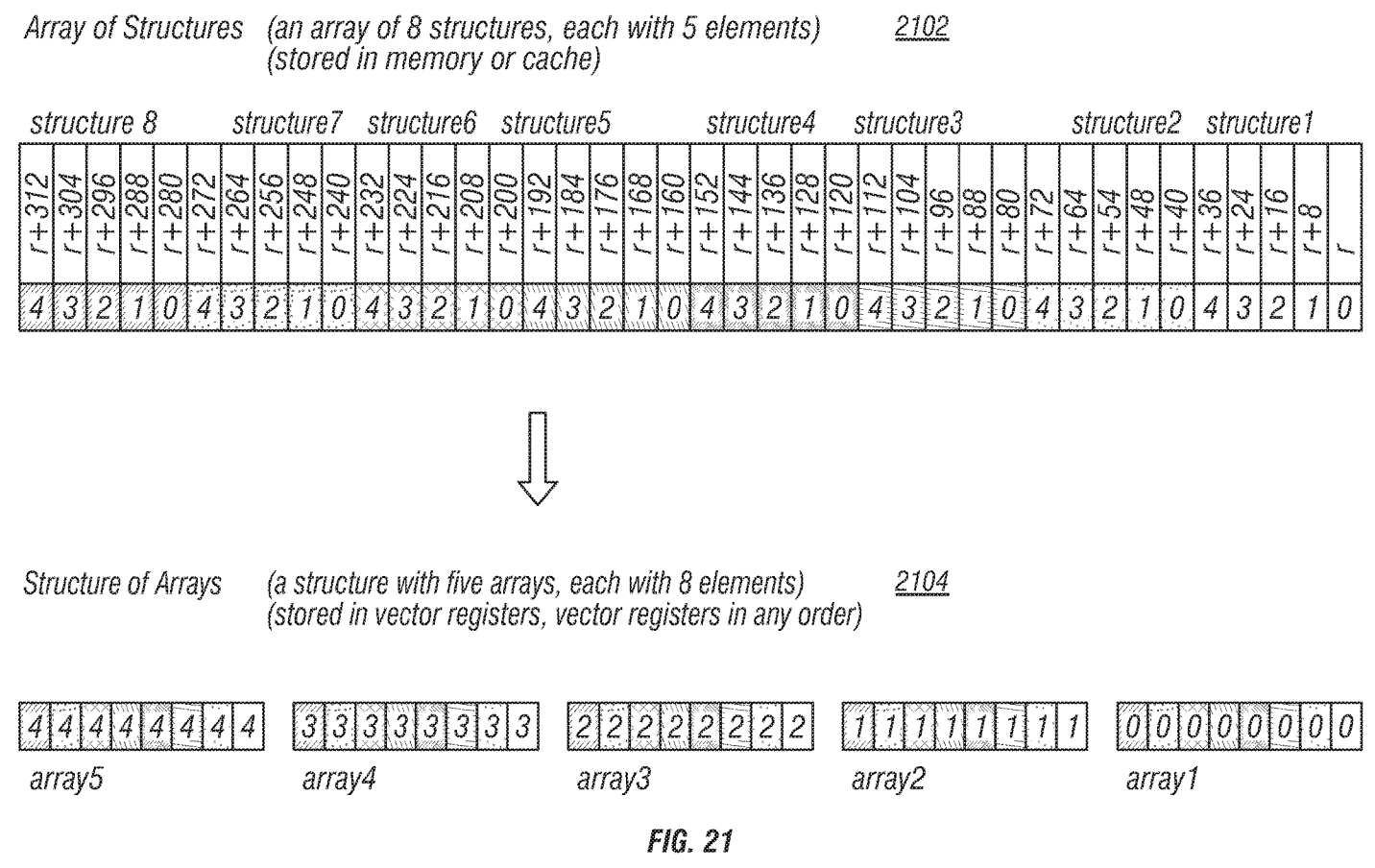

Array of Structures (an array of 8 structures, each with 5 elements) (stored in memory or cache) 2102 structure1 structure2 structure3 structure4 structure5 structure6 structure7 structure 8 r, r+8, r+16, r+24, r+36, r+40, r+48, r+54, r+64, r+72, r+80, r+88, r+96, r+104, r+112, r+120, r+128, r+136, r+144, r+152, r+160, r+168, r+176, r+184, r+192, r+200, r+208, r+216, r+224, r+232, r+240, r+248, r+256, r+264, r+272, r+280, r+288, r+296, r+304, r+312

Structure of Arrays (a structure with five arrays, each with 8 elements) (stored in vector registers, vector registers in any order) 2104 array1 array2 array3 array4 array5

FIG. 21

AoS mm4 mm3 mm2 mm1 mm0

5 VMOVUP mm4 mm3 mm2 mm1 mm0

15 BLEND with 3 masks mm4 mm3 mm2 mm1 mm0

5 VMOVUP with 1 index mm4 mm3 mm2 mm1 mm0

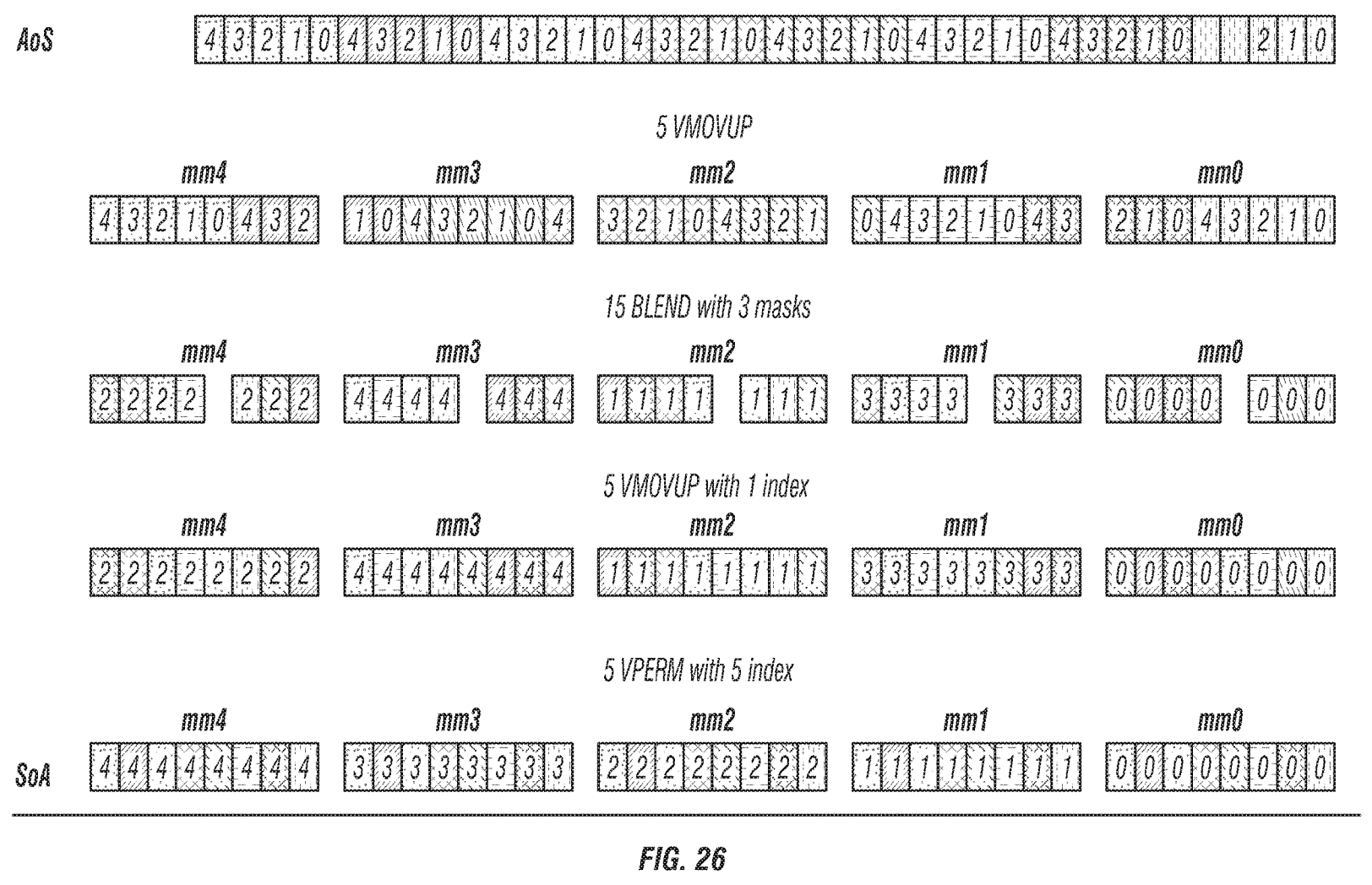

5 VPERM with 5 index

SoA

FIG. 26

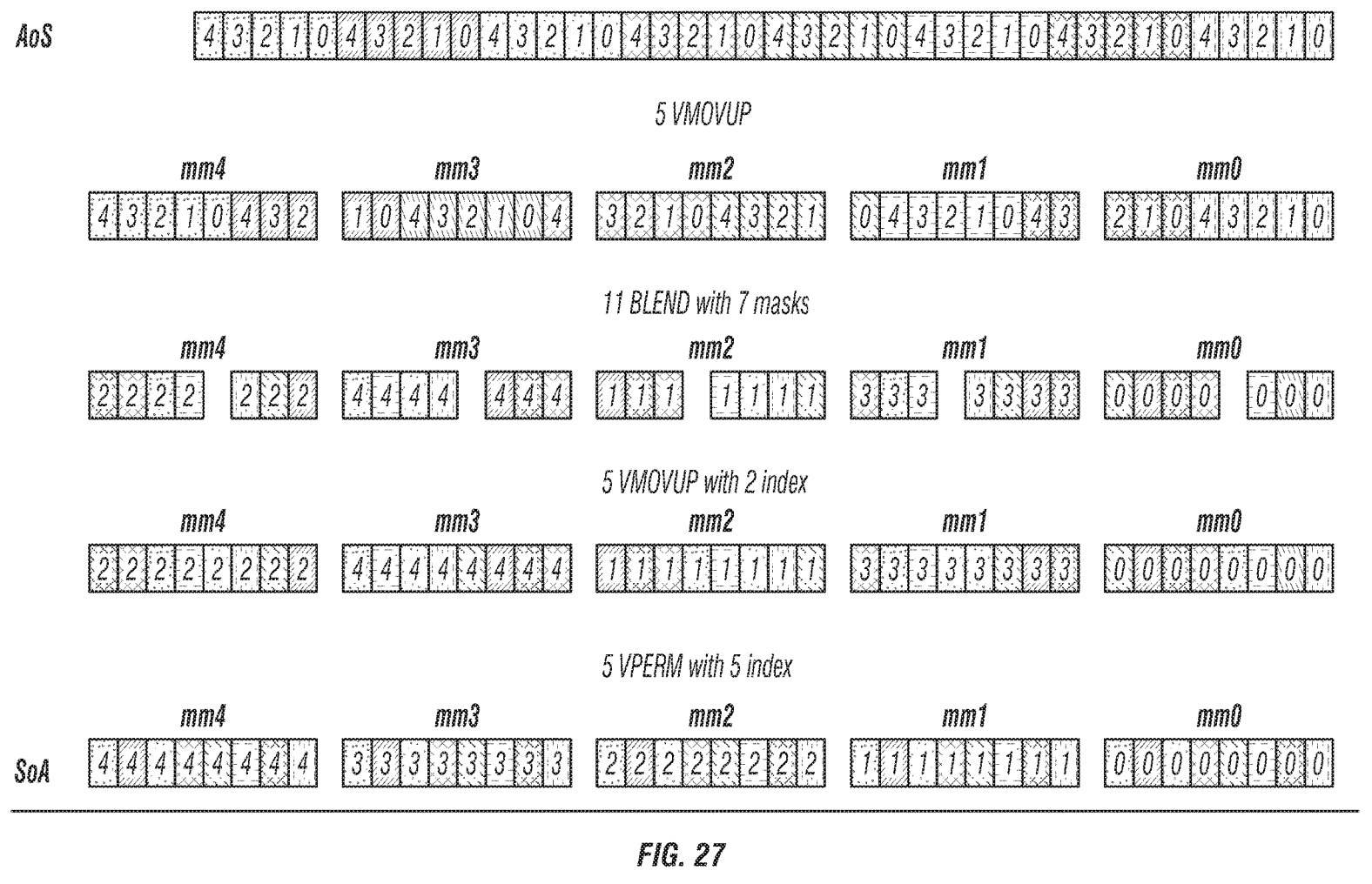

AoS

5 VMOVUP mm4 mm3 mm2 mm1 mm0

11 BLEND with 7 masks mm4 mm3 mm2 mm1 mm0

5 VMOVUP with 2 index mm4 mm3 mm2 mm1 mm0

5 VPERM with 5 index mm4 mm3 mm2 mm1 mm0

SoA

FIG. 27

INSTRUCTIONS AND LOGIC FOR BLEND AND PERMUTE OPERATION SEQUENCES

FIELD OF THE INVENTION

The present disclosure pertains to the field of processing logic, microprocessors, and associated instruction set architecture that, when executed by the processor or other processing logic, perform logical, mathematical, or other functional operations.

DESCRIPTION OF RELATED ART

Multiprocessor systems are becoming more and more common. Applications of multiprocessor systems include dynamic domain partitioning all the way down to desktop computing. In order to take advantage of multiprocessor systems, code to be executed may be separated into multiple threads for execution by various processing entities. Each thread may be executed in parallel with one another. Instructions as they are received on a processor may be decoded into terms or instruction words that are native, or more native, for execution on the processor. Processors may be implemented in a system on chip. Data structures that are organized in tuples of three to five elements may be used in media applications, High Performance Computing applications, and molecular dynamics applications.

DESCRIPTION OF THE FIGURES

Embodiments are illustrated by way of example and not limitation in the Figures of the accompanying drawings:

FIG. 3B illustrates possible in-register data storage formats, in accordance with embodiments of the present disclosure;

FIG. 3C illustrates various signed and unsigned packed data type representations in multimedia registers, in accordance with embodiments of the present disclosure;

FIG. 3D illustrates an embodiment of an operation encoding format;

FIG. 3E illustrates another possible operation encoding format having forty or more bits, in accordance with embodiments of the present disclosure;

FIG. 3F illustrates yet another possible operation encoding format, in accordance with embodiments of the present disclosure;

FIG. 20 is a block diagram illustrating an example extended vector register file, in accordance with embodiments of the present disclosure;

FIG. 21 is an illustration of the results of data conversion, according to embodiments of the present disclosure;

FIG. 26 is an illustration of operation of a system to perform the conversion using blend and permute operations, in accordance with embodiments of the present disclosure;

FIG. 27 is an illustration of further operation of a system to perform the conversion using blend and permute operations, in accordance with embodiments of the present disclosure.

DETAILED DESCRIPTION

Figure 1A:
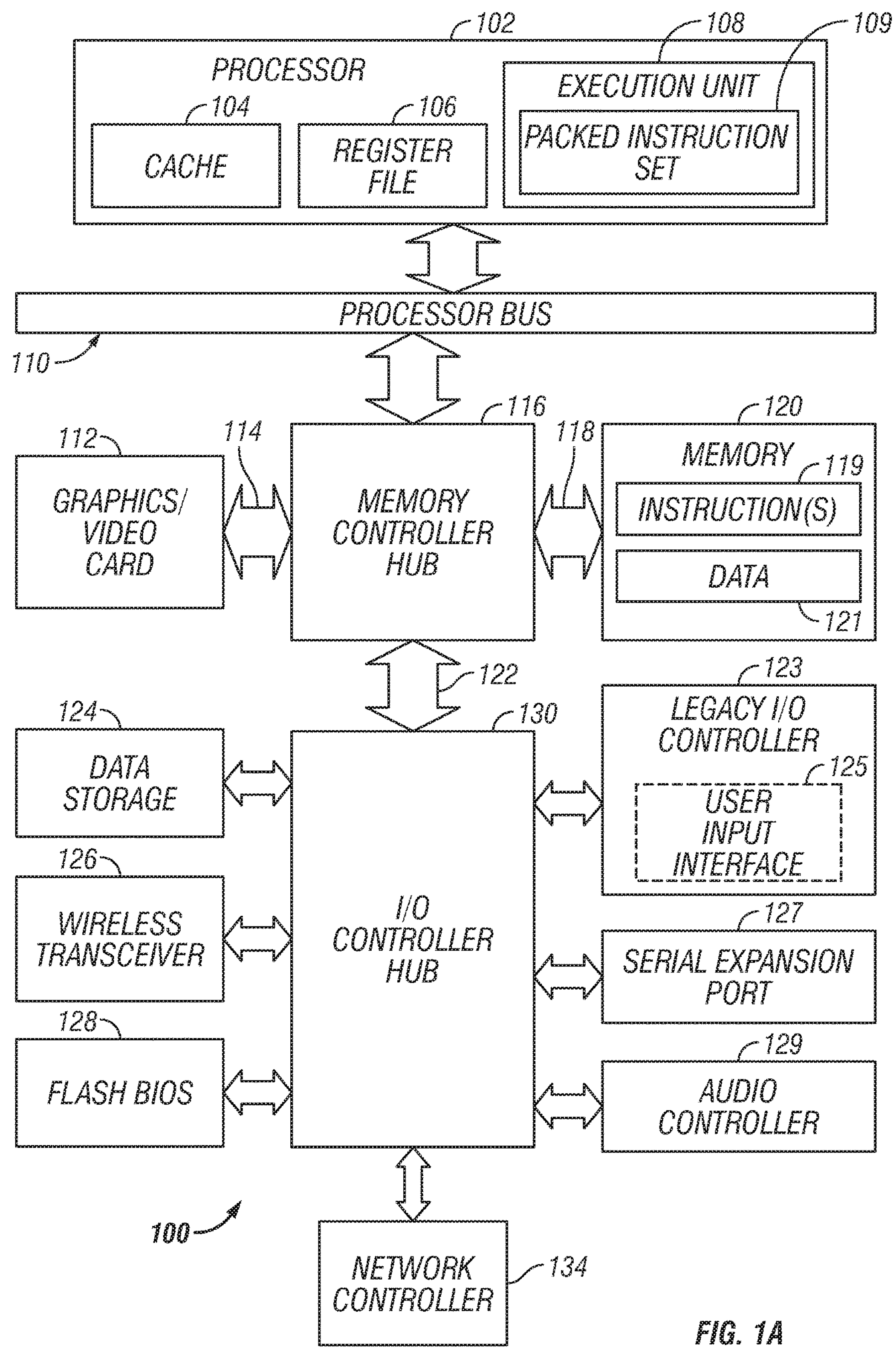
FIG. 1A is a block diagram of an exemplary computer system formed with a processor that may include execution units to execute an instruction, in accordance with embodiments of the present disclosure.

The following description describes embodiments of instructions and processing logic for performing blend and permute sequences of operation on a processing apparatus. The blend and permute sequences may be part of a striding operation, such as Stride-5. Such a processing apparatus may include an out-of-order processor. In the following description, numerous specific details such as processing logic, processor types, micro-architectural conditions, events, enablement mechanisms, and the like are set forth in order to provide a more thorough understanding of embodiments of the present disclosure. It will be appreciated, however, by one skilled in the art that the embodiments may be practiced without such specific details. Additionally, some well-known structures, circuits, and the like have not been shown in detail to avoid unnecessarily obscuring embodiments of the present disclosure.

Although the following embodiments are described with reference to a processor, other embodiments are applicable to other types of integrated circuits and logic devices. Similar techniques and teachings of embodiments of the present disclosure may be applied to other types of circuits or semiconductor devices that may benefit from higher pipeline throughput and improved performance. The teachings of embodiments of the present disclosure are applicable to any processor or machine that performs data manipulations. However, the embodiments are not limited to processors or machines that perform 512-bit, 256-bit, 128-bit, 64-bit, 32-bit, or 16-bit data operations and may be applied to any processor and machine in which manipulation or management of data may be performed. In addition, the following description provides examples, and the accompanying drawings show various examples for the purposes of illustration. However, these examples should not be construed in a limiting sense as they are merely intended to provide examples of embodiments of the present disclosure rather than to provide an exhaustive list of all possible implementations of embodiments of the present disclosure.

Although the below examples describe instruction handling and distribution in the context of execution units and logic circuits, other embodiments of the present disclosure may be accomplished by way of a data or instructions stored on a machine-readable, tangible medium, which when performed by a machine cause the machine to perform functions consistent with at least one embodiment of the disclosure. In one embodiment, functions associated with embodiments of the present disclosure are embodied in machine-executable instructions. The instructions may be used to cause a general-purpose or special-purpose processor that may be programmed with the instructions to perform the steps of the present disclosure. Embodiments of the present disclosure may be provided as a computer program product or software which may include a machine or computer-readable medium having stored thereon instructions which may be used to program a computer (or other electronic devices) to perform one or more operations according to embodiments of the present disclosure. Furthermore, steps of embodiments of the present disclosure might be performed by specific hardware components that contain fixed-function logic for performing the steps, or by any combination of programmed computer components and fixed-function hardware components.

Instructions used to program logic to perform embodiments of the present disclosure may be stored within a memory in the system, such as DRAM, cache, flash memory, or other storage. Furthermore, the instructions may be distributed via a network or by way of other computer-readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium may include any type of tangible machine-readable medium suitable for storing or transmitting electronic instructions or information in a form readable by a machine (e.g., a computer).

A design may go through various stages, from creation to simulation to fabrication. Data representing a design may represent the design in a number of manners. First, as may be useful in simulations, the hardware may be represented using a hardware description language or another functional description language. Additionally, a circuit level model with logic and/or transistor gates may be produced at some stages of the design process. Furthermore, designs, at some stage, may reach a level of data representing the physical placement of various devices in the hardware model. In cases wherein some semiconductor fabrication techniques are used, the data representing the hardware model may be the data specifying the presence or absence of various features on different mask layers for masks used to produce the integrated circuit. In any representation of the design, the data may be stored in any form of a machine-readable medium. A memory or a magnetic or optical storage such as a disc may be the machine-readable medium to store information transmitted via optical or electrical wave modulated or otherwise generated to transmit such information. When an electrical carrier wave indicating or carrying the code or design is transmitted, to the extent that copying, buffering, or retransmission of the electrical signal is performed, a new copy may be made. Thus, a communication provider or a network provider may store on a tangible, machine-readable medium, at least temporarily, an article, such as information encoded into a carrier wave, embodying techniques of embodiments of the present disclosure.

In modern processors, a number of different execution units may be used to process and execute a variety of code and instructions. Some instructions may be quicker to complete while others may take a number of clock cycles to complete. The faster the throughput of instructions, the better the overall performance of the processor. Thus it would be advantageous to have as many instructions execute as fast as possible. However, there may be certain instructions that have greater complexity and require more in terms of execution time and processor resources, such as floating point instructions, load/store operations, data moves, etc.

As more computer systems are used in internet, text, and multimedia applications, additional processor support has been introduced over time. In one embodiment, an instruction set may be associated with one or more computer architectures, including data types, instructions, register architecture, addressing modes, memory architecture, interrupt and exception handling, and external input and output (I/O).

In one embodiment, the instruction set architecture (ISA) may be implemented by one or more micro-architectures, which may include processor logic and circuits used to implement one or more instruction sets. Accordingly, processors with different micro-architectures may share at least a portion of a common instruction set. For example, Intel® Pentium 4 processors, Intel® Core™ processors, and processors from Advanced Micro Devices, Inc. of Sunnyvale Calif. implement nearly identical versions of the x86 instruction set (with some extensions that have been added with newer versions), but have different internal designs. Similarly, processors designed by other processor development companies, such as ARM Holdings, Ltd., MIPS, or their licensees or adopters, may share at least a portion of a common instruction set, but may include different processor designs. For example, the same register architecture of the ISA may be implemented in different ways in different micro-architectures using new or well-known techniques, including dedicated physical registers, one or more dynamically allocated physical registers using a register renaming mechanism (e.g., the use of a Register Alias Table (RAT), a Reorder Buffer (ROB) and a retirement register file. In one embodiment, registers may include one or more registers, register architectures, register files, or other register sets that may or may not be addressable by a software programmer.

An instruction may include one or more instruction formats. In one embodiment, an instruction format may indicate various fields (number of bits, location of bits, etc.) to specify, among other things, the operation to be performed and the operands on which that operation will be performed. In a further embodiment, some instruction formats may be further defined by instruction templates (or sub-formats). For example, the instruction templates of a given instruction format may be defined to have different subsets of the instruction format's fields and/or defined to have a given field interpreted differently. In one embodiment, an instruction may be expressed using an instruction format (and, if defined, in a given one of the instruction templates of that instruction format) and specifies or indicates the operation and the operands upon which the operation will operate.

Scientific, financial, auto-vectorized general purpose, RMS (recognition, mining, and synthesis), and visual and multimedia applications (e.g., 2D/3D graphics, image processing, video compression/decompression, voice recognition algorithms and audio manipulation) may require the same operation to be performed on a large number of data items. In one embodiment, Single Instruction Multiple Data (SIMD) refers to a type of instruction that causes a processor to perform an operation on multiple data elements. SIMD technology may be used in processors that may logically divide the bits in a register into a number of fixed-sized or variable-sized data elements, each of which represents a separate value. For example, in one embodiment, the bits in a 64-bit register may be organized as a source operand containing four separate 16-bit data elements, each of which represents a separate 16-bit value. This type of data may be referred to as 'packed' data type or 'vector' data type, and operands of this data type may be referred to as packed data operands or vector operands. In one embodiment, a packed data item or vector may be a sequence of packed data elements stored within a single register, and a packed data operand or a vector operand may a source or destination operand of a SIMD instruction (or 'packed data instruction' or a 'vector instruction'). In one embodiment, a SIMD instruction specifies a single vector operation to be performed on two source vector operands to generate a destination vector operand (also referred to as a result vector operand) of the same or different size, with the same or different number of data elements, and in the same or different data element order.

SIMD technology, such as that employed by the Intel® Core™ processors having an instruction set including x86, MMX™, Streaming SIMD Extensions (SSE), SSE2, SSE3, SSE4.1, and SSE4.2 instructions, ARM processors, such as the ARM Cortex® family of processors having an instruction set including the Vector Floating Point (VFP) and/or NEON instructions, and MIPS processors, such as the Loongson family of processors developed by the Institute of Computing Technology (ICT) of the Chinese Academy of Sciences, has enabled a significant improvement in application performance (Core™ and MMX™ are registered trademarks or trademarks of Intel Corporation of Santa Clara, Calif.).

In one embodiment, destination and source registers/data may be generic terms to represent the source and destination of the corresponding data or operation. In some embodiments, they may be implemented by registers, memory, or other storage areas having other names or functions than those depicted. For example, in one embodiment, "DEST1" may be a temporary storage register or other storage area, whereas "SRC1" and "SRC2" may be a first and second source storage register or other storage area, and so forth. In other embodiments, two or more of the SRC and DEST storage areas may correspond to different data storage elements within the same storage area (e.g., a SIMD register). In one embodiment, one of the source registers may also act as a destination register by, for example, writing back the result of an operation performed on the first and second source data to one of the two source registers serving as a destination registers.

FIG. 1A is a block diagram of an exemplary computer system formed with a processor that may include execution units to execute an instruction, in accordance with embodiments of the present disclosure. System 100 may include a component, such as a processor 102 to employ execution units including logic to perform algorithms for process data, in accordance with the present disclosure, such as in the embodiment described herein. System 100 may be representative of processing systems based on the PENTIUM® III, PENTIUM® 4, Xeon™, Itanium®, XScale™ and/or StrongARM™ microprocessors available from Intel Corporation of Santa Clara, Calif., although other systems (including PCs having other microprocessors, engineering workstations, set-top boxes and the like) may also be used. In one embodiment, sample system 100 may execute a version of the WINDOWS™ operating system available from Microsoft Corporation of Redmond, Wash., although other operating systems (UNIX and Linux for example), embedded software, and/or graphical user interfaces, may also be used. Thus, embodiments of the present disclosure are not limited to any specific combination of hardware circuitry and software.

Embodiments are not limited to computer systems. Embodiments of the present disclosure may be used in other devices such as handheld devices and embedded applications. Some examples of handheld devices include cellular phones, Internet Protocol devices, digital cameras, personal digital assistants (PDAs), and handheld PCs. Embedded applications may include a micro controller, a digital signal processor (DSP), system on a chip, network computers (NetPC), set-top boxes, network hubs, wide area network (WAN) switches, or any other system that may perform one or more instructions in accordance with at least one embodiment.

Computer system 100 may include a processor 102 that may include one or more execution units 108 to perform an algorithm to perform at least one instruction in accordance with one embodiment of the present disclosure. One embodiment may be described in the context of a single processor desktop or server system, but other embodiments may be included in a multiprocessor system. System 100 may be an example of a 'hub' system architecture. System 100 may include a processor 102 for processing data signals. Processor 102 may include a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. In one embodiment, processor 102 may be coupled to a processor bus 110 that may transmit data signals between processor 102 and other components in system 100. The elements of system 100 may perform conventional functions that are well known to those familiar with the art.

In one embodiment, processor 102 may include a Level 1 (L1) internal cache memory 104. Depending on the architecture, the processor 102 may have a single internal cache or multiple levels of internal cache. In another embodiment, the cache memory may reside external to processor 102. Other embodiments may also include a combination of both internal and external caches depending on the particular implementation and needs. Register file 106 may store different types of data in various registers including integer registers, floating point registers, status registers, and instruction pointer register.

Execution unit 108, including logic to perform integer and floating point operations, also resides in processor 102. Processor 102 may also include a microcode (ucode) ROM that stores microcode for certain macroinstructions. In one embodiment, execution unit 108 may include logic to handle a packed instruction set 109. By including the packed instruction set 109 in the instruction set of a general-purpose processor 102, along with associated circuitry to execute the instructions, the operations used by many multimedia applications may be performed using packed data in a general-purpose processor 102. Thus, many multimedia applications may be accelerated and executed more efficiently by using the full width of a processor's data bus for performing operations on packed data. This may eliminate the need to transfer smaller units of data across the processor's data bus to perform one or more operations one data element at a time.

Embodiments of an execution unit 108 may also be used in micro controllers, embedded processors, graphics devices, DSPs, and other types of logic circuits. System 100 may include a memory 120. Memory 120 may be implemented as a dynamic random access memory (DRAM) device, a static random access memory (SRAM) device, flash memory device, or other memory device. Memory 120 may store instructions 119 and/or data 121 represented by data signals that may be executed by processor 102.

A system logic chip 116 may be coupled to processor bus 110 and memory 120. System logic chip 116 may include a memory controller hub (MCH). Processor 102 may communicate with MCH 116 via a processor bus 110. MCH 116 may provide a high bandwidth memory path 118 to memory 120 for storage of instructions 119 and data 121 and for storage of graphics commands, data and textures. MCH 116 may direct data signals between processor 102, memory 120, and other components in system 100 and to bridge the data signals between processor bus 110, memory 120, and system I/O 122. In some embodiments, the system logic chip 116 may provide a graphics port for coupling to a graphics controller 112. MCH 116 may be coupled to memory 120 through a memory interface 118. Graphics card 112 may be coupled to MCH 116 through an Accelerated Graphics Port (AGP) interconnect 114.

System 100 may use a proprietary hub interface bus 122 to couple MCH 116 to I/O controller hub (ICH) 130. In one embodiment, ICH 130 may provide direct connections to some I/O devices via a local I/O bus. The local I/O bus may include a high-speed I/O bus for connecting peripherals to memory 120, chipset, and processor 102. Examples may include the audio controller 129, firmware hub (flash BIOS) 128, wireless transceiver 126, data storage 124, legacy I/O controller 123 containing user input interface 125 (which may include a keyboard interface), a serial expansion port 127 such as Universal Serial Bus (USB), and a network controller 134. Data storage device 124 may comprise a hard disk drive, a floppy disk drive, a CD-ROM device, a flash memory device, or other mass storage device.

For another embodiment of a system, an instruction in accordance with one embodiment may be used with a system on a chip. One embodiment of a system on a chip comprises of a processor and a memory. The memory for one such system may include a flash memory. The flash memory may be located on the same die as the processor and other system components. Additionally, other logic blocks such as a memory controller or graphics controller may also be located on a system on a chip.

Figure 1B:
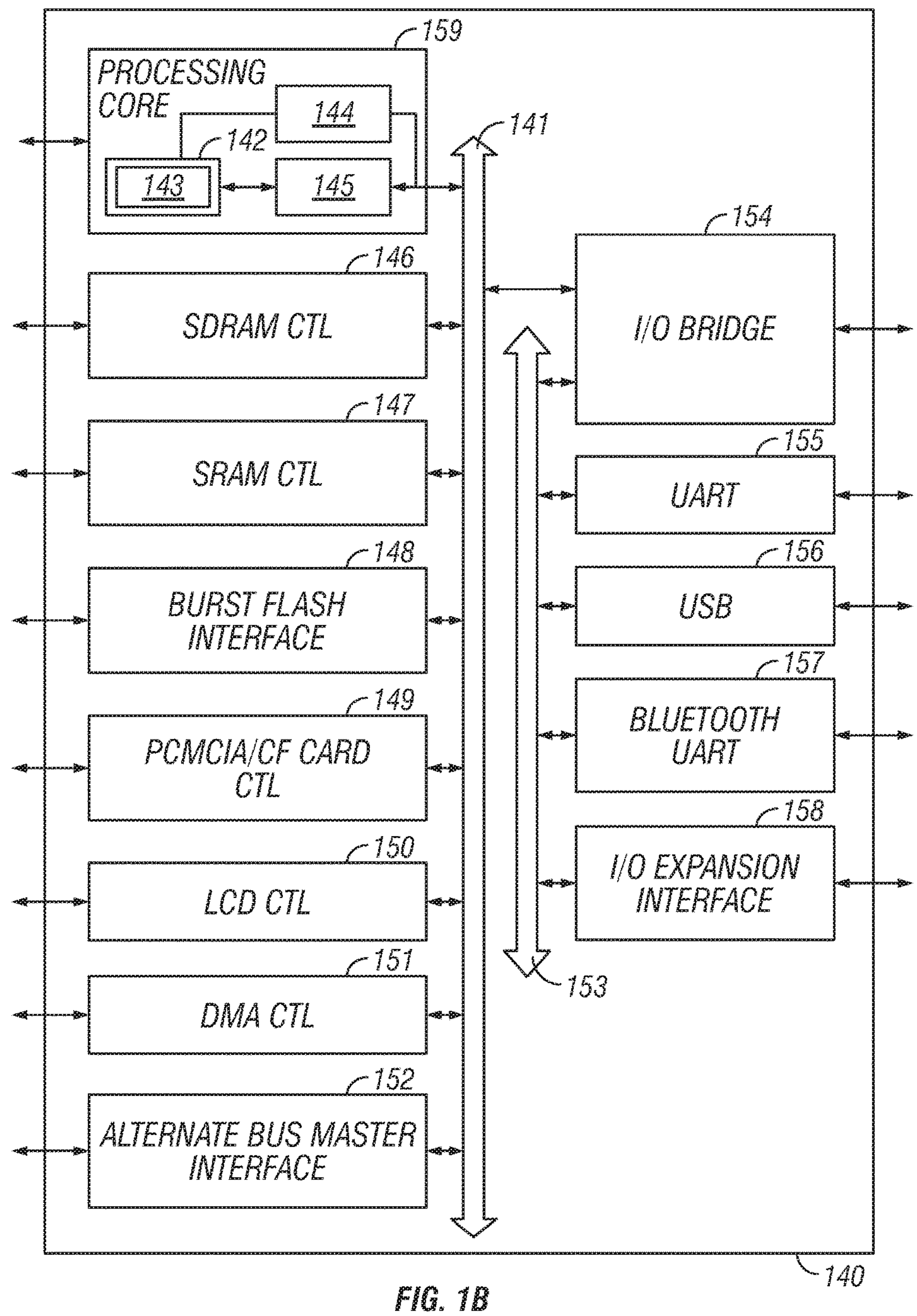
FIG. 1B illustrates a data processing system, in accordance with embodiments of the present disclosure.

FIG. 1B illustrates a data processing system 140 which implements the principles of embodiments of the present disclosure. It will be readily appreciated by one of skill in the art that the embodiments described herein may operate with alternative processing systems without departure from the scope of embodiments of the disclosure.

Computer system 140 comprises a processing core 159 for performing at least one instruction in accordance with one embodiment. In one embodiment, processing core 159 represents a processing unit of any type of architecture, including but not limited to a CISC, a RISC or a VLIW type architecture. Processing core 159 may also be suitable for manufacture in one or more process technologies and by being represented on a machine-readable media in sufficient detail, may be suitable to facilitate said manufacture.

Processing core 159 comprises an execution unit 142, a set of register files 145, and a decoder 144. Processing core 159 may also include additional circuitry (not shown) which may be unnecessary to the understanding of embodiments of the present disclosure. Execution unit 142 may execute instructions received by processing core 159. In addition to performing typical processor instructions, execution unit 142 may perform instructions in packed instruction set 143 for performing operations on packed data formats. Packed instruction set 143 may include instructions for performing embodiments of the disclosure and other packed instructions. Execution unit 142 may be coupled to register file 145 by an internal bus. Register file 145 may represent a storage area on processing core 159 for storing information, including data. As previously mentioned, it is understood that the storage area may store the packed data might not be critical. Execution unit 142 may be coupled to decoder 144. Decoder 144 may decode instructions received by processing core 159 into control signals and/or microcode entry points. In response to these control signals and/or microcode entry points, execution unit 142 performs the appropriate operations. In one embodiment, the decoder may interpret the opcode of the instruction, which will indicate what operation should be performed on the corresponding data indicated within the instruction.

Processing core 159 may be coupled with bus 141 for communicating with various other system devices, which may include but are not limited to, for example, synchronous dynamic random access memory (SDRAM) control 146, static random access memory (SRAM) control 147, burst flash memory interface 148, personal computer memory card international association (PCMCIA)/compact flash (CF) card control 149, liquid crystal display (LCD) control 150, direct memory access (DMA) controller 151, and alternative bus master interface 152. In one embodiment, data processing system 140 may also comprise an I/O bridge 154 for communicating with various I/O devices via an I/O bus 153. Such I/O devices may include but are not limited to, for example, universal asynchronous receiver/transmitter (UART) 155, universal serial bus (USB) 156, Bluetooth wireless UART 157 and I/O expansion interface 158.

One embodiment of data processing system 140 provides for mobile, network and/or wireless communications and a processing core 159 that may perform SIMD operations including a text string comparison operation. Processing core 159 may be programmed with various audio, video, imaging and communications algorithms including discrete transformations such as a Walsh-Hadamard transform, a fast Fourier transform (FFT), a discrete cosine transform (DCT), and their respective inverse transforms; compression/decompression techniques such as color space transformation, video encode motion estimation or video decode motion compensation; and modulation/demodulation (MODEM) functions such as pulse coded modulation (PCM).

Figure 1C:
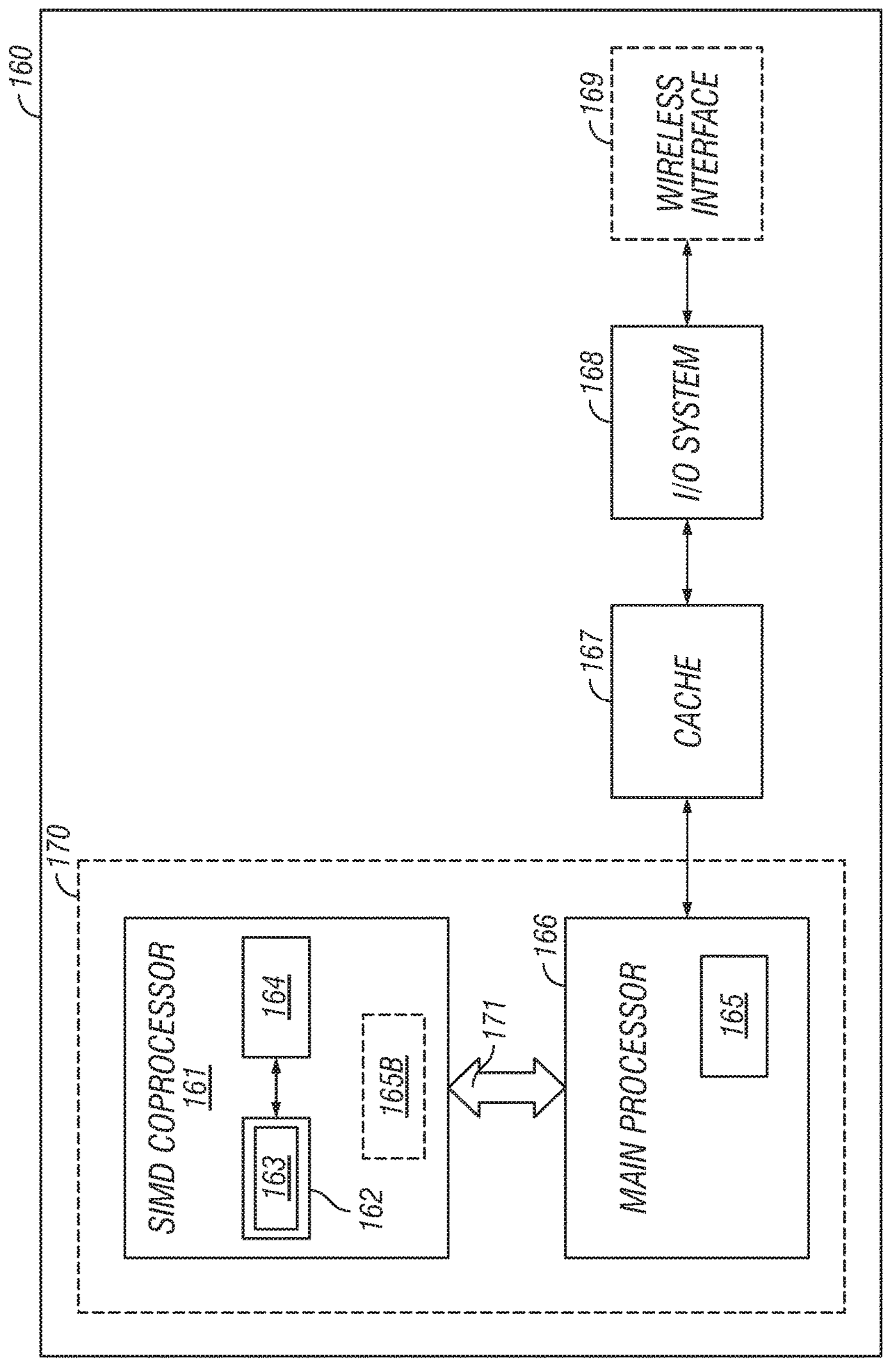
FIG. 1C illustrates other embodiments of a data processing system for performing text string comparison operations.

FIG. 1C illustrates other embodiments of a data processing system that performs SIMD text string comparison operations. In one embodiment, data processing system 160 may include a main processor 166, a SIMD coprocessor 161, a cache memory 167, and an input/output system 168. Input/output system 168 may optionally be coupled to a wireless interface 169. SIMD coprocessor 161 may perform operations including instructions in accordance with one embodiment. In one embodiment, processing core 170 may be suitable for manufacture in one or more process technologies and by being represented on a machine-readable media in sufficient detail, may be suitable to facilitate the manufacture of all or part of data processing system 160 including processing core 170.

In one embodiment, SIMD coprocessor 161 comprises an execution unit 162 and a set of register files 164. One embodiment of main processor 166 comprises a decoder 165 to recognize instructions of instruction set 163 including instructions in accordance with one embodiment for execution by execution unit 162. In other embodiments, SIMD coprocessor 161 also comprises at least part of decoder 165 (shown as 165B) to decode instructions of instruction set 163. Processing core 170 may also include additional circuitry (not shown) which may be unnecessary to the understanding of embodiments of the present disclosure.

In operation, main processor 166 executes a stream of data processing instructions that control data processing operations of a general type including interactions with cache memory 167, and input/output system 168. Embedded within the stream of data processing instructions may be SIMD coprocessor instructions. Decoder 165 of main processor 166 recognizes these SIMD coprocessor instructions as being of a type that should be executed by an attached SIMD coprocessor 161. Accordingly, main processor 166 issues these SIMD coprocessor instructions (or control signals representing SIMD coprocessor instructions) on the coprocessor bus 166. From coprocessor bus 171, these instructions may be received by any attached SIMD coprocessors. In this case, SIMD coprocessor 161 may accept and execute any received SIMD coprocessor instructions intended for it.

Data may be received via wireless interface 169 for processing by the SIMD coprocessor instructions. For one example, voice communication may be received in the form of a digital signal, which may be processed by the SIMD coprocessor instructions to regenerate digital audio samples representative of the voice communications. For another example, compressed audio and/or video may be received in the form of a digital bit stream, which may be processed by the SIMD coprocessor instructions to regenerate digital audio samples and/or motion video frames. In one embodiment of processing core 170, main processor 166, and a SIMD coprocessor 161 may be integrated into a single processing core 170 comprising an execution unit 162, a set of register files 164, and a decoder 165 to recognize instructions of instruction set 163 including instructions in accordance with one embodiment.

Figure 2:
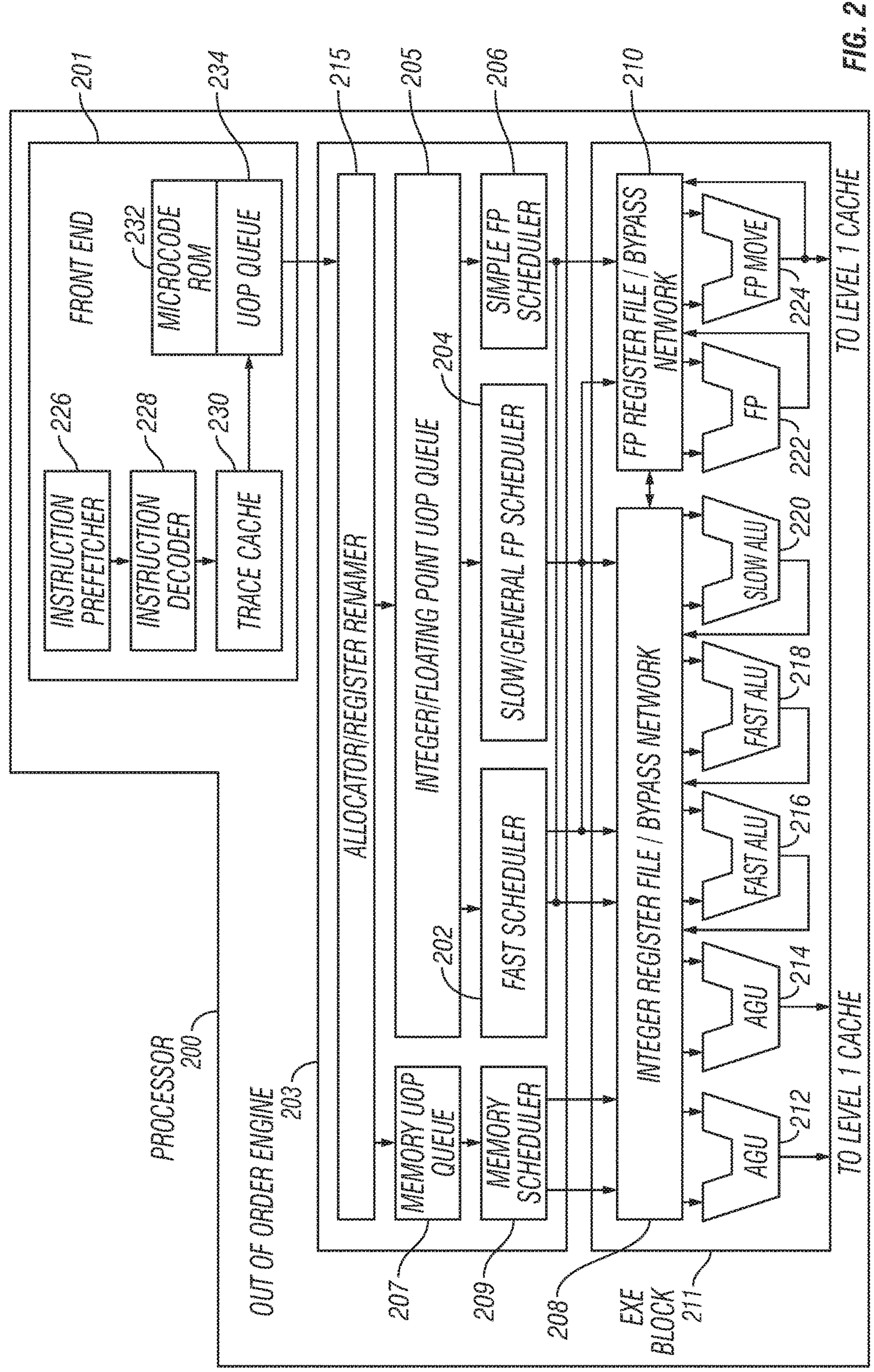
FIG. 2 is a block diagram of the micro-architecture for a processor that may include logic circuits to perform instructions, in accordance with embodiments of the present disclosure.

FIG. 2 is a block diagram of the micro-architecture for a processor 200 that may include logic circuits to perform instructions, in accordance with embodiments of the present disclosure. In some embodiments, an instruction in accordance with one embodiment may be implemented to operate on data elements having sizes of byte, word, doubleword, quadword, etc., as well as datatypes, such as single and double precision integer and floating point datatypes. In one embodiment, in-order front end 201 may implement a part of processor 200 that may fetch instructions to be executed and prepares the instructions to be used later in the processor pipeline. Front end 201 may include several units. In one embodiment, instruction prefetcher 226 fetches instructions from memory and feeds the instructions to an instruction decoder 228 which in turn decodes or interprets the instructions. For example, in one embodiment, the decoder decodes a received instruction into one or more operations called "micro-instructions" or "micro-operations" (also called micro op or uops) that the machine may execute. In other embodiments, the decoder parses the instruction into an opcode and corresponding data and control fields that may be used by the micro-architecture to perform operations in accordance with one embodiment. In one embodiment, trace cache 230 may assemble decoded uops into program ordered sequences or traces in uop queue 234 for execution. When trace cache 230 encounters a complex instruction, microcode ROM 232 provides the uops needed to complete the operation.

Some instructions may be converted into a single micro-op, whereas others need several micro-ops to complete the full operation. In one embodiment, if more than four micro-ops are needed to complete an instruction, decoder 228 may access microcode ROM 232 to perform the instruction. In one embodiment, an instruction may be decoded into a small number of micro ops for processing at instruction decoder 228. In another embodiment, an instruction may be stored within microcode ROM 232 should a number of micro-ops be needed to accomplish the operation. Trace cache 230 refers to an entry point programmable logic array (PLA) to determine a correct micro-instruction pointer for reading the micro-code sequences to complete one or more instructions in accordance with one embodiment from micro-code ROM 232. After microcode ROM 232 finishes sequencing micro-ops for an instruction, front end 201 of the machine may resume fetching micro-ops from trace cache 230.

Out-of-order execution engine 203 may prepare instructions for execution. The out-of-order execution logic has a number of buffers to smooth out and re-order the flow of instructions to optimize performance as they go down the pipeline and get scheduled for execution. The allocator logic in allocator/register renamer 215 allocates the machine buffers and resources that each uop needs in order to execute. The register renaming logic in allocator/register renamer 215 renames logic registers onto entries in a register file. The allocator 215 also allocates an entry for each uop in one of the two uop queues, one for memory operations (memory uop queue 207) and one for non-memory operations (integer/floating point uop queue 205), in front of the instruction schedulers: memory scheduler 209, fast scheduler 202, slow/general floating point scheduler 204, and simple floating point scheduler 206. Uop schedulers 202, 204, 206, determine when a uop is ready to execute based on the readiness of their dependent input register operand sources and the availability of the execution resources the uops need to complete their operation. Fast scheduler 202 of one embodiment may schedule on each half of the main clock cycle while the other schedulers may only schedule once per main processor clock cycle. The schedulers arbitrate for the dispatch ports to schedule uops for execution.

Register files 208, 210 may be arranged between schedulers 202, 204, 206, and execution units 212, 214, 216, 218, 220, 222, 224 in execution block 211. Each of register files 208, 210 perform integer and floating point operations, respectively. Each register file 208, 210, may include a bypass network that may bypass or forward just completed results that have not yet been written into the register file to new dependent uops. Integer register file 208 and floating point register file 210 may communicate data with the other. In one embodiment, integer register file 208 may be split into two separate register files, one register file for low-order thirty-two bits of data and a second register file for high order thirty-two bits of data. Floating point register file 210 may include 128-bit wide entries because floating point instructions typically have operands from 64 to 128 bits in width.

Execution block 211 may contain execution units 212, 214, 216, 218, 220, 222, 224. Execution units 212, 214, 216, 218, 220, 222, 224 may execute the instructions. Execution block 211 may include register files 208, 210 that store the integer and floating point data operand values that the micro-instructions need to execute. In one embodiment, processor 200 may comprise a number of execution units: address generation unit (AGU) 212, AGU 214, fast ALU 216, fast ALU 218, slow ALU 220, floating point ALU 222, floating point move unit 224. In another embodiment, floating point execution blocks 222, 224, may execute floating point, MMX, SIMD, and SSE, or other operations. In yet another embodiment, floating point ALU 222 may include a 64-bit by 64-bit floating point divider to execute divide, square root, and remainder micro-ops. In various embodiments, instructions involving a floating point value may be handled with the floating point hardware. In one embodiment, ALU operations may be passed to high-speed ALU execution units 216, 218. High-speed ALUs 216, 218 may execute fast operations with an effective latency of half a clock cycle. In one embodiment, most complex integer operations go to slow ALU 220 as slow ALU 220 may include integer execution hardware for long-latency type of operations, such as a multiplier, shifts, flag logic, and branch processing. Memory load/store operations may be executed by AGUs 212, 214. In one embodiment, integer ALUs 216, 218, 220 may perform integer operations on 64-bit data operands. In other embodiments, ALUs 216, 218, 220 may be implemented to support a variety of data bit sizes including sixteen, thirty-two, 128, 256, etc. Similarly, floating point units 222, 224 may be implemented to support a range of operands having bits of various widths. In one embodiment, floating point units 222, 224, may operate on 128-bit wide packed data operands in conjunction with SIMD and multimedia instructions.

In one embodiment, uops schedulers 202, 204, 206, dispatch dependent operations before the parent load has finished executing. As uops may be speculatively scheduled and executed in processor 200, processor 200 may also include logic to handle memory misses. If a data load misses in the data cache, there may be dependent operations in flight in the pipeline that have left the scheduler with temporarily incorrect data. A replay mechanism tracks and re-executes instructions that use incorrect data. Only the dependent operations might need to be replayed and the independent ones may be allowed to complete. The schedulers and replay mechanism of one embodiment of a processor may also be designed to catch instruction sequences for text string comparison operations.

The term "registers" may refer to the on-board processor storage locations that may be used as part of instructions to identify operands. In other words, registers may be those that may be usable from the outside of the processor (from a programmer's perspective). However, in some embodiments registers might not be limited to a particular type of circuit. Rather, a register may store data, provide data, and perform the functions described herein. The registers described herein may be implemented by circuitry within a processor using any number of different techniques, such as dedicated physical registers, dynamically allocated physical registers using register renaming, combinations of dedicated and dynamically allocated physical registers, etc. In one embodiment, integer registers store 32-bit integer data. A register file of one embodiment also contains eight multimedia SIMD registers for packed data. For the discussions below, the registers may be understood to be data registers designed to hold packed data, such as 64-bit wide MMX' registers (also referred to as 'mm' registers in some instances) in microprocessors enabled with MMX technology from Intel Corporation of Santa Clara, Calif. These MMX registers, available in both integer and floating point forms, may operate with packed data elements that accompany SIMD and SSE instructions. Similarly, 128-bit wide XMM registers relating to SSE2, SSE3, SSE4, or beyond (referred to generically as "SSEx") technology may hold such packed data operands. In one embodiment, in storing packed data and integer data, the registers do not need to differentiate between the two data types. In one embodiment, integer and floating point data may be contained in the same register file or different register files. Furthermore, in one embodiment, floating point and integer data may be stored in different registers or the same registers.

Figure 3A:
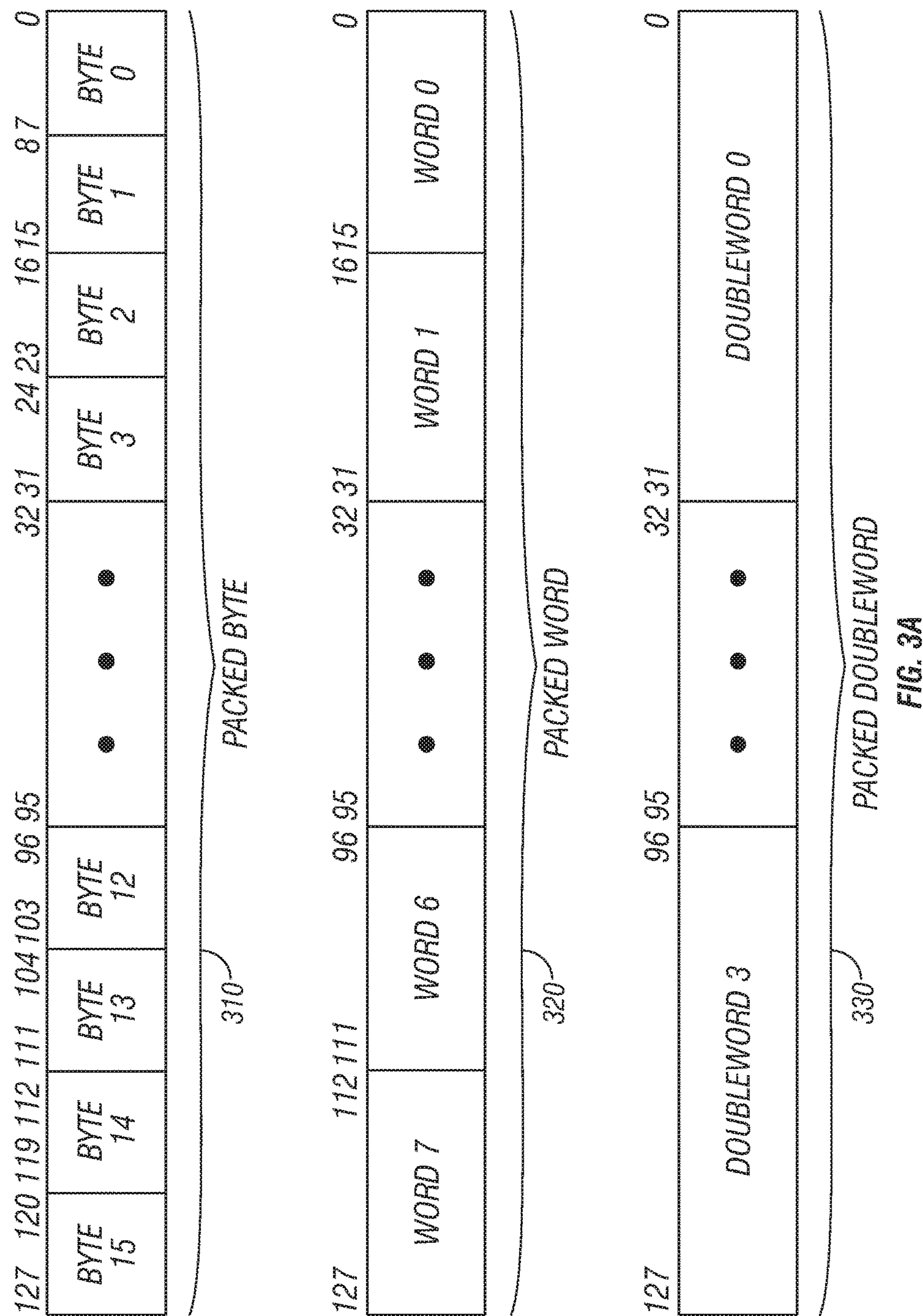
FIG. 3A illustrates various packed data type representations in multimedia registers, in accordance with embodiments of the present disclosure.

In the examples of the following figures, a number of data operands may be described. FIG. 3A illustrates various packed data type representations in multimedia registers, in accordance with embodiments of the present disclosure. FIG. 3A illustrates data types for a packed byte 310, a packed word 320, and a packed doubleword (dword) 330 for 128-bit wide operands. Packed byte format 310 of this example may be 128 bits long and contains sixteen packed byte data elements. A byte may be defined, for example, as eight bits of data. Information for each byte data element may be stored in bit 7 through bit 0 for byte 0, bit 15 through bit 8 for byte 1, bit 23 through bit 16 for byte 2, and finally bit 120 through bit 127 for byte 15. Thus, all available bits may be used in the register. This storage arrangement increases the storage efficiency of the processor. As well, with sixteen data elements accessed, one operation may now be performed on sixteen data elements in parallel.

Generally, a data element may include an individual piece of data that is stored in a single register or memory location with other data elements of the same length. In packed data sequences relating to SSEx technology, the number of data elements stored in a XMM register may be 128 bits divided by the length in bits of an individual data element. Similarly, in packed data sequences relating to MMX and SSE technology, the number of data elements stored in an MMX register may be 64 bits divided by the length in bits of an individual data element. Although the data types illustrated in FIG. 3A may be 128 bits long, embodiments of the present disclosure may also operate with 64-bit wide or other sized operands. Packed word format 320 of this example may be 128 bits long and contains eight packed word data elements. Each packed word contains sixteen bits of information. Packed doubleword format 330 of FIG. 3A may be 128 bits long and contains four packed doubleword data elements. Each packed doubleword data element contains thirty-two bits of information. A packed quadword may be 128 bits long and contain two packed quad-word data elements.

FIG. 3B illustrates possible in-register data storage formats, in accordance with embodiments of the present disclosure. Each packed data may include more than one independent data element. Three packed data formats are illustrated; packed half 341, packed single 342, and packed double 343. One embodiment of packed half 341, packed single 342, and packed double 343 contain fixed-point data elements. For another embodiment one or more of packed half 341, packed single 342, and packed double 343 may contain floating-point data elements. One embodiment of packed half 341 may be 128 bits long containing eight 16-bit data elements. One embodiment of packed single 342 may be 128 bits long and contains four 32-bit data elements. One embodiment of packed double 343 may be 128 bits long and contains two 64-bit data elements. It will be appreciated that such packed data formats may be further extended to other register lengths, for example, to 96-bits, 160-bits, 192-bits, 224-bits, 256-bits or more.

FIG. 3C illustrates various signed and unsigned packed data type representations in multimedia registers, in accordance with embodiments of the present disclosure. Unsigned packed byte representation 344 illustrates the storage of an unsigned packed byte in a SIMD register. Information for each byte data element may be stored in bit 7 through bit 0 for byte 0, bit 15 through bit 8 for byte 1, bit 23 through bit 16 for byte 2, and finally bit 120 through bit 127 for byte 15. Thus, all available bits may be used in the register. This storage arrangement may increase the storage efficiency of the processor. As well, with sixteen data elements accessed, one operation may now be performed on sixteen data elements in a parallel fashion. Signed packed byte representation 345 illustrates the storage of a signed packed byte. Note that the eighth bit of every byte data element may be the sign indicator. Unsigned packed word representation 346 illustrates how word seven through word zero may be stored in a SIMD register. Signed packed word representation 347 may be similar to the unsigned packed word in-register representation 346. Note that the sixteenth bit of each word data element may be the sign indicator. Unsigned packed doubleword representation 348 shows how doubleword data elements are stored. Signed packed doubleword representation 349 may be similar to unsigned packed doubleword in-register representation 348. Note that the necessary sign bit may be the thirty-second bit of each doubleword data element.

Figures 3D, 3E, 3F:
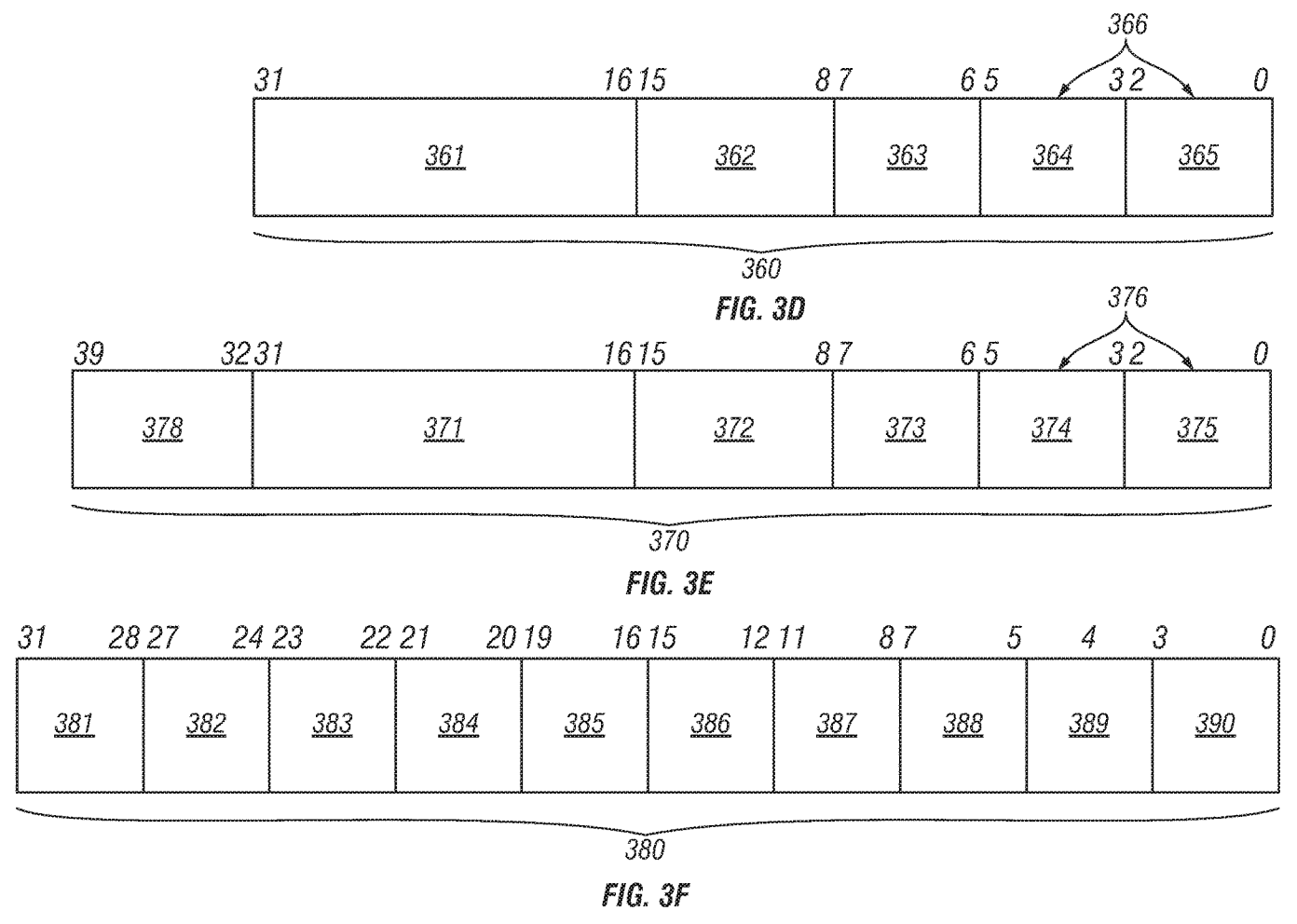

FIG. 3D illustrates an embodiment of an operation encoding (opcode). Furthermore, format 360 may include register/memory operand addressing modes corresponding with a type of opcode format described in the "IA-32 Intel Architecture Software Developer's Manual Volume 2: Instruction Set Reference," which is available from Intel Corporation, Santa Clara, Calif. on the world-wide-web (www) at intel.com/design/litcentr. In one embodiment, an instruction may be encoded by one or more of fields 361 and 362. Up to two operand locations per instruction may be identified, including up to two source operand identifiers 364 and 365. In one embodiment, destination operand identifier 366 may be the same as source operand identifier 364, whereas in other embodiments they may be different. In another embodiment, destination operand identifier 366 may be the same as source operand identifier 365, whereas in other embodiments they may be different. In one embodiment, one of the source operands identified by source operand identifiers 364 and 365 may be overwritten by the results of the text string comparison operations, whereas in other embodiments identifier 364 corresponds to a source register element and identifier 365 corresponds to a destination register element. In one embodiment, operand identifiers 364 and 365 may identify 32-bit or 64-bit source and destination operands.

FIG. 3E illustrates another possible operation encoding (opcode) format 370, having forty or more bits, in accordance with embodiments of the present disclosure. Opcode format 370 corresponds with opcode format 360 and comprises an optional prefix byte 378. An instruction according to one embodiment may be encoded by one or more of fields 378, 371, and 372. Up to two operand locations per instruction may be identified by source operand identifiers 374 and 375 and by prefix byte 378. In one embodiment, prefix byte 378 may be used to identify 32-bit or 64-bit source and destination operands. In one embodiment, destination operand identifier 376 may be the same as source operand identifier 374, whereas in other embodiments they may be different. For another embodiment, destination operand identifier 376 may be the same as source operand identifier 375, whereas in other embodiments they may be different. In one embodiment, an instruction operates on one or more of the operands identified by operand identifiers 374 and 375 and one or more operands identified by operand identifiers 374 and 375 may be overwritten by the results of the instruction, whereas in other embodiments, operands identified by identifiers 374 and 375 may be written to another data element in another register. Opcode formats 360 and 370 allow register to register, memory to register, register by memory, register by register, register by immediate, register to memory addressing specified in part by MOD fields 363 and 373 and by optional scale-index-base and displacement bytes.

FIG. 3F illustrates yet another possible operation encoding (opcode) format, in accordance with embodiments of the present disclosure. 64-bit single instruction multiple data (SIMD) arithmetic operations may be performed through a coprocessor data processing (CDP) instruction. Operation encoding (opcode) format 380 depicts one such CDP instruction having CDP opcode fields 382 and 389. The type of CDP instruction, for another embodiment, operations may be encoded by one or more of fields 383, 384, 387, and 388. Up to three operand locations per instruction may be identified, including up to two source operand identifiers 385 and 390 and one destination operand identifier 386. One embodiment of the coprocessor may operate on eight, sixteen, thirty-two, and 64-bit values. In one embodiment, an instruction may be performed on integer data elements. In some embodiments, an instruction may be executed conditionally, using condition field 381. For some embodiments, source data sizes may be encoded by field 383. In some embodiments, Zero (Z), negative (N), carry (C), and overflow (V) detection may be done on SIMD fields. For some instructions, the type of saturation may be encoded by field 384.

Figure 4A:
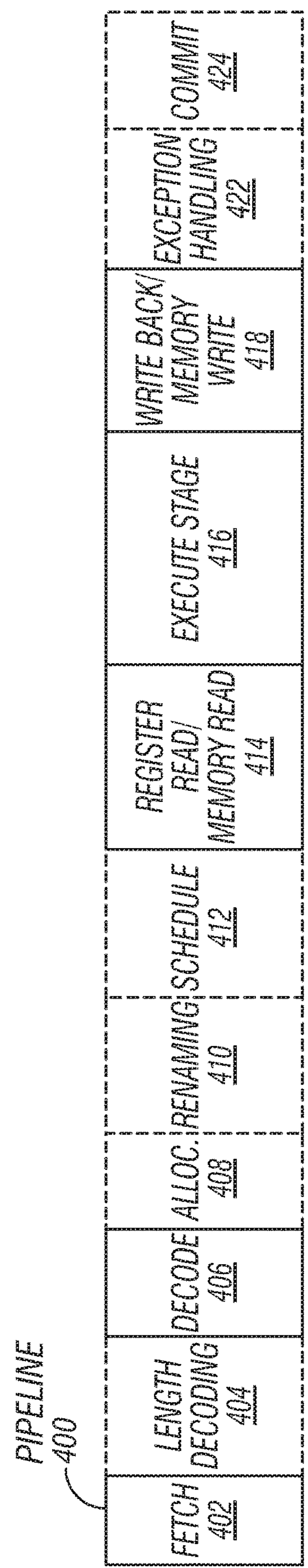
FIG. 4A is a block diagram illustrating an in-order pipeline and a register renaming stage, out-of-order issue/execution pipeline, in accordance with embodiments of the present disclosure.
Figure 4B:
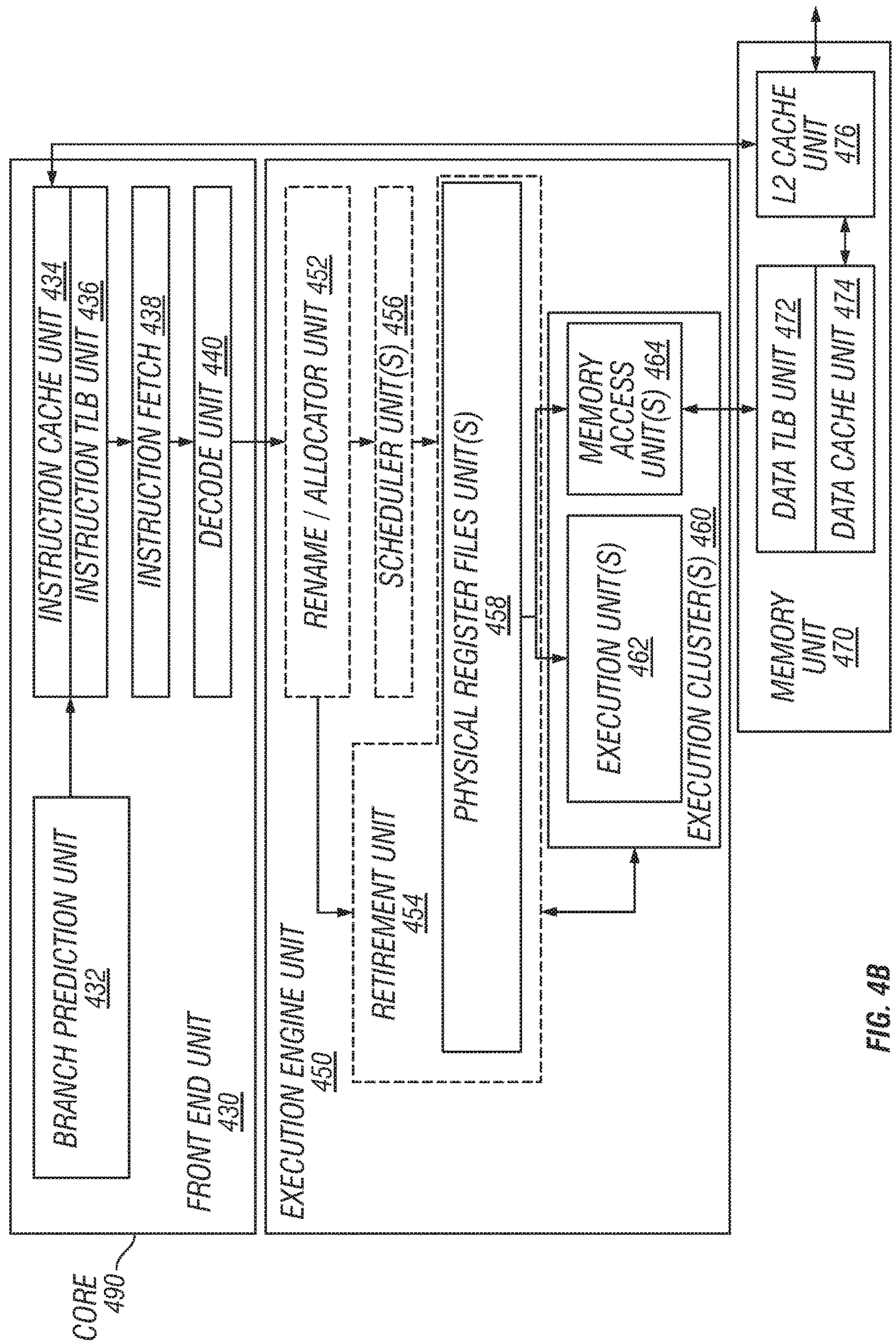
FIG. 4B is a block diagram illustrating an in-order architecture core and a register renaming logic, out-of-order issue/execution logic to be included in a processor, in accordance with embodiments of the present disclosure.

FIG. 4A is a block diagram illustrating an in-order pipeline and a register renaming stage, out-of-order issue/execution pipeline, in accordance with embodiments of the present disclosure. FIG. 4B is a block diagram illustrating an in-order architecture core and a register renaming logic, out-of-order issue/execution logic to be included in a processor, in accordance with embodiments of the present disclosure. The solid lined boxes in FIG. 4A illustrate the in-order pipeline, while the dashed lined boxes illustrates the register renaming, out-of-order issue/execution pipeline. Similarly, the solid lined boxes in FIG. 4B illustrate the in-order architecture logic, while the dashed lined boxes illustrates the register renaming logic and out-of-order issue/execution logic.

In FIG. 4A, a processor pipeline 400 may include a fetch stage 402, a length decode stage 404, a decode stage 406, an allocation stage 408, a renaming stage 410, a scheduling (also known as a dispatch or issue) stage 412, a register read/memory read stage 414, an execute stage 416, a write-back/memory-write stage 418, an exception handling stage 422, and a commit stage 424.

In FIG. 4B, arrows denote a coupling between two or more units and the direction of the arrow indicates a direction of data flow between those units. FIG. 4B shows processor core 490 including a front end unit 430 coupled to an execution engine unit 450, and both may be coupled to a memory unit 470.

Core 490 may be a reduced instruction set computing (RISC) core, a complex instruction set computing (CISC) core, a very long instruction word (VLIW) core, or a hybrid or alternative core type. In one embodiment, core 490 may be a special-purpose core, such as, for example, a network or communication core, compression engine, graphics core, or the like.

Front end unit 430 may include a branch prediction unit 432 coupled to an instruction cache unit 434. Instruction cache unit 434 may be coupled to an instruction translation lookaside buffer (TLB) 436. TLB 436 may be coupled to an instruction fetch unit 438, which is coupled to a decode unit 440. Decode unit 440 may decode instructions, and generate as an output one or more micro-operations, micro-code entry points, microinstructions, other instructions, or other control signals, which may be decoded from, or which otherwise reflect, or may be derived from, the original instructions. The decoder may be implemented using various different mechanisms. Examples of suitable mechanisms include, but are not limited to, look-up tables, hardware implementations, programmable logic arrays (PLAs), microcode read-only memories (ROMs), etc. In one embodiment, instruction cache unit 434 may be further coupled to a level 2 (L2) cache unit 476 in memory unit 470. Decode unit 440 may be coupled to a rename/allocator unit 452 in execution engine unit 450.

Execution engine unit 450 may include rename/allocator unit 452 coupled to a retirement unit 454 and a set of one or more scheduler units 456. Scheduler units 456 represent any number of different schedulers, including reservations stations, central instruction window, etc. Scheduler units 456 may be coupled to physical register file units 458. Each of physical register file units 458 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. Physical register file units 458 may be overlapped by retirement unit 454 to illustrate various ways in which register renaming and out-of-order execution may be implemented (e.g., using one or more reorder buffers and one or more retirement register files, using one or more future files, one or more history buffers, and one or more retirement register files; using register maps and a pool of registers; etc.). Generally, the architectural registers may be visible from the outside of the processor or from a programmer's perspective. The registers might not be limited to any known particular type of circuit. Various different types of registers may be suitable as long as they store and provide data as described herein. Examples of suitable registers include, but might not be limited to, dedicated physical registers, dynamically allocated physical registers using register renaming, combinations of dedicated and dynamically allocated physical registers, etc. Retirement unit 454 and physical register file units 458 may be coupled to execution clusters 460. Execution clusters 460 may include a set of one or more execution units 462 and a set of one or more memory access units 464. Execution units 462 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. Scheduler units 456, physical register file units 458, and execution clusters 460 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file unit, and/or execution cluster—and in the case of a separate memory access pipeline, certain embodiments may be implemented in which only the execution cluster of this pipeline has memory access units 464). It should also be understood that where separate pipelines are used, one or more of these pipelines may be out-of-order issue/execution and the rest in-order.

The set of memory access units 464 may be coupled to memory unit 470, which may include a data TLB unit 472 coupled to a data cache unit 474 coupled to a level 2 (L2) cache unit 476. In one exemplary embodiment, memory access units 464 may include a load unit, a store address unit, and a store data unit, each of which may be coupled to data TLB unit 472 in memory unit 470. L2 cache unit 476 may be coupled to one or more other levels of cache and eventually to a main memory.

By way of example, the exemplary register renaming, out-of-order issue/execution core architecture may implement pipeline 400 as follows: 1) instruction fetch 438 may perform fetch and length decoding stages 402 and 404; 2) decode unit 440 may perform decode stage 406; 3) rename/allocator unit 452 may perform allocation stage 408 and renaming stage 410; 4) scheduler units 456 may perform schedule stage 412; 5) physical register file units 458 and memory unit 470 may perform register read/memory read stage 414; execution cluster 460 may perform execute stage 416; 6) memory unit 470 and physical register file units 458 may perform write-back/memory-write stage 418; 7) various units may be involved in the performance of exception handling stage 422; and 8) retirement unit 454 and physical register file units 458 may perform commit stage 424.

Core 490 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.).

It should be understood that the core may support multithreading (executing two or more parallel sets of operations or threads) in a variety of manners. Multithreading support may be performed by, for example, including time sliced multithreading, simultaneous multithreading (where a single physical core provides a logical core for each of the threads that physical core is simultaneously multithreading), or a combination thereof. Such a combination may include, for example, time sliced fetching and decoding and simultaneous multithreading thereafter such as in the Intel® Hyperthreading technology.

While register renaming may be described in the context of out-of-order execution, it should be understood that register renaming may be used in an in-order architecture. While the illustrated embodiment of the processor may also include a separate instruction and data cache units 434/474 and a shared L2 cache unit 476, other embodiments may have a single internal cache for both instructions and data, such as, for example, a Level 1 (L1) internal cache, or multiple levels of internal cache. In some embodiments, the system may include a combination of an internal cache and an external cache that may be external to the core and/or the processor. In other embodiments, all of the caches may be external to the core and/or the processor.

Figure 5A:
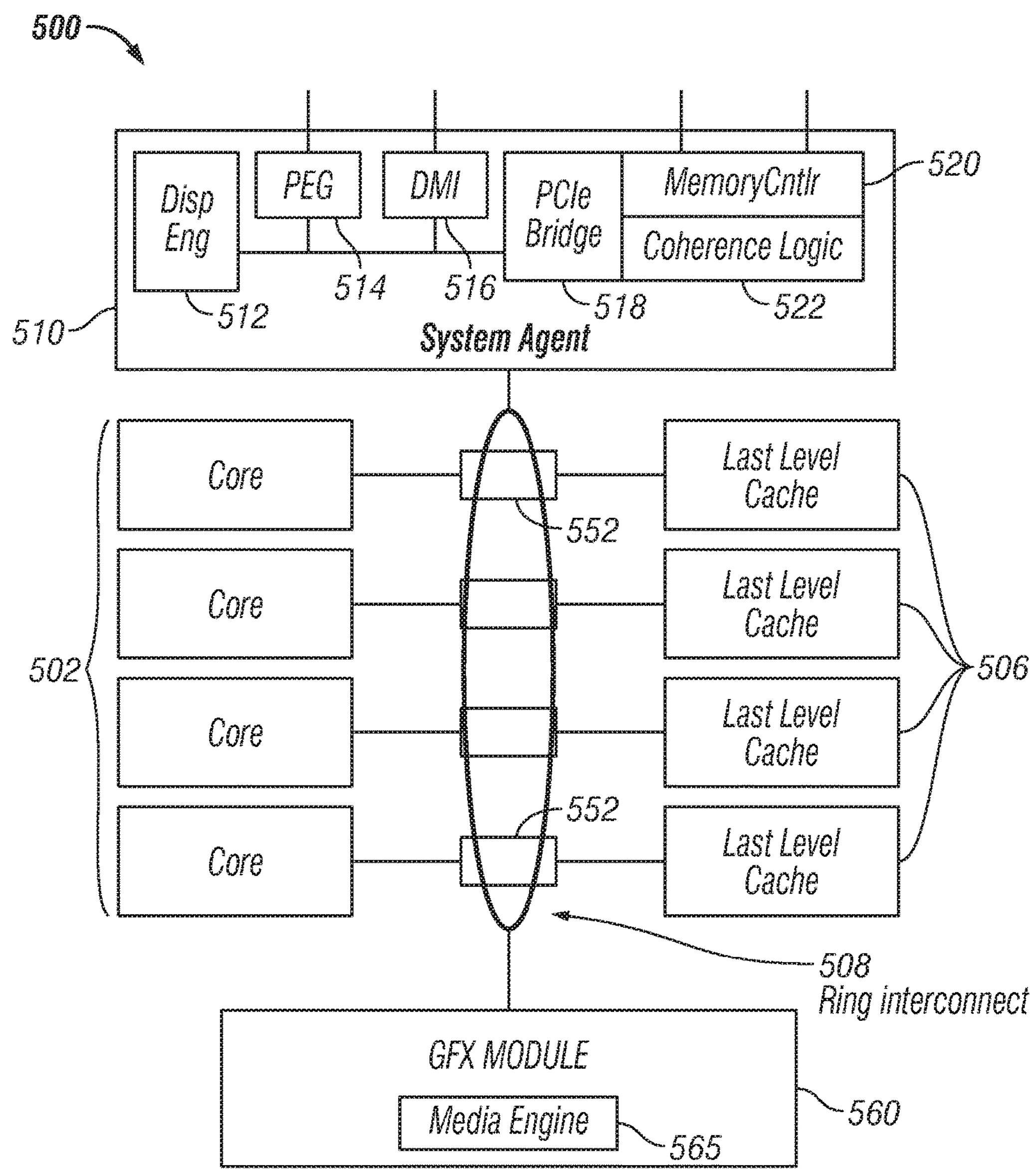
FIG. 5A is a block diagram of a processor, in accordance with embodiments of the present disclosure.

FIG. 5A is a block diagram of a processor 500, in accordance with embodiments of the present disclosure. In one embodiment, processor 500 may include a multicore processor. Processor 500 may include a system agent 510 communicatively coupled to one or more cores 502. Furthermore, cores 502 and system agent 510 may be communicatively coupled to one or more caches 506. Cores 502, system agent 510, and caches 506 may be communicatively coupled via one or more memory control units 552. Furthermore, cores 502, system agent 510, and caches 506 may be communicatively coupled to a graphics module 560 via memory control units 552.

Processor 500 may include any suitable mechanism for interconnecting cores 502, system agent 510, and caches 506, and graphics module 560. In one embodiment, processor 500 may include a ring-based interconnect unit 508 to interconnect cores 502, system agent 510, and caches 506, and graphics module 560. In other embodiments, processor 500 may include any number of well-known techniques for interconnecting such units. Ring-based interconnect unit 508 may utilize memory control units 552 to facilitate interconnections.

Processor 500 may include a memory hierarchy comprising one or more levels of caches within the cores, one or more shared cache units such as caches 506, or external memory (not shown) coupled to the set of integrated memory controller units 552. Caches 506 may include any suitable cache. In one embodiment, caches 506 may include one or more mid-level caches, such as level 2 (L2), level 3 (L3), level 4 (L4), or other levels of cache, a last level cache (LLC), and/or combinations thereof.

In various embodiments, one or more of cores 502 may perform multi-threading. System agent 510 may include components for coordinating and operating cores 502. System agent unit 510 may include for example a power control unit (PCU). The PCU may be or include logic and components needed for regulating the power state of cores 502. System agent 510 may include a display engine 512 for driving one or more externally connected displays or graphics module 560. System agent 510 may include an interface 514 for communications busses for graphics. In one embodiment, interface 514 may be implemented by PCI Express (PCIe). In a further embodiment, interface 514 may be implemented by PCI Express Graphics (PEG). System agent 510 may include a direct media interface (DMI) 516. DMI 516 may provide links between different bridges on a motherboard or other portion of a computer system. System agent 510 may include a PCIe bridge 518 for providing PCIe links to other elements of a computing system. PCIe bridge 518 may be implemented using a memory controller 520 and coherence logic 522.

Cores 502 may be implemented in any suitable manner. Cores 502 may be homogenous or heterogeneous in terms of architecture and/or instruction set. In one embodiment, some of cores 502 may be in-order while others may be out-of-order. In another embodiment, two or more of cores 502 may execute the same instruction set, while others may execute only a subset of that instruction set or a different instruction set.

Processor 500 may include a general-purpose processor, such as a Core™ i3, i5, i7, 2 Duo and Quad, Xeon™, Itanium™, XScale™ or StrongARM™ processor, which may be available from Intel Corporation, of Santa Clara, Calif. Processor 500 may be provided from another company, such as ARM Holdings, Ltd, MIPS, etc. Processor 500 may be a special-purpose processor, such as, for example, a network or communication processor, compression engine, graphics processor, co-processor, embedded processor, or the like. Processor 500 may be implemented on one or more chips. Processor 500 may be a part of and/or may be implemented on one or more substrates using any of a number of process technologies, such as, for example, BiCMOS, CMOS, or NMOS.

In one embodiment, a given one of caches 506 may be shared by multiple ones of cores 502. In another embodiment, a given one of caches 506 may be dedicated to one of cores 502. The assignment of caches 506 to cores 502 may be handled by a cache controller or other suitable mechanism. A given one of caches 506 may be shared by two or more cores 502 by implementing time-slices of a given cache 506.

Graphics module 560 may implement an integrated graphics processing subsystem. In one embodiment, graphics module 560 may include a graphics processor. Furthermore, graphics module 560 may include a media engine 565. Media engine 565 may provide media encoding and video decoding.

Figure 5B:
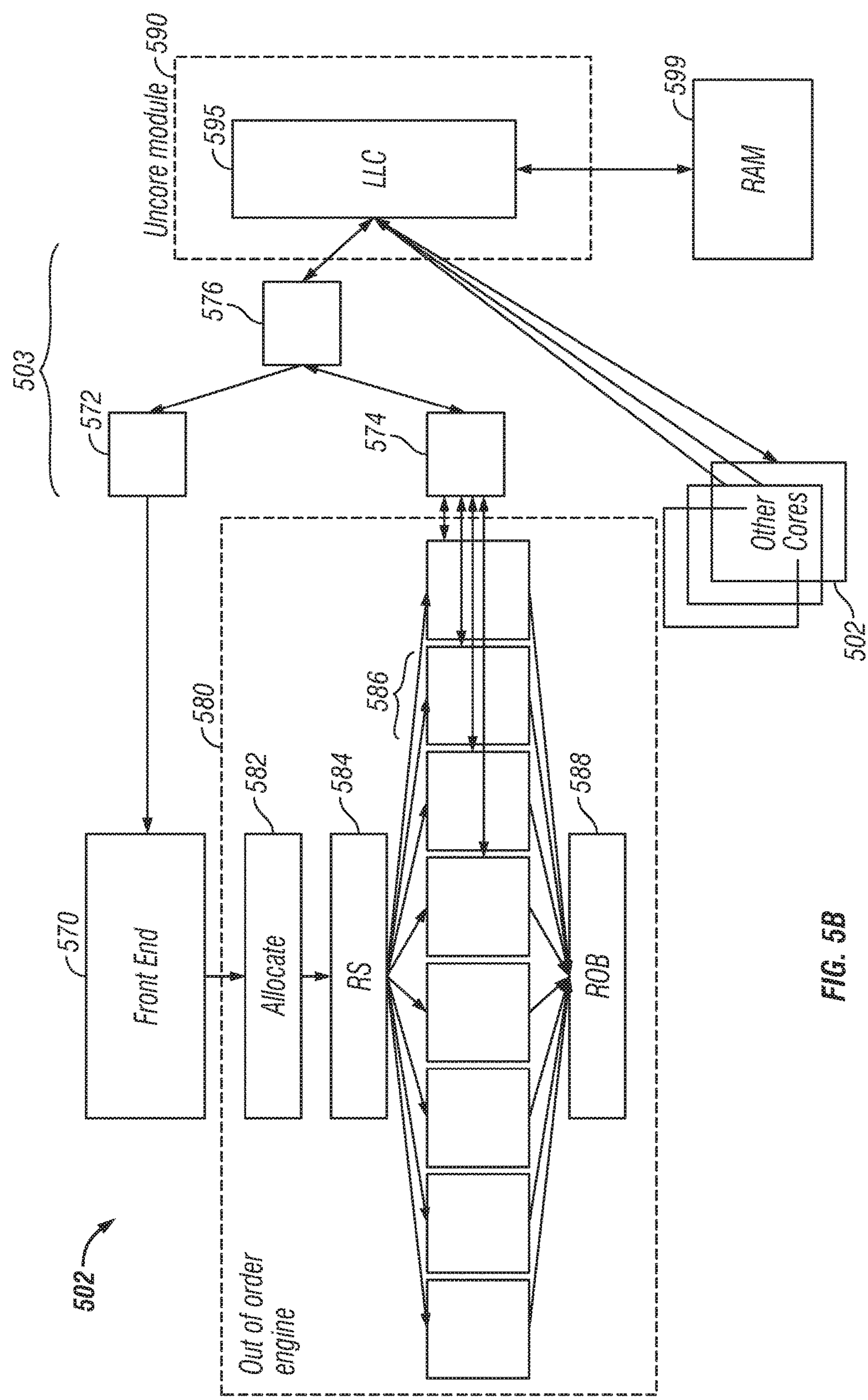
FIG. 5B is a block diagram of an example implementation of a core, in accordance with embodiments of the present disclosure.

FIG. 5B is a block diagram of an example implementation of a core 502, in accordance with embodiments of the present disclosure. Core 502 may include a front end 570 communicatively coupled to an out-of-order engine 580. Core 502 may be communicatively coupled to other portions of processor 500 through cache hierarchy 503.

Front end 570 may be implemented in any suitable manner, such as fully or in part by front end 201 as described above. In one embodiment, front end 570 may communicate with other portions of processor 500 through cache hierarchy 503. In a further embodiment, front end 570 may fetch instructions from portions of processor 500 and prepare the instructions to be used later in the processor pipeline as they are passed to out-of-order execution engine 580.

Out-of-order execution engine 580 may be implemented in any suitable manner, such as fully or in part by out-of-order execution engine 203 as described above. Out-of-order execution engine 580 may prepare instructions received from front end 570 for execution. Out-of-order execution engine 580 may include an allocate module 582. In one embodiment, allocate module 582 may allocate resources of processor 500 or other resources, such as registers or buffers, to execute a given instruction. Allocate module 582 may make allocations in schedulers, such as a memory scheduler, fast scheduler, or floating point scheduler. Such schedulers may be represented in FIG. 5B by resource schedulers 584. Allocate module 582 may be implemented fully or in part by the allocation logic described in conjunction with FIG. 2. Resource schedulers 584 may determine when an instruction is ready to execute based on the readiness of a given resource's sources and the availability of execution resources needed to execute an instruction. Resource schedulers 584 may be implemented by, for example, schedulers 202, 204, 206 as discussed above. Resource schedulers 584 may schedule the execution of instructions upon one or more resources. In one embodiment, such resources may be internal to core 502, and may be illustrated, for example, as resources 586. In another embodiment, such resources may be external to core 502 and may be accessible by, for example, cache hierarchy 503. Resources may include, for example, memory, caches, register files, or registers. Resources internal to core 502 may be represented by resources 586 in FIG. 5B. As necessary, values written to or read from resources 586 may be coordinated with other portions of processor 500 through, for example, cache hierarchy 503. As instructions are assigned resources, they may be placed into a reorder buffer 588. Reorder buffer 588 may track instructions as they are executed and may selectively reorder their execution based upon any suitable criteria of processor 500. In one embodiment, reorder buffer 588 may identify instructions or a series of instructions that may be executed independently. Such instructions or a series of instructions may be executed in parallel from other such instructions. Parallel execution in core 502 may be performed by any suitable number of separate execution blocks or virtual processors. In one embodiment, shared resources—such as memory, registers, and caches—may be accessible to multiple virtual processors within a given core 502. In other embodiments, shared resources may be accessible to multiple processing entities within processor 500.

Cache hierarchy 503 may be implemented in any suitable manner. For example, cache hierarchy 503 may include one or more lower or mid-level caches, such as caches 572, 574. In one embodiment, cache hierarchy 503 may include an LLC 595 communicatively coupled to caches 572, 574. In another embodiment, LLC 595 may be implemented in a module 590 accessible to all processing entities of processor 500. In a further embodiment, module 590 may be implemented in an uncore module of processors from Intel, Inc. Module 590 may include portions or subsystems of processor 500 necessary for the execution of core 502 but might not be implemented within core 502. Besides LLC 595, Module 590 may include, for example, hardware interfaces, memory coherency coordinators, interprocessor interconnects, instruction pipelines, or memory controllers. Access to RAM 599 available to processor 500 may be made through module 590 and, more specifically, LLC 595. Furthermore, other instances of core 502 may similarly access module 590. Coordination of the instances of core 502 may be facilitated in part through module 590.

Figure 6:
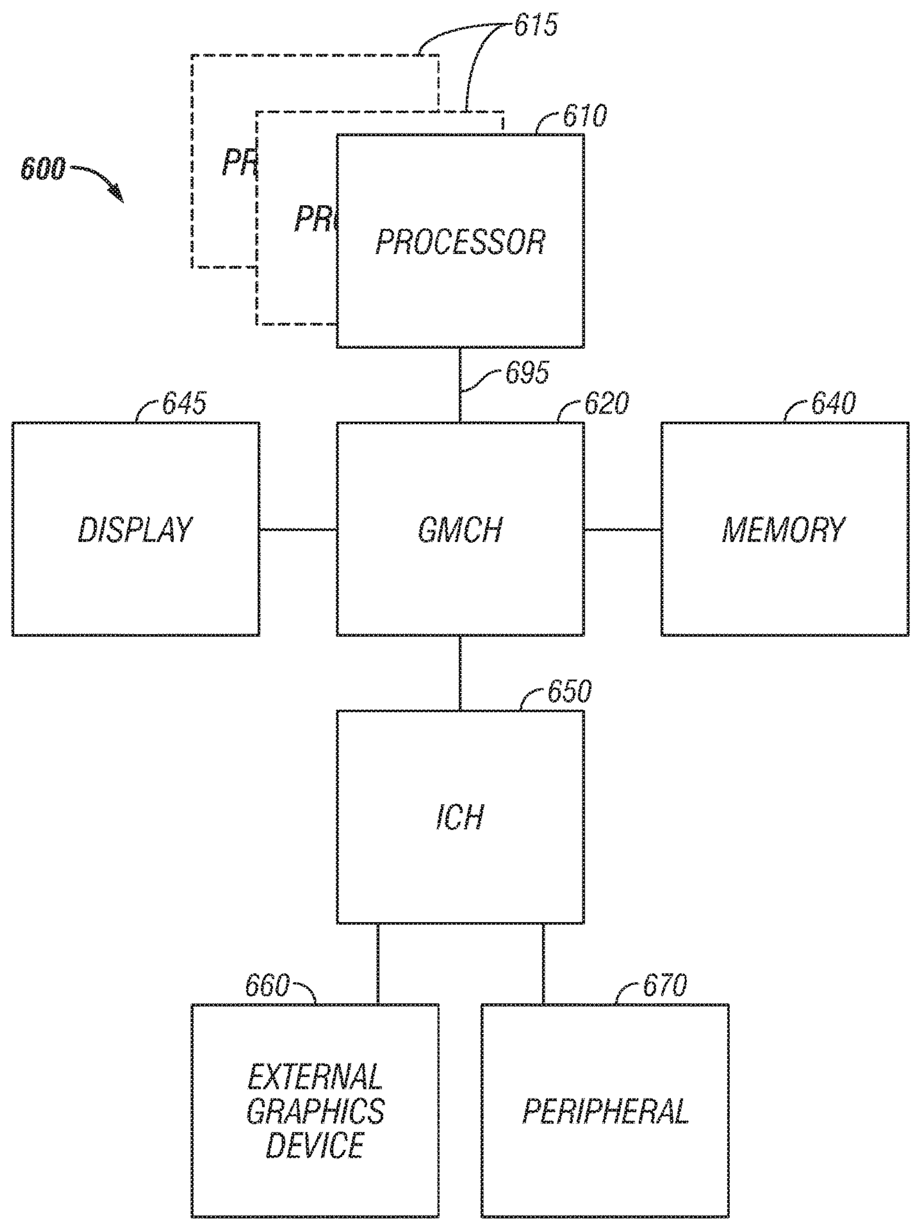
FIG. 6 is a block diagram of a system, in accordance with embodiments of the present disclosure.
Figure 7:
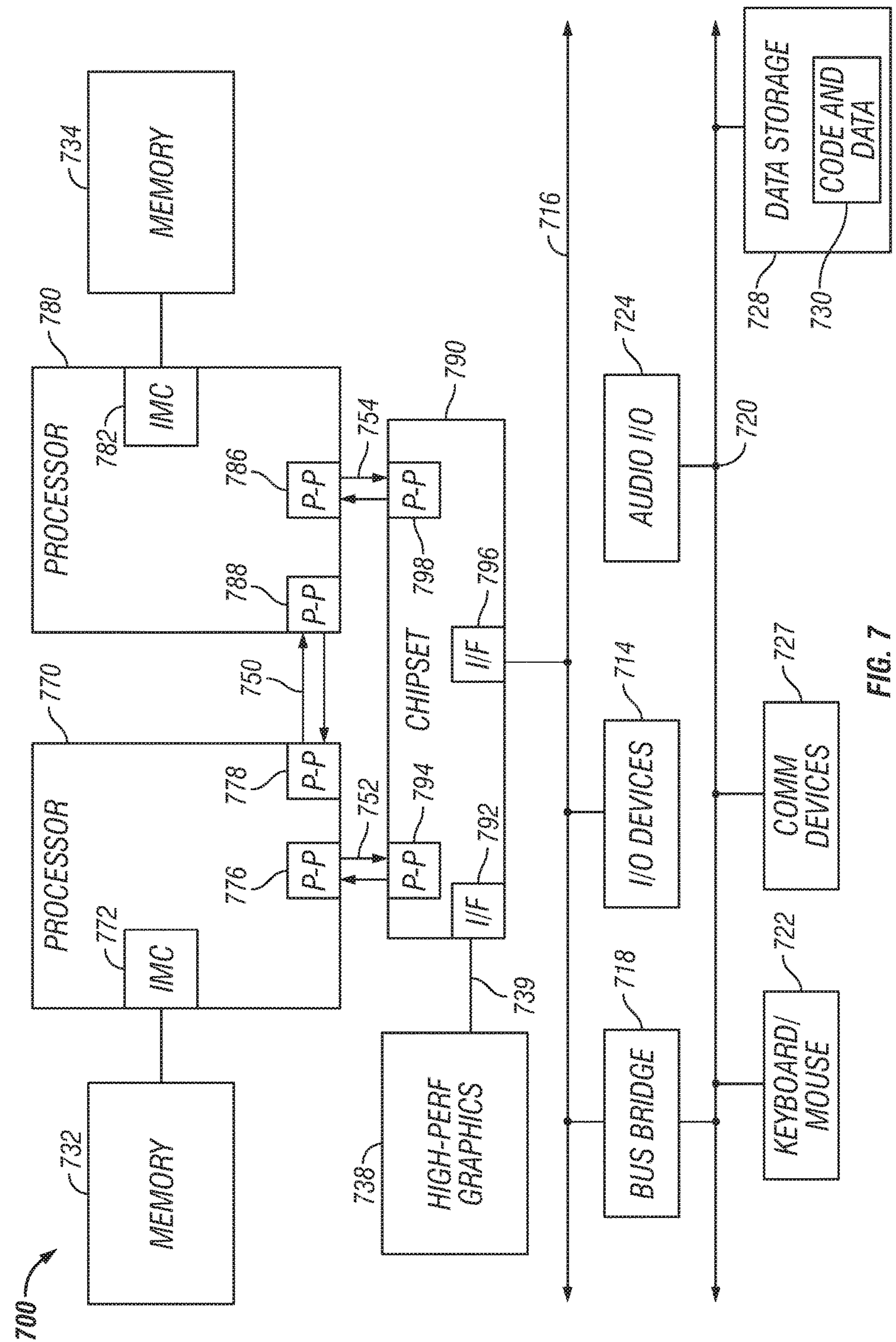
FIG. 7 is a block diagram of a second system, in accordance with embodiments of the present disclosure.
Figure 8:
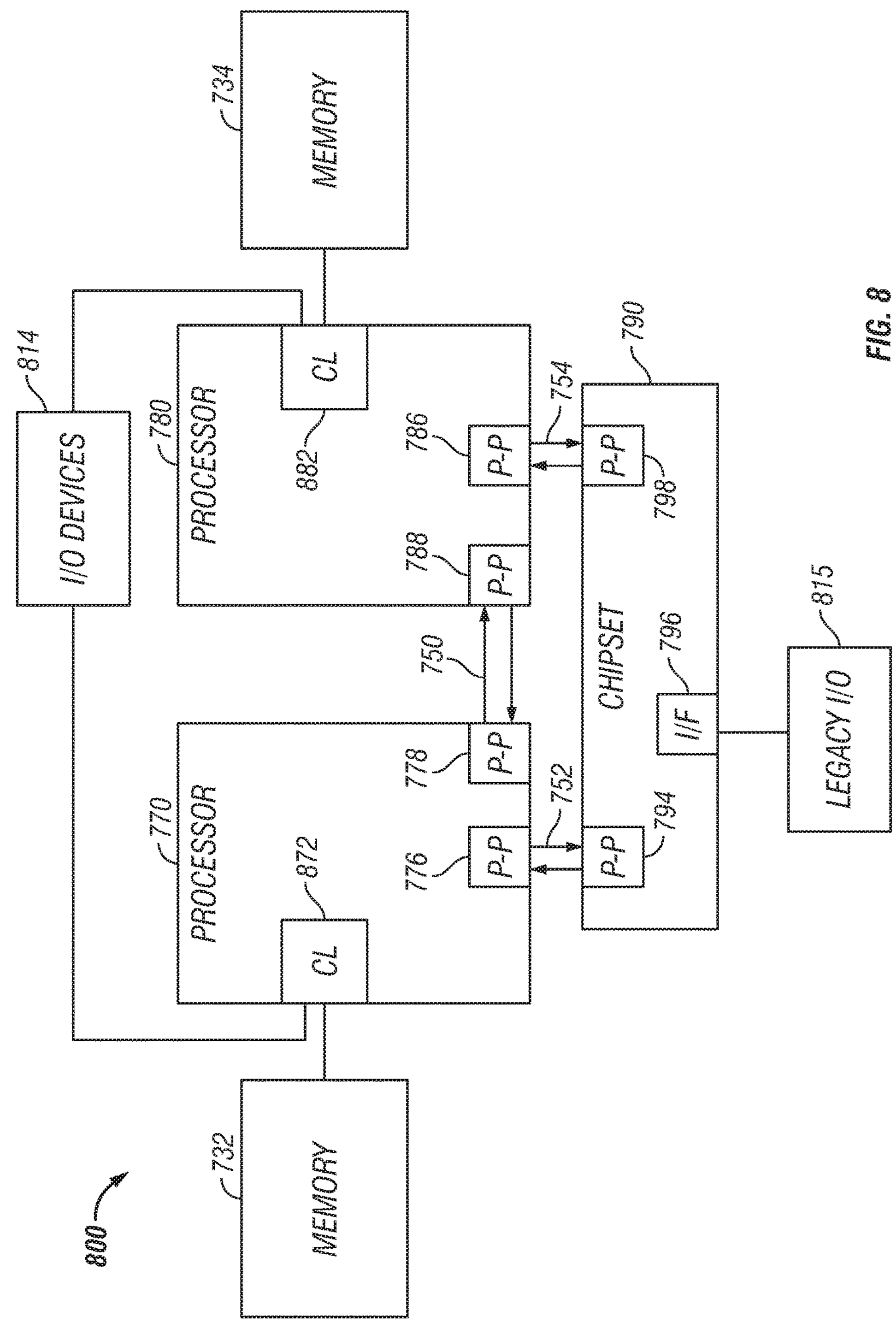
FIG. 8 is a block diagram of a third system in accordance with embodiments of the present disclosure.
Figure 9:
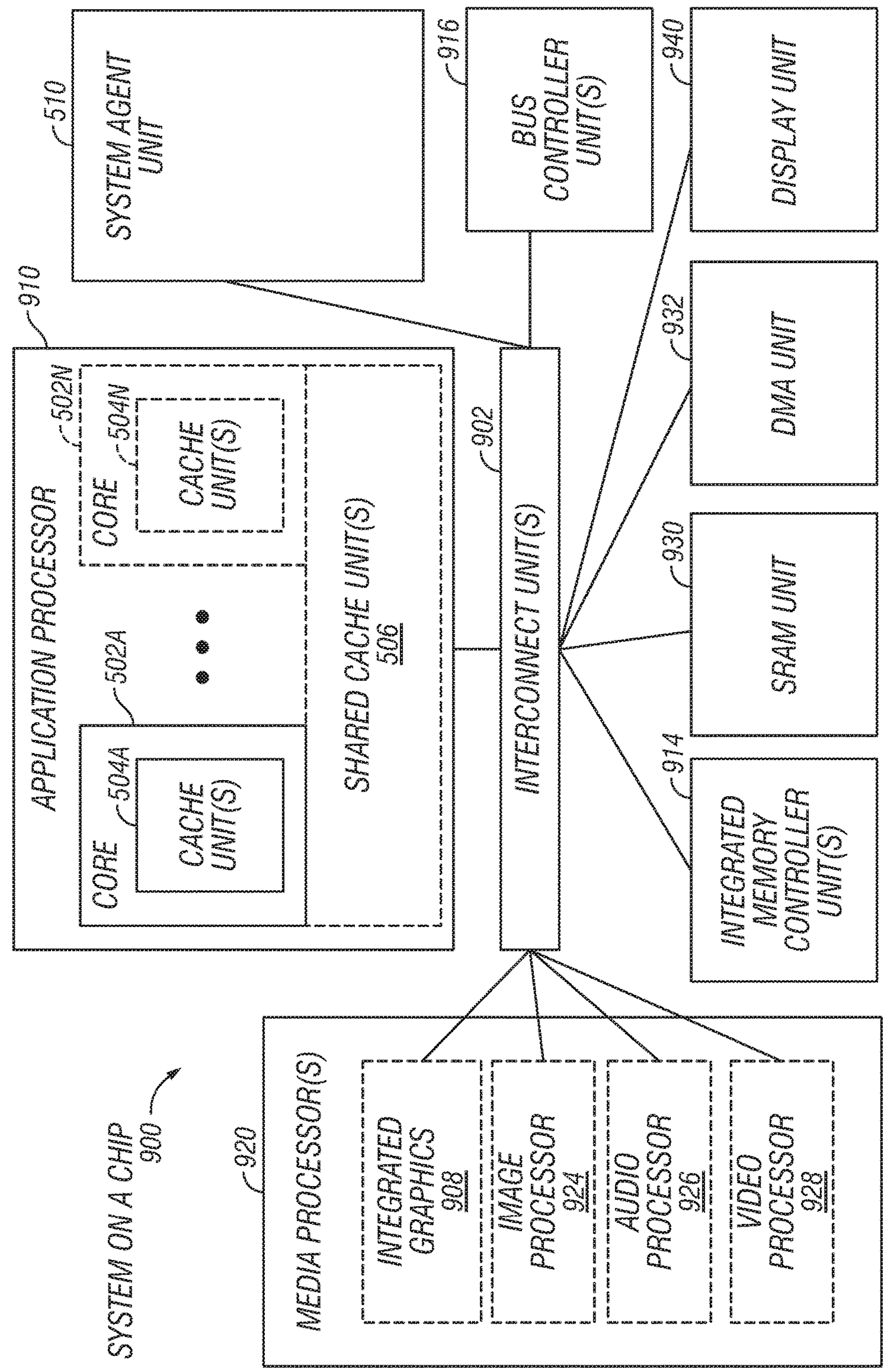
FIG. 9 is a block diagram of a system-on-a-chip, in accordance with embodiments of the present disclosure.

FIGS. 6-8 may illustrate exemplary systems suitable for including processor 500, while FIG. 9 may illustrate an exemplary system on a chip (SoC) that may include one or more of cores 502. Other system designs and implementations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, may also be suitable. In general, a huge variety of systems or electronic devices that incorporate a processor and/or other execution logic as disclosed herein may be generally suitable.

FIG. 6 illustrates a block diagram of a system 600, in accordance with embodiments of the present disclosure. System 600 may include one or more processors 610, 615, which may be coupled to graphics memory controller hub (GMCH) 620. The optional nature of additional processors 615 is denoted in FIG. 6 with broken lines.

Each processor 610,615 may be some version of processor 500. However, it should be noted that integrated graphics logic and integrated memory control units might not exist in processors 610,615. FIG. 6 illustrates that GMCH 620 may be coupled to a memory 640 that may be, for example, a dynamic random access memory (DRAM). The DRAM may, for at least one embodiment, be associated with a non-volatile cache.

GMCH 620 may be a chipset, or a portion of a chipset. GMCH 620 may communicate with processors 610, 615 and control interaction between processors 610, 615 and memory 640. GMCH 620 may also act as an accelerated bus interface between the processors 610, 615 and other elements of system 600. In one embodiment, GMCH 620 communicates with processors 610, 615 via a multi-drop bus, such as a frontside bus (FSB) 695.

Furthermore, GMCH 620 may be coupled to a display 645 (such as a flat panel display). In one embodiment, GMCH 620 may include an integrated graphics accelerator. GMCH 620 may be further coupled to an input/output (I/O) controller hub (ICH) 650, which may be used to couple various peripheral devices to system 600. External graphics device 660 may include a discrete graphics device coupled to ICH 650 along with another peripheral device 670.

In other embodiments, additional or different processors may also be present in system 600. For example, additional processors 610, 615 may include additional processors that may be the same as processor 610, additional processors that may be heterogeneous or asymmetric to processor 610, accelerators (such as, e.g., graphics accelerators or digital signal processing (DSP) units), field programmable gate arrays, or any other processor. There may be a variety of differences between the physical resources 610, 615 in terms of a spectrum of metrics of merit including architectural, micro-architectural, thermal, power consumption characteristics, and the like. These differences may effectively manifest themselves as asymmetry and heterogeneity amongst processors 610, 615. For at least one embodiment, various processors 610, 615 may reside in the same die package.

FIG. 7 illustrates a block diagram of a second system 700, in accordance with embodiments of the present disclosure. As shown in FIG. 7, multiprocessor system 700 may include a point-to-point interconnect system, and may include a first processor 770 and a second processor 780 coupled via a point-to-point interconnect 750. Each of processors 770 and 780 may be some version of processor 500 as one or more of processors 610,615.

While FIG. 7 may illustrate two processors 770, 780, it is to be understood that the scope of the present disclosure is not so limited. In other embodiments, one or more additional processors may be present in a given processor.

Processors 770 and 780 are shown including integrated memory controller units 772 and 782, respectively. Processor 770 may also include as part of its bus controller units point-to-point (P-P) interfaces 776 and 778; similarly, second processor 780 may include P-P interfaces 786 and 788. Processors 770, 780 may exchange information via a point-to-point (P-P) interface 750 using P-P interface circuits 778, 788. As shown in FIG. 7, IMCs 772 and 782 may couple the processors to respective memories, namely a memory 732 and a memory 734, which in one embodiment may be portions of main memory locally attached to the respective processors.

Processors 770, 780 may each exchange information with a chipset 790 via individual P-P interfaces 752, 754 using point to point interface circuits 776, 794, 786, 798. In one embodiment, chipset 790 may also exchange information with a high-performance graphics circuit 738 via a high-performance graphics interface 739.

A shared cache (not shown) may be included in either processor or outside of both processors, yet connected with the processors via P-P interconnect, such that either or both processors' local cache information may be stored in the shared cache if a processor is placed into a low power mode.

Chipset 790 may be coupled to a first bus 716 via an interface 796. In one embodiment, first bus 716 may be a Peripheral Component Interconnect (PCI) bus, or a bus such as a PCI Express bus or another third generation I/O interconnect bus, although the scope of the present disclosure is not so limited.

As shown in FIG. 7, various I/O devices 714 may be coupled to first bus 716, along with a bus bridge 718 which couples first bus 716 to a second bus 720. In one embodiment, second bus 720 may be a low pin count (LPC) bus. Various devices may be coupled to second bus 720 including, for example, a keyboard and/or mouse 722, communication devices 727 and a storage unit 728 such as a disk drive or other mass storage device which may include instructions/code and data 730, in one embodiment. Further, an audio I/O 724 may be coupled to second bus 720. Note that other architectures may be possible. For example, instead of the point-to-point architecture of FIG. 7, a system may implement a multi-drop bus or other such architecture.

FIG. 8 illustrates a block diagram of a third system 800 in accordance with embodiments of the present disclosure. Like elements in FIGS. 7 and 8 bear like reference numerals, and certain aspects of FIG. 7 have been omitted from FIG. 8 in order to avoid obscuring other aspects of FIG. 8.

FIG. 8 illustrates that processors 770, 780 may include integrated memory and I/O control logic ("CL") 872 and 882, respectively. For at least one embodiment, CL 872, 882 may include integrated memory controller units such as that described above in connection with FIGS. 5 and 7. In addition. CL 872, 882 may also include I/O control logic. FIG. 8 illustrates that not only memories 732, 734 may be coupled to CL 872, 882, but also that I/O devices 814 may also be coupled to control logic 872, 882. Legacy I/O devices 815 may be coupled to chipset 790.

FIG. 9 illustrates a block diagram of a SoC 900, in accordance with embodiments of the present disclosure. Similar elements in FIG. 5 bear like reference numerals. Also, dashed lined boxes may represent optional features on more advanced SoCs. An interconnect units 902 may be coupled to: an application processor 910 which may include a set of one or more cores 502A-N and shared cache units 506; a system agent unit 510; a bus controller units 916; an integrated memory controller units 914; a set or one or more media processors 920 which may include integrated graphics logic 908, an image processor 924 for providing still and/or video camera functionality, an audio processor 926 for providing hardware audio acceleration, and a video processor 928 for providing video encode/decode acceleration; an static random access memory (SRAM) unit 930; a direct memory access (DMA) unit 932; and a display unit 940 for coupling to one or more external displays.

Figure 10:
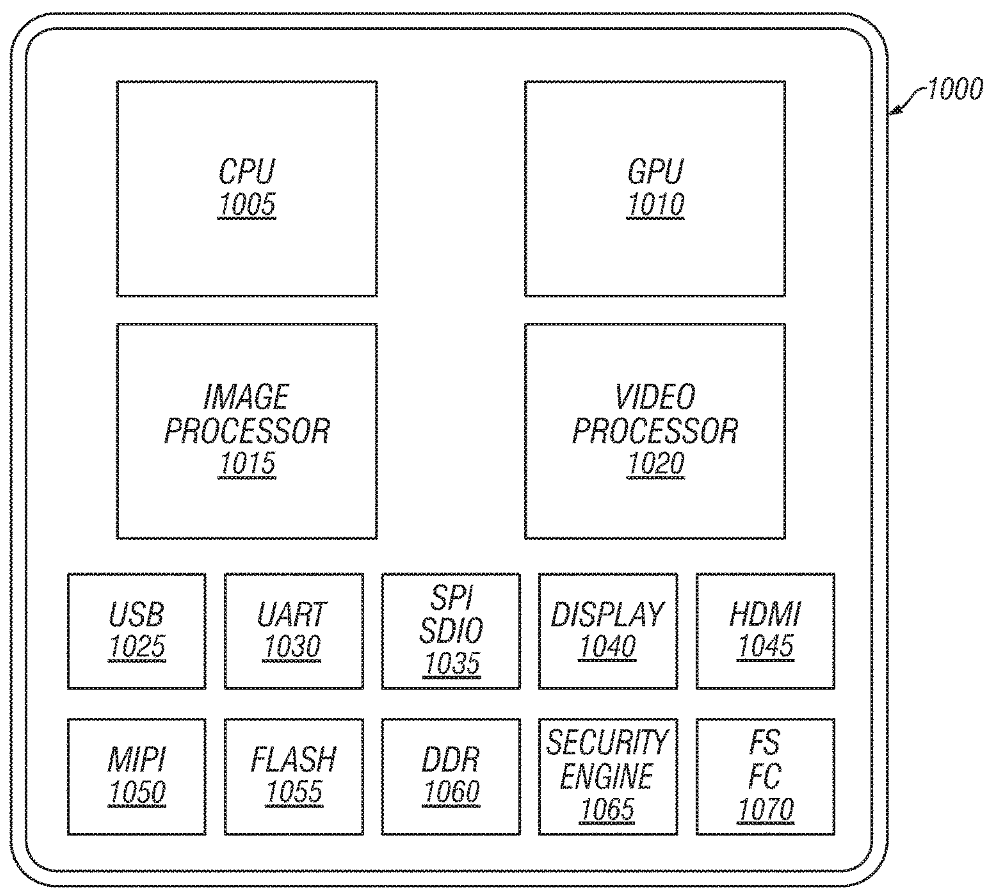
FIG. 10 illustrates a processor containing a central processing unit and a graphics processing unit which may perform at least one instruction, in accordance with embodiments of the present disclosure.

FIG. 10 illustrates a processor containing a central processing unit (CPU) and a graphics processing unit (GPU), which may perform at least one instruction, in accordance with embodiments of the present disclosure. In one embodiment, an instruction to perform operations according to at least one embodiment could be performed by the CPU. In another embodiment, the instruction could be performed by the GPU. In still another embodiment, the instruction may be performed through a combination of operations performed by the GPU and the CPU. For example, in one embodiment, an instruction in accordance with one embodiment may be received and decoded for execution on the GPU. However, one or more operations within the decoded instruction may be performed by a CPU and the result returned to the GPU for final retirement of the instruction. Conversely, in some embodiments, the CPU may act as the primary processor and the GPU as the co-processor.

In some embodiments, instructions that benefit from highly parallel, throughput processors may be performed by the GPU, while instructions that benefit from the performance of processors that benefit from deeply pipelined architectures may be performed by the CPU. For example, graphics, scientific applications, financial applications and other parallel workloads may benefit from the performance of the GPU and be executed accordingly, whereas more sequential applications, such as operating system kernel or application code may be better suited for the CPU.

In FIG. 10, processor 1000 includes a CPU 1005, GPU 1010, image processor 1015, video processor 1020, USB controller 1025, UART controller 1030, SPI/SDIO controller 1035, display device 1040, memory interface controller 1045, MIPI controller 1050, flash memory controller 1055, dual data rate (DDR) controller 1060, security engine 1065, and $I^2S/I^2C$ controller 1070. Other logic and circuits may be included in the processor of FIG. 10, including more CPUs or GPUs and other peripheral interface controllers.

One or more aspects of at least one embodiment may be implemented by representative data stored on a machine-readable medium which represents various logic within the processor, which when read by a machine causes the machine to fabricate logic to perform the techniques described herein. Such representations, known as "IP cores" may be stored on a tangible, machine-readable medium ("tape") and supplied to various customers or manufacturing facilities to load into the fabrication machines that actually make the logic or processor. For example, IP cores, such as the Cortex™ family of processors developed by ARM Holdings, Ltd. and Loongson IP cores developed the Institute of Computing Technology (ICT) of the Chinese Academy of Sciences may be licensed or sold to various customers or licensees, such as Texas Instruments, Qualcomm, Apple, or Samsung and implemented in processors produced by these customers or licensees.

Figure 11:
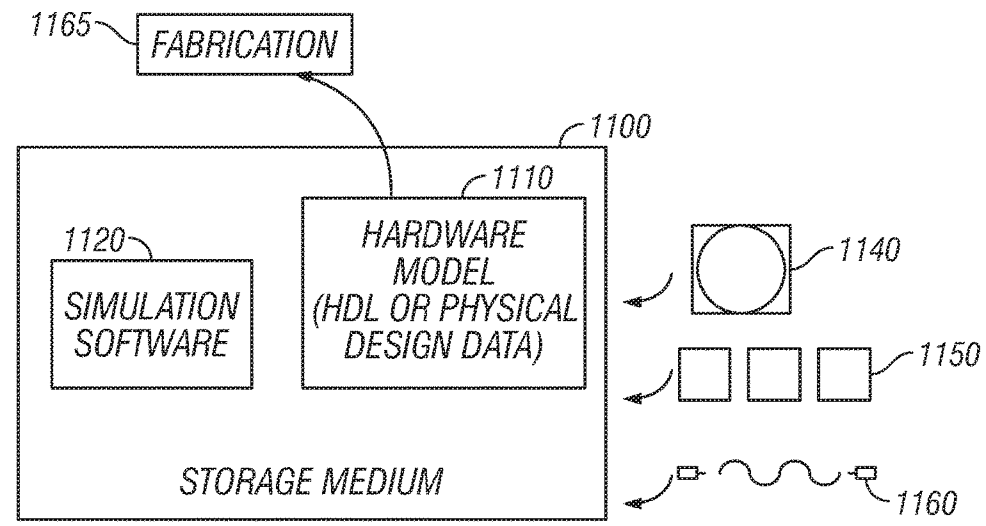
FIG. 11 is a block diagram illustrating the development of IP cores, in accordance with embodiments of the present disclosure.

FIG. 11 illustrates a block diagram illustrating the development of IP cores, in accordance with embodiments of the present disclosure. Storage 1100 may include simulation software 1120 and/or hardware or software model 1110. In one embodiment, the data representing the IP core design may be provided to storage 1100 via memory 1140 (e.g., hard disk), wired connection (e.g., internet) 1150 or wireless connection 1160. The IP core information generated by the simulation tool and model may then be transmitted to a fabrication facility 1165 where it may be fabricated by a $3^{rd}$ party to perform at least one instruction in accordance with at least one embodiment.

In some embodiments, one or more instructions may correspond to a first type or architecture (e.g., x86) and be translated or emulated on a processor of a different type or architecture (e.g., ARM). An instruction, according to one embodiment, may therefore be performed on any processor or processor type, including ARM, x86, MIPS, a GPU, or other processor type or architecture.

Figure 12:
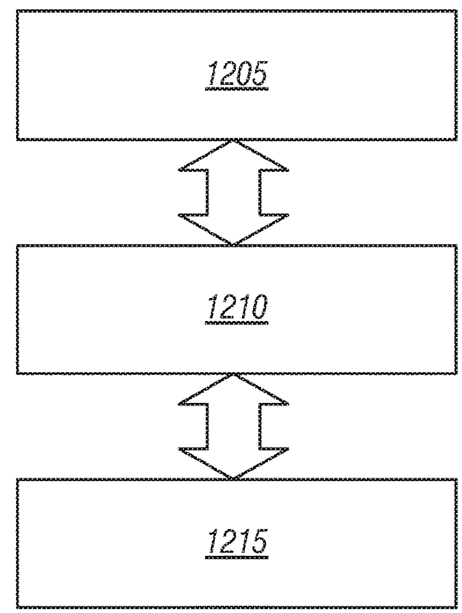
FIG. 12 illustrates how an instruction of a first type may be emulated by a processor of a different type, in accordance with embodiments of the present disclosure.

FIG. 12 illustrates how an instruction of a first type may be emulated by a processor of a different type, in accordance with embodiments of the present disclosure. In FIG. 12, program 1205 contains some instructions that may perform the same or substantially the same function as an instruction according to one embodiment. However the instructions of program 1205 may be of a type and/or format that is different from or incompatible with processor 1215, meaning the instructions of the type in program 1205 may not be able to execute natively by the processor 1215. However, with the help of emulation logic, 1210, the instructions of program 1205 may be translated into instructions that may be natively be executed by the processor 1215. In one embodiment, the emulation logic may be embodied in hardware. In another embodiment, the emulation logic may be embodied in a tangible, machine-readable medium containing software to translate instructions of the type in program 1205 into the type natively executable by processor 1215. In other embodiments, emulation logic may be a combination of fixed-function or programmable hardware and a program stored on a tangible, machine-readable medium. In one embodiment, the processor contains the emulation logic, whereas in other embodiments, the emulation logic exists outside of the processor and may be provided by a third party. In one embodiment, the processor may load the emulation logic embodied in a tangible, machine-readable medium containing software by executing microcode or firmware contained in or associated with the processor.

Figure 13:
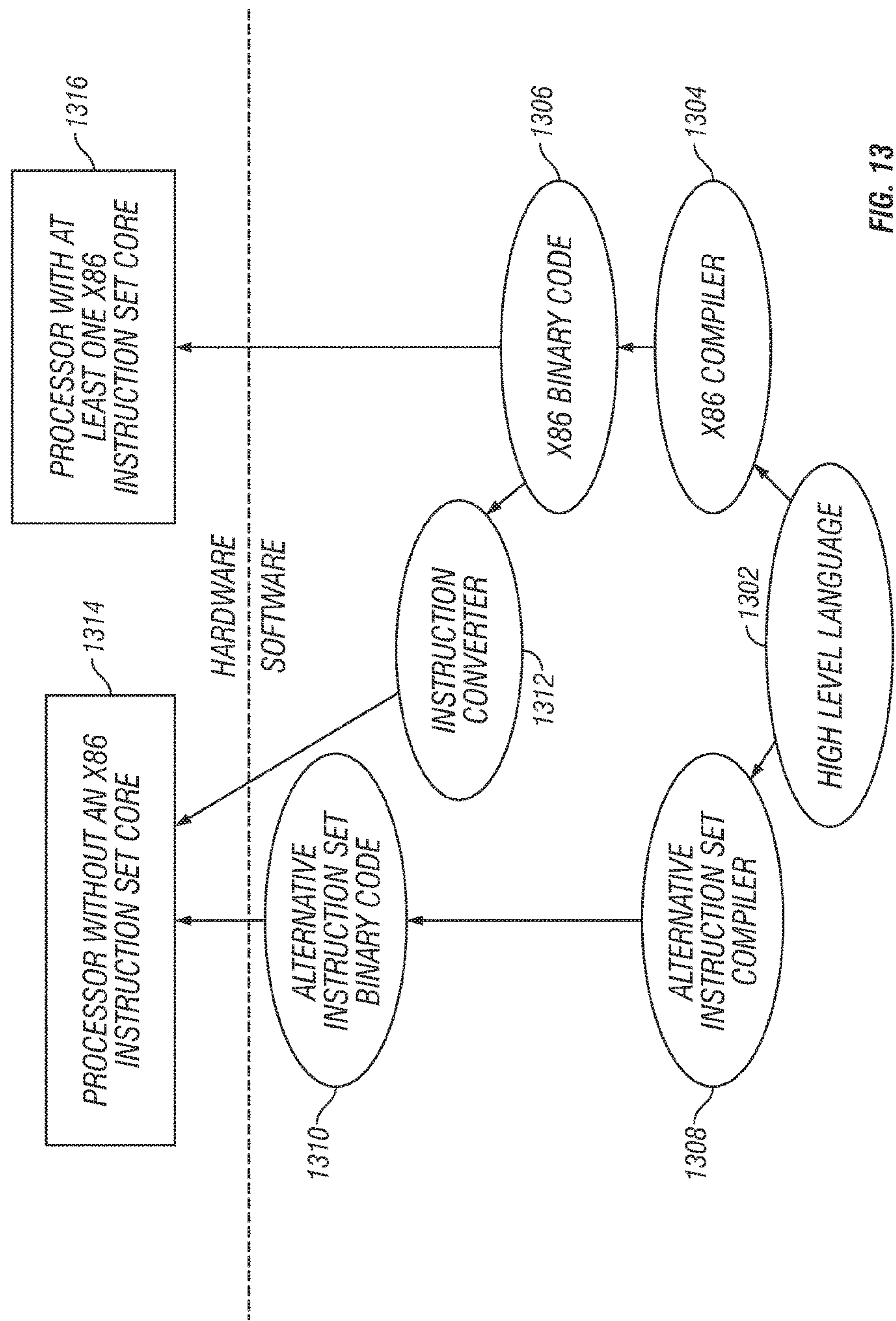
FIG. 13 illustrates a block diagram contrasting the use of a software instruction converter to convert binary instructions in a source instruction set to binary instructions in a target instruction set, in accordance with embodiments of the present disclosure.

FIG. 13 illustrates a block diagram contrasting the use of a software instruction converter to convert binary instructions in a source instruction set to binary instructions in a target instruction set, in accordance with embodiments of the present disclosure. In the illustrated embodiment, the instruction converter may be a software instruction converter, although the instruction converter may be implemented in software, firmware, hardware, or various combinations thereof. FIG. 13 shows a program in a high level language 1302 may be compiled using an x86 compiler 1304 to generate x86 binary code 1306 that may be natively executed by a processor with at least one x86 instruction set core 1316. The processor with at least one x86 instruction set core 1316 represents any processor that may perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. x86 compiler 1304 represents a compiler that may be operable to generate x86 binary code 1306 (e.g., object code) that may, with or without additional linkage processing, be executed on the processor with at least one x86 instruction set core 1316. Similarly, FIG. 13 shows the program in high level language 1302 may be compiled using an alternative instruction set compiler 1308 to generate alternative instruction set binary code 1310 that may be natively executed by a processor without at least one x86 instruction set core 1314 (e.g., a processor with cores that execute the MIPS instruction set of MIPS Technologies of Sunnyvale, Calif. and/or that execute the ARM instruction set of ARM Holdings of Sunnyvale, Calif.). Instruction converter 1312 may be used to convert x86 binary code 1306 into code that may be natively executed by the processor without an x86 instruction set core 1314. This converted code might not be the same as alternative instruction set binary code 1310; however, the converted code will accomplish the general operation and be made up of instructions from the alternative instruction set. Thus, instruction converter 1312 represents software, firmware, hardware, or a combination thereof that, through emulation, simulation or any other process, allows a processor or other electronic device that does not have an x86 instruction set processor or core to execute x86 binary code 1306.

Figure 14:
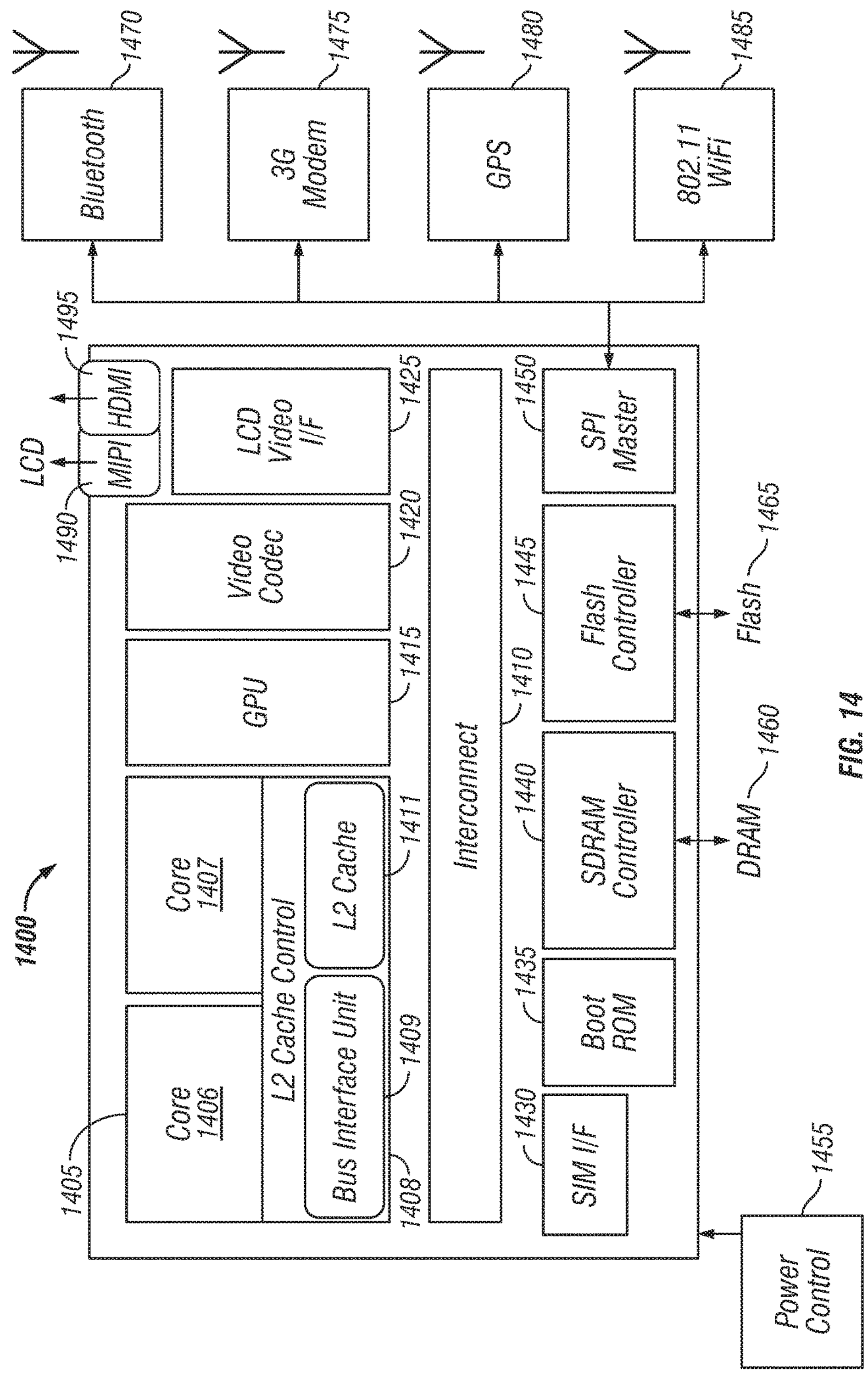
FIG. 14 is a block diagram of an instruction set architecture of a processor, in accordance with embodiments of the present disclosure.

FIG. 14 is a block diagram of an instruction set architecture 1400 of a processor, in accordance with embodiments of the present disclosure. Instruction set architecture 1400 may include any suitable number or kind of components.

For example, instruction set architecture 1400 may include processing entities such as one or more cores 1406, 1407 and a graphics processing unit 1415. Cores 1406, 1407 may be communicatively coupled to the rest of instruction set architecture 1400 through any suitable mechanism, such as through a bus or cache. In one embodiment, cores 1406, 1407 may be communicatively coupled through an L2 cache control 1408, which may include a bus interface unit 1409 and an L2 cache 1411. Cores 1406, 1407 and graphics processing unit 1415 may be communicatively coupled to each other and to the remainder of instruction set architecture 1400 through interconnect 1410. In one embodiment, graphics processing unit 1415 may use a video code 1420 defining the manner in which particular video signals will be encoded and decoded for output.

Instruction set architecture 1400 may also include any number or kind of interfaces, controllers, or other mechanisms for interfacing or communicating with other portions of an electronic device or system. Such mechanisms may facilitate interaction with, for example, peripherals, communications devices, other processors, or memory. In the example of FIG. 14, instruction set architecture 1400 may include a liquid crystal display (LCD) video interface 1425, a subscriber interface module (SIM) interface 1430, a boot ROM interface 1435, a synchronous dynamic random access memory (SDRAM) controller 1440, a flash controller 1445, and a serial peripheral interface (SPI) master unit 1450. LCD video interface 1425 may provide output of video signals from, for example, GPU 1415 and through, for example, a mobile industry processor interface (MIPI) 1490 or a high-definition multimedia interface (HDMI) 1495 to a display. Such a display may include, for example, an LCD. SIM interface 1430 may provide access to or from a SIM card or device. SDRAM controller 1440 may provide access to or from memory such as an SDRAM chip or module 1460. Flash controller 1445 may provide access to or from memory such as flash memory 1465 or other instances of RAM. SPI master unit 1450 may provide access to or from communications modules, such as a Bluetooth module 1470, high-speed 3G modem 1475, global positioning system module 1480, or wireless module 1485 implementing a communications standard such as 802.11.

Figure 15:
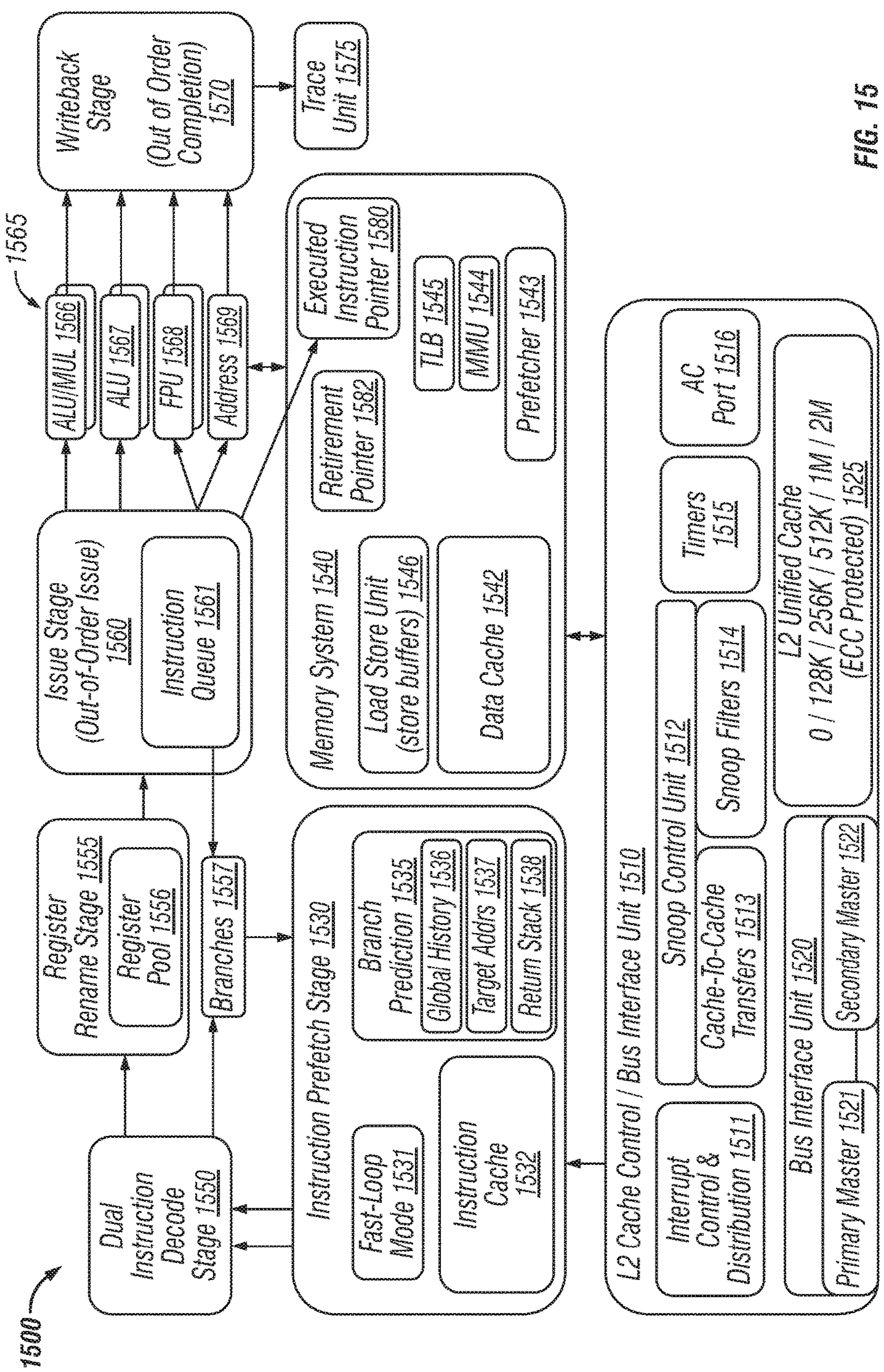
FIG. 15 is a more detailed block diagram of an instruction set architecture of a processor, in accordance with embodiments of the present disclosure.

FIG. 15 is a more detailed block diagram of an instruction set architecture 1500 of a processor, in accordance with embodiments of the present disclosure. Instruction architecture 1500 may implement one or more aspects of instruction set architecture 1400. Furthermore, instruction set architecture 1500 may illustrate modules and mechanisms for the execution of instructions within a processor.

Instruction architecture 1500 may include a memory system 1540 communicatively coupled to one or more execution entities 1565. Furthermore, instruction architecture 1500 may include a caching and bus interface unit such as unit 1510 communicatively coupled to execution entities 1565 and memory system 1540. In one embodiment, loading of instructions into execution entities 1565 may be performed by one or more stages of execution. Such stages may include, for example, instruction prefetch stage 1530, dual instruction decode stage 1550, register rename stage 1555, issue stage 1560, and writeback stage 1570.

In one embodiment, memory system 1540 may include an executed instruction pointer 1580. Executed instruction pointer 1580 may store a value identifying the oldest, undispatched instruction within a batch of instructions. The oldest instruction may correspond to the lowest Program Order (PO) value. A PO may include a unique number of an instruction. Such an instruction may be a single instruction within a thread represented by multiple strands. A PO may be used in ordering instructions to ensure correct execution semantics of code. A PO may be reconstructed by mechanisms such as evaluating increments to PO encoded in the instruction rather than an absolute value. Such a reconstructed PO may be known as an "RPO." Although a PO may be referenced herein, such a PO may be used interchangeably with an RPO. A strand may include a sequence of instructions that are data dependent upon each other. The strand may be arranged by a binary translator at compilation time. Hardware executing a strand may execute the instructions of a given strand in order according to the PO of the various instructions. A thread may include multiple strands such that instructions of different strands may depend upon each other. A PO of a given strand may be the PO of the oldest instruction in the strand which has not yet been dispatched to execution from an issue stage. Accordingly, given a thread of multiple strands, each strand including instructions ordered by PO, executed instruction pointer 1580 may store the oldest—illustrated by the lowest number—PO in the thread.

In another embodiment, memory system 1540 may include a retirement pointer 1582. Retirement pointer 1582 may store a value identifying the PO of the last retired instruction. Retirement pointer 1582 may be set by, for example, retirement unit 454. If no instructions have yet been retired, retirement pointer 1582 may include a null value.

Execution entities 1565 may include any suitable number and kind of mechanisms by which a processor may execute instructions. In the example of FIG. 15, execution entities 1565 may include ALU/multiplication units (MUL) 1566, ALUs 1567, and floating point units (FPU) 1568. In one embodiment, such entities may make use of information contained within a given address 1569. Execution entities 1565 in combination with stages 1530, 1550, 1555, 1560, 1570 may collectively form an execution unit.

Unit 1510 may be implemented in any suitable manner. In one embodiment, unit 1510 may perform cache control. In such an embodiment, unit 1510 may thus include a cache 1525. Cache 1525 may be implemented, in a further embodiment, as an L2 unified cache with any suitable size, such as zero, 128 k, 256 k, 512 k, 1M, or 2M bytes of memory. In another, further embodiment, cache 1525 may be implemented in error-correcting code memory. In another embodiment, unit 1510 may perform bus interfacing to other portions of a processor or electronic device. In such an embodiment, unit 1510 may thus include a bus interface unit 1520 for communicating over an interconnect, intraprocessor bus, interprocessor bus, or other communication bus, port, or line. Bus interface unit 1520 may provide interfacing in order to perform, for example, generation of the memory and input/output addresses for the transfer of data between execution entities 1565 and the portions of a system external to instruction architecture 1500.

To further facilitate its functions, bus interface unit 1520 may include an interrupt control and distribution unit 1511 for generating interrupts and other communications to other portions of a processor or electronic device. In one embodiment, bus interface unit 1520 may include a snoop control unit 1512 that handles cache access and coherency for multiple processing cores. In a further embodiment, to provide such functionality, snoop control unit 1512 may include a cache-to-cache transfer unit that handles information exchanges between different caches. In another, further embodiment, snoop control unit 1512 may include one or more snoop filters 1514 that monitors the coherency of other caches (not shown) so that a cache controller, such as unit 1510, does not have to perform such monitoring directly. Unit 1510 may include any suitable number of timers 1515 for synchronizing the actions of instruction architecture 1500. Also, unit 1510 may include an AC port 1516.

Memory system 1540 may include any suitable number and kind of mechanisms for storing information for the processing needs of instruction architecture 1500. In one embodiment, memory system 1540 may include a load store unit 1546 for storing information such as buffers written to or read back from memory or registers. In another embodiment, memory system 1540 may include a translation lookaside buffer (TLB) 1545 that provides look-up of address values between physical and virtual addresses. In yet another embodiment, memory system 1540 may include a memory management unit (MMU) 1544 for facilitating access to virtual memory. In still yet another embodiment, memory system 1540 may include a prefetcher 1543 for requesting instructions from memory before such instructions are actually needed to be executed, in order to reduce latency.

The operation of instruction architecture 1500 to execute an instruction may be performed through different stages. For example, using unit 1510 instruction prefetch stage 1530 may access an instruction through prefetcher 1543. Instructions retrieved may be stored in instruction cache 1532. Prefetch stage 1530 may enable an option 1531 for fast-loop mode, wherein a series of instructions forming a loop that is small enough to fit within a given cache are executed. In one embodiment, such an execution may be performed without needing to access additional instructions from, for example, instruction cache 1532. Determination of what instructions to prefetch may be made by, for example, branch prediction unit 1535, which may access indications of execution in global history 1536, indications of target addresses 1537, or contents of a return stack 1538 to determine which of branches 1557 of code will be executed next. Such branches may be possibly prefetched as a result. Branches 1557 may be produced through other stages of operation as described below. Instruction prefetch stage 1530 may provide instructions as well as any predictions about future instructions to dual instruction decode stage 1550.

Dual instruction decode stage 1550 may translate a received instruction into microcode-based instructions that may be executed. Dual instruction decode stage 1550 may simultaneously decode two instructions per clock cycle. Furthermore, dual instruction decode stage 1550 may pass its results to register rename stage 1555. In addition, dual instruction decode stage 1550 may determine any resulting branches from its decoding and eventual execution of the microcode. Such results may be input into branches 1557.

Register rename stage 1555 may translate references to virtual registers or other resources into references to physical registers or resources. Register rename stage 1555 may include indications of such mapping in a register pool 1556. Register rename stage 1555 may alter the instructions as received and send the result to issue stage 1560.

Issue stage 1560 may issue or dispatch commands to execution entities 1565. Such issuance may be performed in an out-of-order fashion. In one embodiment, multiple instructions may be held at issue stage 1560 before being executed. Issue stage 1560 may include an instruction queue 1561 for holding such multiple commands. Instructions may be issued by issue stage 1560 to a particular processing entity 1565 based upon any acceptable criteria, such as availability or suitability of resources for execution of a given instruction. In one embodiment, issue stage 1560 may reorder the instructions within instruction queue 1561 such that the first instructions received might not be the first instructions executed. Based upon the ordering of instruction queue 1561, additional branching information may be provided to branches 1557. Issue stage 1560 may pass instructions to executing entities 1565 for execution.

Upon execution, writeback stage 1570 may write data into registers, queues, or other structures of instruction set architecture 1500 to communicate the completion of a given command. Depending upon the order of instructions arranged in issue stage 1560, the operation of writeback stage 1570 may enable additional instructions to be executed. Performance of instruction set architecture 1500 may be monitored or debugged by trace unit 1575.

Figure 16:
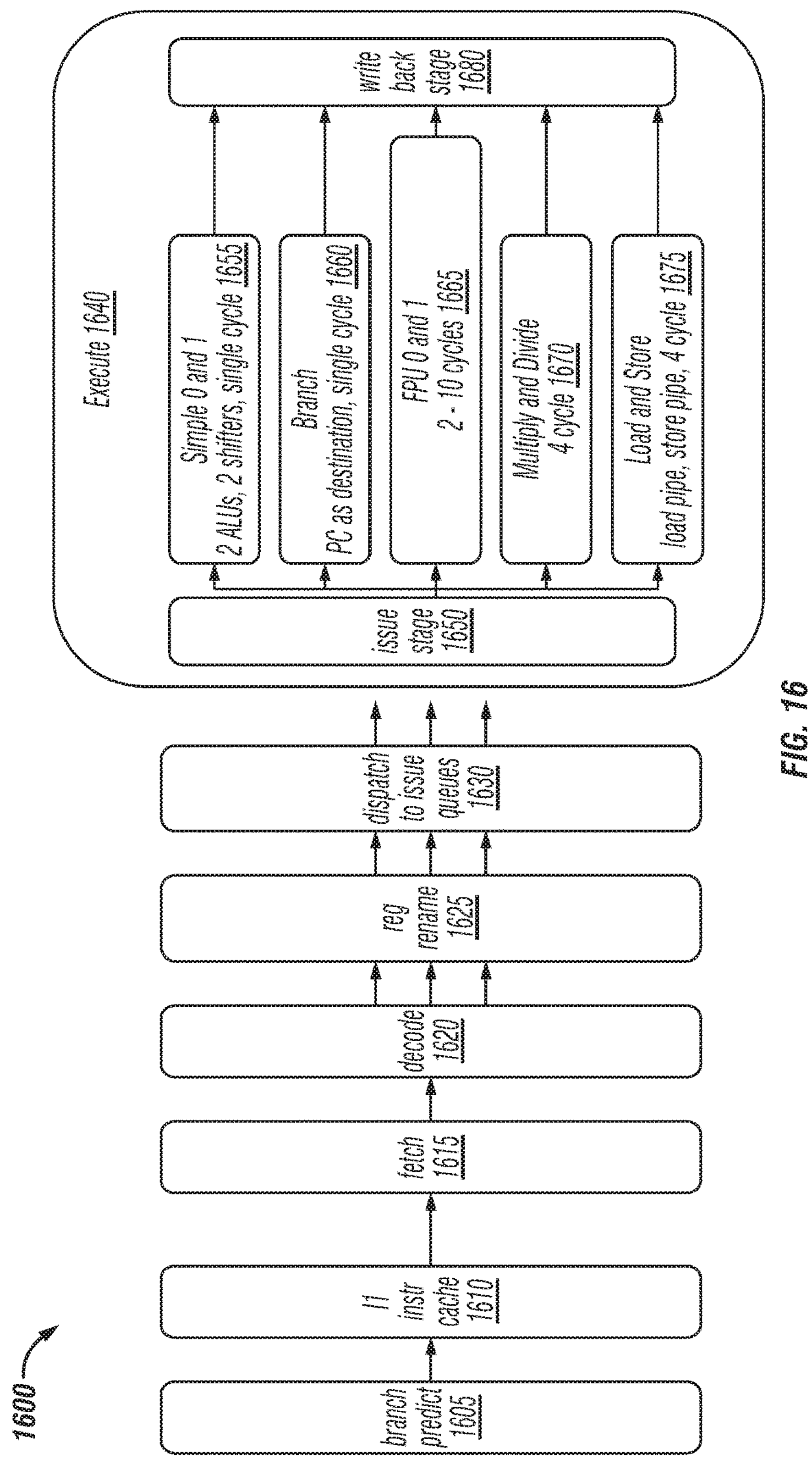
FIG. 16 is a block diagram of an execution pipeline for an instruction set architecture of a processor, in accordance with embodiments of the present disclosure.

FIG. 16 is a block diagram of an execution pipeline 1600 for an instruction set architecture of a processor, in accordance with embodiments of the present disclosure. Execution pipeline 1600 may illustrate operation of, for example, instruction architecture 1500 of FIG. 15.

Execution pipeline 1600 may include any suitable combination of steps or operations. In 1605, predictions of the branch that is to be executed next may be made. In one embodiment, such predictions may be based upon previous executions of instructions and the results thereof. In 1610, instructions corresponding to the predicted branch of execution may be loaded into an instruction cache. In 1615, one or more such instructions in the instruction cache may be fetched for execution. In 1620, the instructions that have been fetched may be decoded into microcode or more specific machine language. In one embodiment, multiple instructions may be simultaneously decoded. In 1625, references to registers or other resources within the decoded instructions may be reassigned. For example, references to virtual registers may be replaced with references to corresponding physical registers. In 1630, the instructions may be dispatched to queues for execution. In 1640, the instructions may be executed. Such execution may be performed in any suitable manner. In 1650, the instructions may be issued to a suitable execution entity. The manner in which the instruction is executed may depend upon the specific entity executing the instruction. For example, at 1655, an ALU may perform arithmetic functions. The ALU may utilize a single clock cycle for its operation, as well as two shifters. In one embodiment, two ALUs may be employed, and thus two instructions may be executed at 1655. At 1660, a determination of a resulting branch may be made. A program counter may be used to designate the destination to which the branch will be made. 1660 may be executed within a single clock cycle. At 1665, floating point arithmetic may be performed by one or more FPUs. The floating point operation may require multiple clock cycles to execute, such as two to ten cycles. At 1670, multiplication and division operations may be performed. Such operations may be performed in four clock cycles. At 1675, loading and storing operations to registers or other portions of pipeline 1600 may be performed. The operations may include loading and storing addresses. Such operations may be performed in four clock cycles. At 1680, write-back operations may be performed as required by the resulting operations of 1655-1675.

Figure 17:
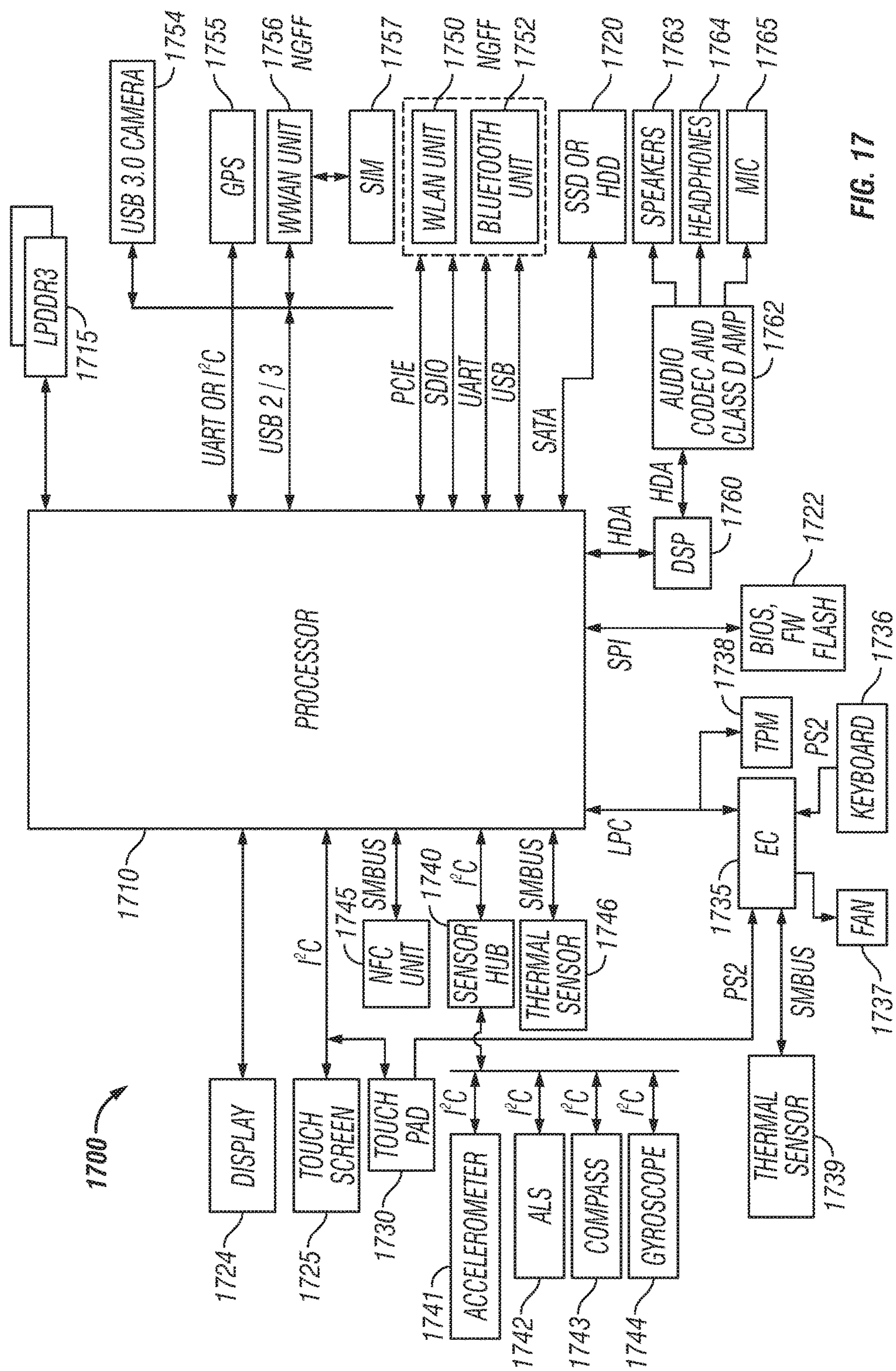
FIG. 17 is a block diagram of an electronic device for utilizing a processor, in accordance with embodiments of the present disclosure.

FIG. 17 is a block diagram of an electronic device 1700 for utilizing a processor 1710, in accordance with embodiments of the present disclosure. Electronic device 1700 may include, for example, a notebook, an ultrabook, a computer, a tower server, a rack server, a blade server, a laptop, a desktop, a tablet, a mobile device, a phone, an embedded computer, or any other suitable electronic device.

Electronic device 1700 may include processor 1710 communicatively coupled to any suitable number or kind of components, peripherals, modules, or devices. Such coupling may be accomplished by any suitable kind of bus or interface, such as $I^2C$ bus, system management bus (SMBus), low pin count (LPC) bus, SPI, high definition audio (HDA) bus, Serial Advance Technology Attachment (SATA) bus, USB bus (versions 1, 2, 3), or Universal Asynchronous Receiver/Transmitter (UART) bus.

Such components may include, for example, a display 1724, a touch screen 1725, a touch pad 1730, a near field communications (NFC) unit 1745, a sensor hub 1740, a thermal sensor 1746, an express chipset (EC) 1735, a trusted platform module (TPM) 1738, BIOS/firmware/flash memory 1722, a digital signal processor 1760, a drive 1720 such as a solid state disk (SSD) or a hard disk drive (HDD), a wireless local area network (WLAN) unit 1750, a Bluetooth unit 1752, a wireless wide area network (WWAN) unit 1756, a global positioning system (GPS) 1775, a camera 1754 such as a USB 3.0 camera, or a low power double data rate (LPDDR) memory unit 1715 implemented in, for example, the LPDDR3 standard. These components may each be implemented in any suitable manner.

Furthermore, in various embodiments other components may be communicatively coupled to processor 1710 through the components discussed above. For example, an accelerometer 1741, ambient light sensor (ALS) 1742, compass 1743, and gyroscope 1744 may be communicatively coupled to sensor hub 1740. A thermal sensor 1739, fan 1737, keyboard 1736, and touch pad 1730 may be communicatively coupled to EC 1735. Speakers 1763, headphones 1764, and a microphone 1765 may be communicatively coupled to an audio unit 1762, which may in turn be communicatively coupled to DSP 1760. Audio unit 1762 may include, for example, an audio codec and a class D amplifier. A SIM card 1757 may be communicatively coupled to WWAN unit 1756. Components such as WLAN unit 1750 and Bluetooth unit 1752, as well as WWAN unit 1756 may be implemented in a next generation form factor (NGFF).

Figure 18:
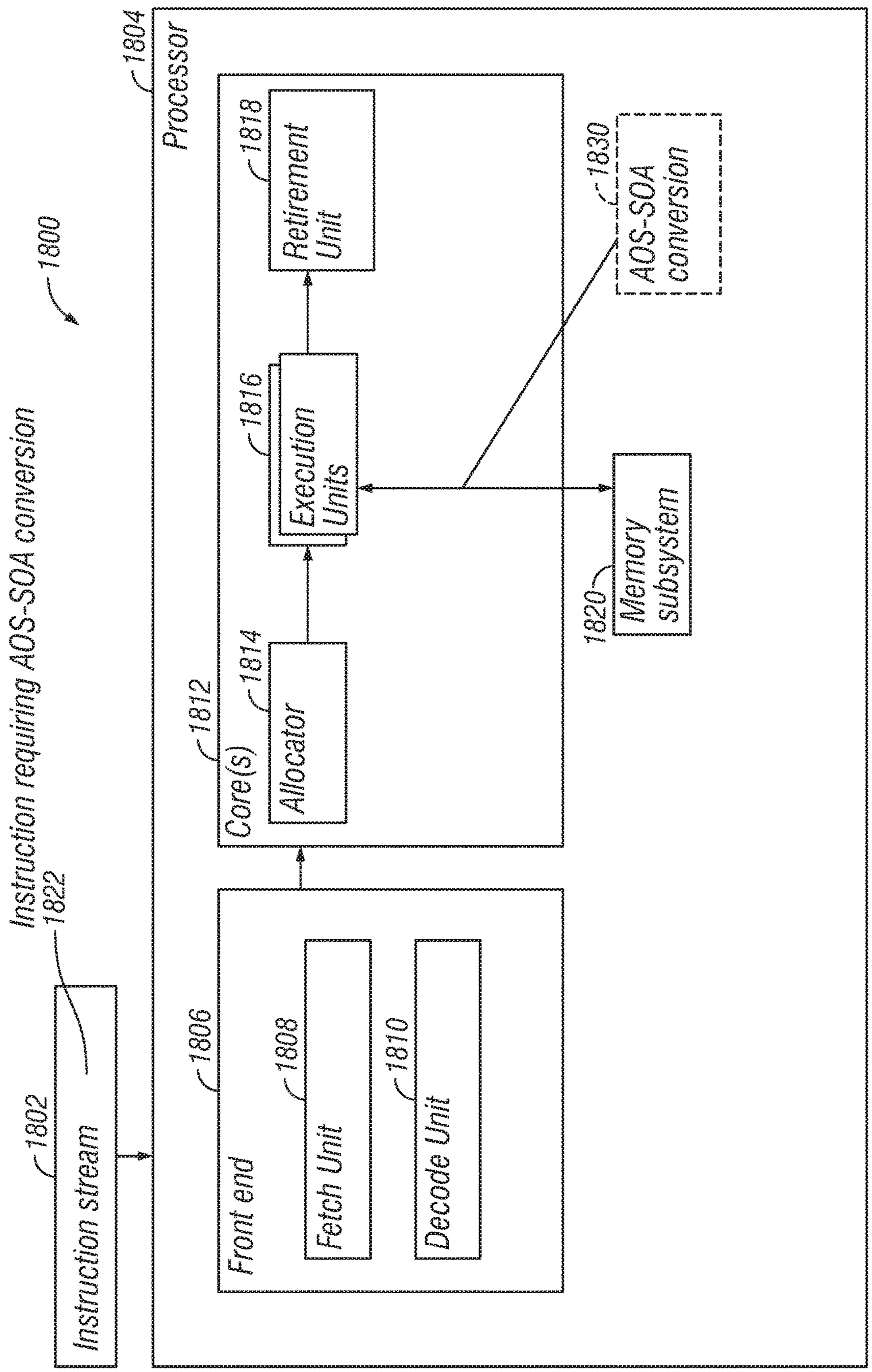
FIG. 18 is an illustration of an example system for instructions and logic for blend and permute sequences of instructions or operations, according to embodiments of the present disclosure.

Embodiments of the present disclosure involve instructions and processing logic for executing one or more vector operations for blending and permuting operations. FIG. 18 is an illustration of an example system 1800 for instructions and logic for blend and permute sequences of instructions or operations, according to embodiments of the present disclosure. The operations may implement instruction striding, wherein multiple operations are applied to different elements of a structure simultaneously. For example, the operations may implement in part a Stride-5 operation, although the principles of the present disclosure may be applied to stride operations on a different number of elements. In one embodiment, the operations might be made on five elements of the same type. Each different structure within the array may be denoted by a different shading or color, and each element within a given structure may be shown by its number (0 . . . 4).

More specifically, the need to implement striding operations may arise when converting an array-of-structures (AOS) data format into a structure-of-arrays (SOA) data format. Such operations are shown briefly in FIG. 21. Given an array 2102 in memory or in cache, data for five separate structures may be contiguously (whether physically or virtually) arranged in memory. In one embodiment, each structure (Structure1 . . . Structure8) may have the same format as one another. The eight structures may each be, for example, a five-element structure, wherein each element is, for example, a double. In other examples, each element of the structure could be a float, single, or other data type. Each element may be of a same data type. Array 2102 may be referenced by a base location r in its memory.

The process of converting AOS to SOA may be performed. System 1800 may perform such a conversion in an efficient manner.

As a result, a structure of arrays 2104 may result. Each array (Array1 . . . Array4) may be loaded into a different destination, such as a register or memory or cache location. Each array may include, for example, all the first elements from the structures, all the second elements from the structures, all the third elements from the structures, all the fourth elements from the structures, or all the fifth elements from the structure.

By arranging the structure of arrays 2104 into different registers, each with all of the particularly indexed elements from all of the structures of the array of structures 2102, additional operations may be performed on each register with increased efficiency. For example, in a loop of executing code, the first element of each structure might be added to a second element of each structure, or the third element of each structure might be analyzed. By isolating all such elements into a single register or other location, vector operations can be performed. Such vector operations, using SIMD techniques, could perform the addition, analysis, or other execution upon all elements of the array at a single time, in a clock cycle. Transformation of AOS to SOA format may allow vectorized operations such as these.

Returning to FIG. 18, system 1800 may perform the AOS-SOA conversion shown in FIG. 21. In one embodiment, system 1800 may utilize blend and permute operations in order to perform the AOS-SOA conversion.

The AOS-SOA conversion may be made upon any suitable trigger. In one embodiment, system 1800 may perform AOS-SOA conversion upon a specific instruction in instruction stream 1802 that such conversion is to be performed. In another embodiment, system 1800 may infer that AOS-SOA conversion should be performed based upon the proposed execution of another instruction from instruction stream 1802. For example, upon determination that a stride operation, a vector operation, or an operation upon strided data is to be performed, system 1800 may recognize that such execution will be more efficiently executed with data that is converted to strided data and perform AOS-SOA conversion. Any suitable portion of system 1800 may determine that AOS-SOA conversion is to be performed, such as a front end, a decoder, a dynamic translator, or other suitable portions, such as a just-in-time interpreter or compiler.

In some systems, an AOS-SOA conversion may be performed by gather instructions. In other systems, an AOS-SOA conversion may be performed by permute instructions. However, in one embodiment system 1800 may perform the AOS-SOA conversion using load, blend, and permute instructions. System 1800 may, as a consequence, more efficiently perform the AOS-SOA conversion. Blend instructions used by system 1800 to implement the AOS-SOA conversion may have a lower latency than permute or gather operations. Furthermore, blend instructions used by system 1800 to implement the AOS-SOA conversion may be able to execute on multiple execution ports of an execution units, as opposed to permute operations which might execute on a single execution port.

System 1800 may include a processor, SoC, integrated circuit, or other mechanism. For example, system 1800 may include processor 1804. Although processor 1804 is shown and described as an example in FIG. 18, any suitable mechanism may be used. Processor 1804 may include any suitable mechanisms for executing vector operations that target vector registers, including those that operate on structures stored in the vector registers that contain multiple elements. In one embodiment, such mechanisms may be implemented in hardware. Processor 1804 may be implemented fully or in part by the elements described in FIGS. 1-17.

Instructions to be executed on processor 1804 may be included in instruction stream 1802. Instruction stream 1802 may be generated by, for example, a compiler, just-in-time interpreter, or other suitable mechanism (which might or might not be included in system 1800), or may be designated by a drafter of code resulting in instruction stream 1802. For example, a compiler may take application code and generate executable code in the form of instruction stream 1802. Instructions may be received by processor 1804 from instruction stream 1802. Instruction stream 1802 may be loaded to processor 1804 in any suitable manner. For example, instructions to be executed by processor 1804 may be loaded from storage, from other machines, or from other memory, such as memory system 1830. The instructions may arrive and be available in resident memory, such as RAM, wherein instructions are fetched from storage to be executed by processor 1804. The instructions may be fetched from resident memory by, for example. In one embodiment, instruction stream 1802 may include an instruction 1822 that will trigger AOS-SOA conversion.

Processor 1804 may include a front end 1806, which may include an instruction fetch pipeline stage and a decode pipeline stage. Front end 1806 may receive instructions with fetch unit 1808 and decode instructions from instruction stream 1802 using decode unit 1810. The decoded instructions may be dispatched, allocated, and scheduled for execution by an allocation stage of a pipeline (such as allocator 1814) and allocated to specific execution units 1816 for execution. One or more specific instructions to be executed by processor 1804 may be included in a library defined for execution by processor 1804. In another embodiment, specific instructions may be targeted by particular portions of processor 1804. For example, processor 1804 may recognize an attempt in instruction stream 1802 to execute a vector operation in software and may issue the instruction to a particular one of execution units 1816.

During execution, access to data or additional instructions (including data or instructions resident in memory system 1830) may be made through memory subsystem 1820. Moreover, results from execution may be stored in memory subsystem 1820 and may subsequently be flushed to other portions of memory. Memory subsystem 1820 may include, for example, memory, RAM, or a cache hierarchy, which may include one or more Level 1 (L1) caches or Level 2 (L2) caches, some of which may be shared by multiple cores 1812 or processors 1804. After execution by execution units 1816, instructions may be retired by a writeback stage or retirement stage in retirement unit 1818. Various portions of such execution pipelining may be performed by one or more cores 1812.

An execution unit 1816 that executes vector instructions may be implemented in any suitable manner. In one embodiment, an execution unit 1816 may include or may be communicatively coupled to memory elements to store information necessary to perform one or more vector operations. In one embodiment, an execution unit 1816 may include circuitry to perform strided operations upon stride5 or other data. For example, an execution unit 1816 may include circuitry to implement an instruction upon multiple elements of data simultaneously within a given clock cycle.

In embodiments of the present disclosure, the instruction set architecture of processor 1804 may implement one or more extended vector instructions that are defined as Intel® Advanced Vector Extensions 512 (Intel® AVX-512) instructions. Processor 1804 may recognize, either implicitly or through decoding and execution of specific instructions, that one of these extended vector operations is to be performed. In such cases, the extended vector operation may be directed to a particular one of the execution units 1816 for execution of the instruction. In one embodiment, the instruction set architecture may include support for 512-bit SIMD operations. For example, the instruction set architecture implemented by an execution unit 1816 may include 32 vector registers, each of which is 512 bits wide, and support for vectors that are up to 512 bits wide. The instruction set architecture implemented by an execution unit 1816 may include eight dedicated mask registers for conditional execution and efficient merging of destination operands. At least some extended vector instructions may include support for broadcasting. At least some extended vector instructions may include support for embedded masking to enable predication.

At least some extended vector instructions may apply the same operation to each element of a vector stored in a vector register at the same time. Other extended vector instructions may apply the same operation to corresponding elements in multiple source vector registers. For example, the same operation may be applied to each of the individual data elements of a packed data item stored in a vector register by an extended vector instruction. In another example, an extended vector instruction may specify a single vector operation to be performed on the respective data elements of two source vector operands to generate a destination vector operand.

In embodiments of the present disclosure, at least some extended vector instructions may be executed by a SIMD coprocessor within a processor core. For example, one or more of execution units 1816 within a core 1812 may implement the functionality of a SIMD coprocessor. The SIMD coprocessor may be implemented fully or in part by the elements described in FIGS. 1-17. In one embodiment, extended vector instructions that are received by processor 1804 within instruction stream 1802 may be directed to an execution unit 1816 that implements the functionality of a SIMD coprocessor.

During execution, in response to an operation that may benefit from strided data, system 1800 may execute an instruction that causes AOS-SOA conversion 1830. Example operation of such conversion may be shown in the figures below.

Some aspects of AOS-SOA conversion may utilize permute instructions. Permute instructions may selectively identify any combination of the elements of two or more source vectors to be stored in a destination vector. Moreover, the combination of the elements may be stored in any desired order. In order to perform such an operation, an index vector may be specified, wherein each element of the index vector specifies, for an element of the destination vector, which element among the combined sources will be stored in the destination vector.

Several forms of permute instructions may be used. For example, a two-source permute instruction such as VPERMT2D may include a mask and three other operators or parameters. VPERMT2D may be called using, for example, VPERMT2D {mask} source1, index, source 2, although the order of parameters may be in any suitable arrangement. Source1, index, and source2 may all be vectors of the same size. The mask may be used to selective write to the destination. Thus, if mask is all 1's, all results will be written, but the binary mask may be set so as to selectively write a subset of the permutation. The permute operation will select values from the combination of source1 and source2 to write to the destination. Either source or the index may also serve as the destination of the permutation. For example, source1 may be used as the destination. In other examples, VPERMT2 may overwrite results on source registers, while VPERMI2 may overwrite results on index registers. The elements of the index may specify which elements of source1 and source2 are to be written to the destination. A given element of the index at a given position may specify which of source1 and source2 are to be written to the destination at a location in the destination at the given position. The element of the index may specify an offset within a combination of source1 and source2 that will be written to the destination.

For example, consider a call to VPERMT2D {mask=01111111}{source1=zmm0={a b c d e f g h}{index=zmm31={−1 11 6 1 15 10 5 0}{source2=zmm1=i j k l m n o p}. The first seven elements of source1 (zmm0) will be written according to the mask. Furthermore, index may specify offsets (from right to left) within the combination of source1 and source2 that will be written to the destination. The combination may include the concatenation of source2 to source1, or {i j k l m n o p a b c d e f g h}. Thus, index may specify that the zeroth element of the destination will be written with the zeroth element of the combination of source2 and source1, or "h". The index may specify that the first element (of the destination will be written with the fifth element of the combination of source2 and source1, or "c". The index may specify (zero-based numbering) that the second element of the destination will be written with the tenth element of the combination of source2 and source1, or "n". The index may specify (zero-based numbering) that the third element of the destination will be written with the fifteenth element of the combination of source2 and source1, or "i". The index may specify (zero-based numbering) that the fourth element of the destination will be written with the first element of the combination of source2 and source1, or "g". The index may specify (zero-based numbering) that the fifth element of the destination will be written with the sixth element of the combination of source2 and source1, or "b". The index may specify (zero-based numbering) that the sixth element of the destination will be written with the eleventh element of the combination of source2 and source1, or "m". The index may specify (zero-based numbering) that the seventh element of the destination will not be written, as it is specified with a "−1". Thus, as a result, the permute will yield {m b g i n c h} stored in source1, the zmm0 register.

Different permute operations provide significant flexibility. For example, different permute operations shown in FIG. 22 can be used to selectively the same element (the "x" element) from different registers, wherein the locations of such an element across the sources is known.

Some aspects of AOS-SOA conversion may utilize blend instructions. Blend instructions may selectively identify a combination of the elements of two or more source vectors to be stored in a destination vector. However, in contrast to permute instructions, blend instructions do not arbitrarily combine any subset of the combination of the source vectors in any order into the destination vector. Blend instructions may select, for a given position in the destination vector, which element from the source vectors at the same position are to be selected and stored. Blend instructions may make use of an index. For a two-source blend operation, the index may be a bit array that specifies which of the two sources will contribute their element to the destination vector. Each bit at a given position may specify whether the corresponding position within the destination vector will be written with a first or a second source.

Several forms of blend instructions may be used. For example, a two-source permute instruction such as VBLENDMPD may include a mask and three other operators or parameters. VBLENDMPD may be called using, for example, VBLENDMPD {mask} destination, source1, source2, although the order of parameters may be in any suitable arrangement. Source1, destination, and source2 may all be vectors of the same size. The mask may be used to identify, for a given bit, whether the corresponding value in source1 or source2 will be written to destination. In other cases, one of the sources might also be the destination.

For example, consider a call to VBLENDMPD {mask=11001110}{destination=zmm3}{source1=zmm0={a b c d e f g h}{source2=zmm1=i j k l m n o p}. The resulting destination vector zmm3 may be set to {a b i j e f g p}.

In the present disclosure, example pseudocode, instructions, and parameters may be shown. However, other pseudocode, instructions, and parameters may be substituted and used as appropriate. The instructions may include Intel® instructions that are used for example purposes.

Figure 19:
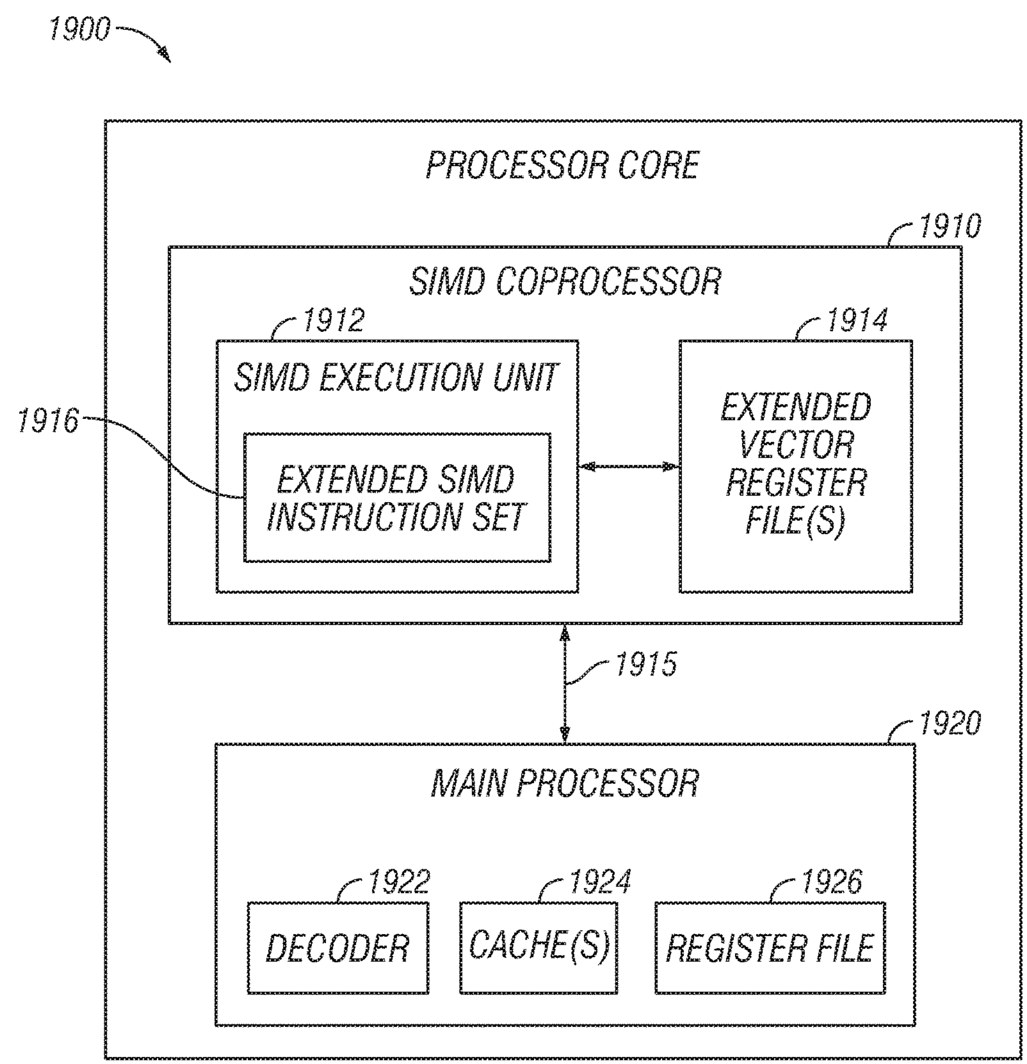
FIG. 19 illustrates an example processor core of a data processing system that performs vector operations, in accordance with embodiments of the present disclosure.

FIG. 19 illustrates an example processor core 1900 of a data processing system that performs SIMD operations, in accordance with embodiments of the present disclosure. Processor 1900 may be implemented fully or in part by the elements described in FIGS. 1-18. In one embodiment, processor core 1900 may include a main processor 1920 and a SIMD coprocessor 1910. SIMD coprocessor 1910 may be implemented fully or in part by the elements described in FIGS. 1-17. In one embodiment, SIMD coprocessor 1910 may implement at least a portion of one of the execution units 1816 illustrated in FIG. 18. In one embodiment, SIMD coprocessor 1910 may include a SIMD execution unit 1912 and an extended vector register file 1914. SIMD coprocessor 1910 may perform operations of extended SIMD instruction set 1916. Extended SIMD instruction set 1916 may include one or more extended vector instructions. These extended vector instructions may control data processing operations that include interactions with data resident in extended vector register file 1914.

In one embodiment, main processor 1920 may include a decoder 1922 to recognize instructions of extended SIMD instruction set 1916 for execution by SIMD coprocessor 1910. In other embodiments, SIMD coprocessor 1910 may include at least part of decoder (not shown) to decode instructions of extended SIMD instruction set 1916. Processor core 1900 may also include additional circuitry (not shown) which may be unnecessary to the understanding of embodiments of the present disclosure.

In embodiments of the present disclosure, main processor 1920 may execute a stream of data processing instructions that control data processing operations of a general type, including interactions with cache(s) 1924 and/or register file 1926. Embedded within the stream of data processing instructions may be SIMD coprocessor instructions of extended SIMD instruction set 1916. Decoder 1922 of main processor 1920 may recognize these SIMD coprocessor instructions as being of a type that should be executed by an attached SIMD coprocessor 1910. Accordingly, main processor 1920 may issue these SIMD coprocessor instructions (or control signals representing SIMD coprocessor instructions) on the coprocessor bus 1915. From coprocessor bus 1915, these instructions may be received by any attached SIMD coprocessor. In the example embodiment illustrated in FIG. 19, SIMD coprocessor 1910 may accept and execute any received SIMD coprocessor instructions intended for execution on SIMD coprocessor 1910.

In one embodiment, main processor 1920 and SIMD coprocessor 1920 may be integrated into a single processor core 1900 that includes an execution unit, a set of register files, and a decoder to recognize instructions of extended SIMD instruction set 1916.

The example implementations depicted in FIGS. 18 and 19 are merely illustrative and are not meant to be limiting on the implementation of the mechanisms described herein for performing extended vector operations.

FIG. 20 is a block diagram illustrating an example extended vector register file 1914, in accordance with embodiments of the present disclosure. Extended vector register file 1914 may include 32 SIMD registers (ZMM0-ZMM31), each of which is 512-bit wide. The lower 256 bits of each of the ZMM registers are aliased to a respective 256-bit YMM register. The lower 128 bits of each of the YMM registers are aliased to a respective 128-bit XMM register. For example, bits 255 to 0 of register ZMM0 (shown as 2001) are aliased to register YMM0, and bits 127 to 0 of register ZMM0 are aliased to register XMM0. Similarly, bits 255 to 0 of register ZMM1 (shown as 2002) are aliased to register YMM1, bits 127 to 0 of register ZMM1 are aliased to register XMM1, bits 255 to 0 of register ZMM2 (shown as 2003) are aliased to register YMM2, bits 127 to 0 of the register ZMM2 are aliased to register XMM2, and so on.

In one embodiment, extended vector instructions in extended SIMD instruction set 1916 may operate on any of the registers in extended vector register file 1914, including registers ZMM0-ZMM31, registers YMM0-YMM15, and registers XMM0-XMM7. In another embodiment, legacy SIMD instructions implemented prior to the development of the Intel® AVX-512 instruction set architecture may operate on a subset of the YMM or XMM registers in extended vector register file 1914. For example, access by some legacy SIMD instructions may be limited to registers YMM0-YMM15 or to registers XMM0-XMM7, in some embodiments.

In embodiments of the present disclosure, the instruction set architecture may support extended vector instructions that access up to four instruction operands. For example, in at least some embodiments, the extended vector instructions may access any of 32 extended vector registers ZMM0-ZMM31 shown in FIG. 20 as source or destination operands. In some embodiments, the extended vector instructions may access any one of eight dedicated mask registers. In some embodiments, the extended vector instructions may access any of sixteen general-purpose registers as source or destination operands.

In embodiments of the present disclosure, encodings of the extended vector instructions may include an opcode specifying a particular vector operation to be performed. Encodings of the extended vector instructions may include an encoding identifying any of eight dedicated mask registers, k0-k7. Each bit of the identified mask register may govern the behavior of a vector operation as it is applied to a respective source vector element or destination vector element. For example, in one embodiment, seven of these mask registers (k1-k7) may be used to conditionally govern the per-data-element computational operation of an extended vector instruction. In this example, the operation is not performed for a given vector element if the corresponding mask bit is not set. In another embodiment, mask registers k1-k7 may be used to conditionally govern the per-element updates to the destination operand of an extended vector instruction. In this example, a given destination element is not updated with the result of the operation if the corresponding mask bit is not set.

In one embodiment, encodings of the extended vector instructions may include an encoding specifying the type of masking to be applied to the destination (result) vector of an extended vector instruction. For example, this encoding may specify whether merging-masking or zero-masking is applied to the execution of a vector operation. If this encoding specifies merging-masking, the value of any destination vector element whose corresponding bit in the mask register is not set may be preserved in the destination vector. If this encoding specifies zero-masking, the value of any destination vector element whose corresponding bit in the mask register is not set may be replaced with a value of zero in the destination vector. In one example embodiment, mask register k0 is not used as a predicate operand for a vector operation. In this example, the encoding value that would otherwise select mask k0 may instead select an implicit mask value of all ones, thereby effectively disabling masking. In this example, mask register k0 may be used for any instruction that takes one or more mask registers as a source or destination operand.

One example of the use and syntax of an extended vector instruction is shown below:

VADDPS zmm1, zmm2, zmm3

In one embodiment, the instruction shown above would apply a vector addition operation to all of the elements of the source vector registers zmm2 and zmm3. In one embodiment, the instruction shown above would store the result vector in destination vector register zmm1. Alternatively, an instruction to conditionally apply a vector operation is shown below:

VADDPS zmm1 {k1}{z}, zmm2, zmm3

In this example, the instruction would apply a vector addition operation to the elements of the source vector registers zmm2 and zmm3 for which the corresponding bit in mask register k1 is set. In this example, if the {z} modifier is set, the values of the elements of the result vector stored in destination vector register zmm1 corresponding to bits in mask register k1 that are not set may be replaced with a value of zero. Otherwise, if the {z} modifier is not set, or if no {z} modifier is specified, the values of the elements of the result vector stored in destination vector register zmm1 corresponding to bits in mask register k1 that are not set may be preserved.

In one embodiment, encodings of some extended vector instructions may include an encoding to specify the use of embedded broadcast. If an encoding specifying the use of embedded broadcast is included for an instruction that loads data from memory and performs some computational or data movement operation, a single source element from memory may be broadcast across all elements of the effective source operand. For example, embedded broadcast may be specified for a vector instruction when the same scalar operand is to be used in a computation that is applied to all of the elements of a source vector. In one embodiment, encodings of the extended vector instructions may include an encoding specifying the size of the data elements that are packed into a source vector register or that are to be packed into a destination vector register. For example, the encoding may specify that each data element is a byte, word, doubleword, or quadword, etc. In another embodiment, encodings of the extended vector instructions may include an encoding specifying the data type of the data elements that are packed into a source vector register or that are to be packed into a destination vector register. For example, the encoding may specify that the data represents single or double precision integers, or any of multiple supported floating point data types.

In one embodiment, encodings of the extended vector instructions may include an encoding specifying a memory address or memory addressing mode with which to access a source or destination operand. In another embodiment, encodings of the extended vector instructions may include an encoding specifying a scalar integer or a scalar floating point number that is an operand of the instruction. While several specific extended vector instructions and their encodings are described herein, these are merely examples of the extended vector instructions that may be implemented in embodiments of the present disclosure. In other embodiments, more fewer, or different extended vector instructions may be implemented in the instruction set architecture and their encodings may include more, less, or different information to control their execution.

Data structures that are organized in tuples of three to five elements that can be accessed individually may be used in various applications. For examples, RGB (Red-Green-Blue) is a common format in many encoding schemes used in media applications. A data structure storing this type of information may consist of three data elements (an R component, a G component, and a B component), which are stored contiguously and are the same size (for example, they may all be 32-bit integers). A format that is common for encoding data in High Performance Computing applications includes two or more coordinate values that collectively represent a position within a multidimensional space. For example, a data structure may store X and Y coordinates representing a position within a 2D space or may store X, Y, and Z coordinates representing a position within a 3D space. Other common data structures having a higher number of elements may appear in these and other types of applications.

In some cases, these types of data structures may be organized as arrays. In embodiments of the present disclosure, multiple ones of these data structures may be stored in a single vector register, such as one of the XMM, YMM, or ZMM vector registers described above. In one embodiment, the individual data elements within such data structures may be re-organized into vectors of like elements that can then be used in SIMD loops, as these elements might not be stored next to each other in the data structures themselves. An application may include instructions to operate on all of the data elements of one type in the same way and instructions to operate on all of the data elements of a different type in a different way. In one example, for an array of data structures that each include an R component, a G components, and a B component in an RGB color space, a different computational operation may be applied to the R components in each of the rows of the array (each data structures) than a computational operation that is applied to the G components or the B components in each of the rows of the array.

In yet another example, many molecular dynamics applications operate on neighbor lists consisting of an array of XYZW data structures. In this example, each of the data structures may include an X component, a Y component, a Z component, and a W component. In embodiments of the present disclosure, in order to operate on individual ones of these types of components, one or more even or odd vector GET instructions may be used to extract the X values, Y values, Z values, and W values from the array of XYZW data structures into separate vectors that contain elements of the same type. As a result, one of the vectors may include all of the X values, one may include all of the Y values, one may include all of the Z values, and one may include all of the W values. In some cases, after operating on at least some of the data elements within these separate vectors, an application may include instructions that operate on the XYZW data structures as a whole. For example, after updating at least some of the X, Y, Z, or W values in the separate vectors, the application may include instructions that access one of the data structures to retrieve or operate on an XYZW data structure as a whole. In this case, one or more other instructions may be called in order to store the XYZW values back in their original format.

In embodiments of the present disclosure, the instructions that may cause AOS to SOA conversion may be implemented by a processor core (such as core 1812 in system 1800) or by a SIMD coprocessor (such as SIMD coprocessor 1910) may include an instruction to perform an even vector GET operation or an odd vector GET operation. The instructions may store the extracted data elements into respective vectors containing the different data elements of a data structure in memory. In one embodiment, these instructions may be used to extract data elements from data structures whose data elements are stored together in contiguous locations within one or more source vector registers. In one embodiment, each of the multiple-element data structures may represent a row of an array.

In embodiments of the present disclosure, different “lanes” within a vector register may be used to hold data elements of different types. In one embodiment, each lane may hold multiple data elements of a single type. In another embodiment, the data elements held in a single lane may not be of the same type, but they may be operated on by an application in the same way. For example, one lane may hold X values, one lane may hold Y values, and so on. In this context, the term “lane” may refer to a portion of the vector register that holds multiple data elements that are to be treated in the same way, rather than to a portion of the vector register that holds a single data element. In another embodiment, different “lanes” within a vector register may be used to hold the data elements of different data structures. In this context, the term “lane” may refer to a portion of the vector register that holds multiple data elements of a single data structure. In this example, the data elements stored in each lane may be of two or more different types. In one embodiment in which the vector registers are 512 bits wide, there may be four 128-bit lanes. For example, the lowest-order 128 bits within a 512-bit vector register may be referred as the first lane, the next 128 bits may be referred to as the second lane, and so on. In this example, each of the 128-bit lanes may store two 64-bit data elements, four 32-bit data elements, eight 16-bit data elements, or four 8-bit data elements. In another embodiment in which the vector registers are 512 bits wide, there may be two 256-bit lanes, each of which stores data elements of a respective data structure. In this example, each of the 256-bit lanes may store multiple data elements of up to 128 bits each.

FIG. 21 is an illustration of the results of AOS-SOA conversion 1830, according to embodiments of the present disclosure. As described above, given an array 2102 in memory or in cache, data for five separate structures may be contiguously (whether physically or virtually) arranged in memory. In one embodiment, each structure (Structure1 . . . Structure8) may have the same format as one another. The eight structures may each be, for example, a five-element structure, wherein each element is, for example, a double. In other examples, each element of the structure could be a float, single, or other data type. Each element may be of a same data type. Array 2102 may be referenced by a base location r in its memory.

The process of converting AOS to SOA may be performed. System 1800 may perform such a conversion in an efficient manner.

As a result, a structure of arrays 2104 may result. Each array (Array1 . . . Array4) may be loaded into a different destination, such as a register or memory or cache location. Each array may include, for example, all the first elements from the structures, all the second elements from the structures, all the third elements from the structures, all the fourth elements from the structures, or all the fifth elements from the structure.

By arranging the structure of arrays 2104 into different registers, each with all of the particularly indexed elements from all of the structures of the array of structures 2102, additional operations may be performed on each register with increased efficiency. For example, in a loop of executing code, the first element of each structure might be added to a second element of each structure, or the third element of each structure might be analyzed. By isolating all such elements into a single register or other location, vector operations can be performed. Such vector operations, using SIMD techniques, could perform the addition, analysis, or other execution upon all elements of the array at a single time, in a clock cycle. Transformation of AOS to SOA format may allow vectorized operations such as these.

Figure 22:
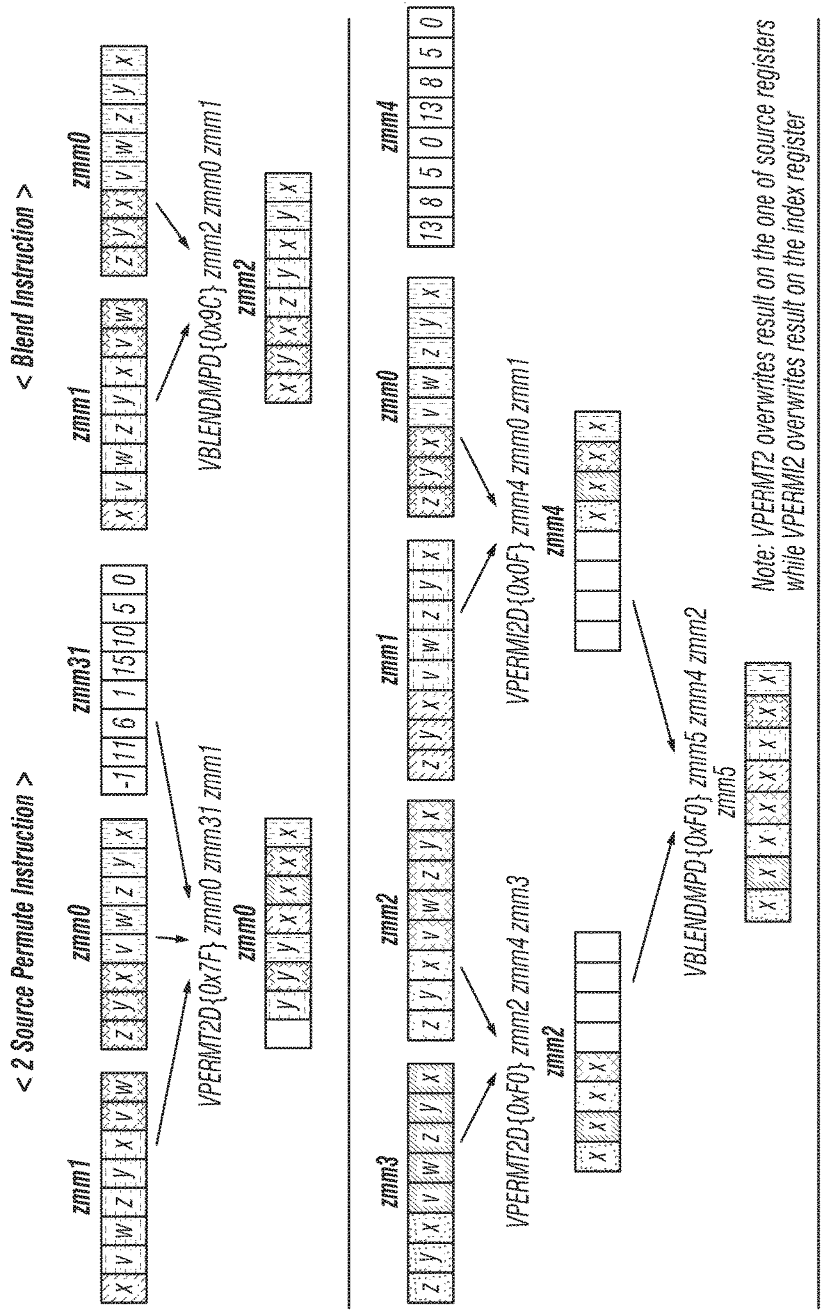
FIG. 22 is an illustration of operation of blend and permute instructions, according to embodiments of the present disclosure.

FIG. 22 is an illustration of operation of blend and permute instructions, according to embodiments of the present disclosure. The blend and permute instructions may be used to perform various aspects of AOS to SOA conversion.

For example, given sources zmm1 and zmm0, each with register elements identified as x-, y-, z-, and w-coordinate elements, a permute instruction may be used to permute the x-coordinate and y-coordinate elements into a destination register. The destination register may include the source zmm0. As only seven x-coordinate and y-coordinate elements exist in the sources, a write to the last element of the destination may be masked off (mask=0x7F). An index (stored in zmm31) may define which of the elements from the combination of zmm1 and zmm0 are to be stored in zmm0, and in what order. For example, the index vector may include corresponding positions for the x-coordinate elements, to be stored in the least significant positions of the destination register, and the y-coordinate elements, to be stored in the next significant portions of the destination register. As a result VPERMT2D {0x7F} zmm0, zmm31 zmm1 may be called, resulting in zmm0 storing the results as shown in FIG. 22.

In another example, given sources zmm1 and zmm0, each with register elements identified as x-, y-, z-, and w-coordinate elements, a permute instruction may be used to permute elements into a destination register. However, the order of the elements might not be arbitrarily selectable. For each relative position in the sources, an element from the source must be chosen to be written to the destination. The mask may define, for a given relative position in the sources, which source will be written to the destination. As a result VBLENDMPD {0x9c} zmm2, zmm0, zmm1 may be called, resulting in zmm2 storing the results as shown in FIG. 22.

Blend and permute operations may be used together to perform portions or all of the AOS-SOA conversion. These are described in more complete detail in subsequent figures. FIG. 22 illustrates such operation on a smaller scale.

Suppose it is a goal to obtain the x-coordinates stored in the registers zmm0, zmm1, zmm2, and zmm3. Each register might include contents loaded from memory and may contain more than one x-coordinate, as each register includes contents from more than one structure. The contents of each register may include an x-coordinate (albeit an x-coordinate from various structures) in the same relative position in each register. These positions may be, for example, the zeroth and fifth locations in a given index. Accordingly, given the flexibility of different permute functions, a single index vector (stored in zmm4) may be used to perform various permute operations. The index vector may define that x values are located, for a combination of any two of the sources, in the same locations (indices 0, 5, 8, 13). The index vector may repeat these values and rely upon selective usage of permute operation (through masking) to arrive at the correct composition of the destination vector.

For example, VPERMT2D may be called to permute zmm2 and zmm3 into zmm2 using the index zmm4. Furthermore, as these two source registers are the left-half of the source, their results may be stored in the left-half of the eventual destination. Accordingly, the permute operation may be masked with {0xF0} so that the left-half of zmm2 is filled with the x-coordinates from zmm2 and zmm3. VPERMI2D may be called to permute zmm0 and zmm1 into zmm4 using the index zmm4. As these two source registers are the right-half of the source, their results may be stored in the right-half of the eventual destination. Accordingly, the permute operation may be masked with {0x0F} so that the right-half of zmm4 is filled with the x-coordinates from zmm0 and zmm1. Notably, each of the results in zmm2 and zmm4 include x-coordinates from their respective sources in-order. Two results in zmm2 and zmm4 may be blended. A blend operation such as VLENDMPD may be called to blend zmm4 and zmm2 into zmm5. The blend may use a mask of {0xF0} to indicate that, for the right-half, zmm4 values should be used, and for the left-half, zmm2 values should be used. The result may be a collection of the x-coordinates from the sources ordered in zmm5.

Figure 23:
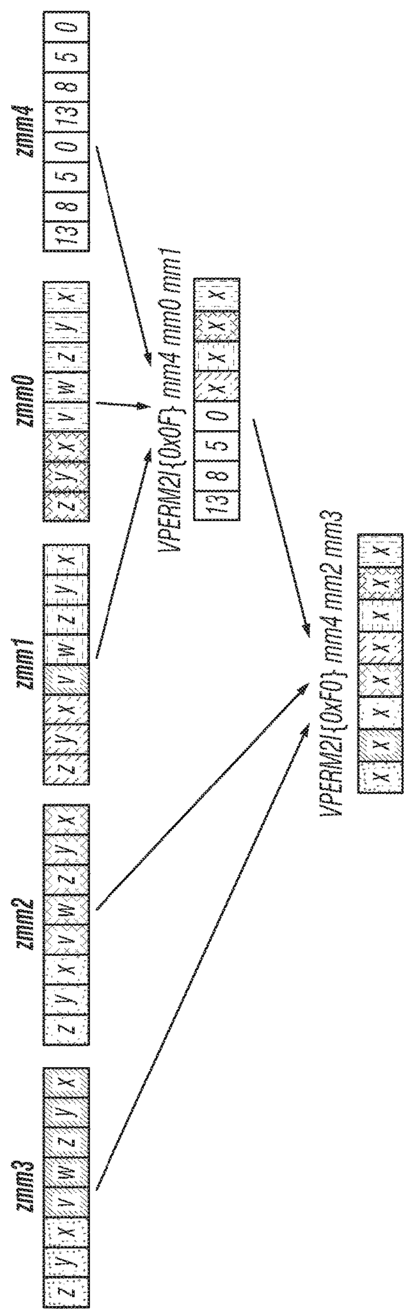
FIG. 23 is an illustration of operation of permute instructions, according to embodiments of the present disclosure.

FIG. 23 is an illustration of operation of permute instructions, according to embodiments of the present disclosure. The permute instructions may be used to perform various aspects of AOS to SOA conversion. The operation of permute instructions may be improve the operation of blend and permute instructions shown in FIG. 22 such that the same task may be accomplished using two permute instructions, instead of two permute instructions and a blend instruction.

In one embodiment, operation of permute instructions to perform aspects of AOS to SOA conversion may rely upon a feature of permute instructions to reuse the index vector to store results. By selectively storing results in only part of the index vector and preserving the remainder of the index vector, an operation may be saved. As discussed above, as the same relative position of a given coordinate (such as the x-coordinate) may exist across multiple sources, reflecting portions of an AOS to convert, an index vector might repeat part of itself (such as {13 8 5 0 13 8 5 0}) and the permute operation may be masked (such as with 0x0F or 0xF0} to arrive a destination vector with all x-coordinates. In such cases, the part of the index vector that repeats may be eliminated, and a permute operation masked for the remaining portion may be used. Conversely, data elements that are not needed may be overwritten with index values using a mask. The same write mask may be used with the permute instruction, which overwrites the index register as a destination, preserving some data values and overwriting unneeded index values with data combine from the other source registers. Consequently, the particular variant of permute instructions denoted by the “i” in VPERMI instructions may allow merging of writes that depositing of data values mixed with index control values, converting the two-source instruction effectively into a three-source permute instruction.

For example, given the same source vectors zmm0-zmm3 of FIG. 22, and a similar index vector {13 8 5 0 13 8 5 0}, a call may be made to VPERM2I with zmm0 and zmm1 as the sources, and zmm4 as the index. This permute instruction may write the results of the permute to the index vector as the destination. The permute operation may be masked (with 0x0F) to write only to the four least significant elements of the index vector zmm4, preserving the existing values. As zmm4 includes a repeat of its indices, indicating the zeroth, fifth, eighth, and thirteenth locations of any combination of the sources will include x-coordinates, half of the index vector zmm4 will be sufficient for subsequent permute operations. Thus, zmm4 could be used again with the knowledge that half of it will be usable. The permute operation may thus copy the zeroth, fifth, eighth, and thirteenth elements of the combination of zmm0 and zmm1—specifically, the x-coordinates from these source registers—into the least significant four locations of zmm4, the index vector. The most four significant locations of zmm4 will be preserved, as they have been masked off in the permute operation.

The resulting zmm4 register will serve as the index vector source for another call to VPERM2I. The zmm4 register will also be the destination of the permute operation. The other sources, zmm2 and zmm3, may be permuted according to the values of the left-half of zmm4, as the permute operation is masked with 0xF0. Thus, the lowest significant four locations in zmm4, which store the x-coordinates from zmm0 and zmm4, will be preserved. The additional elements (the x-coordinates) from zmm2 and zmm3 will be stored as the index values in the most significant four locations in zmm4 are overwritten. As a result, zmm4 will include the x-coordinates from all four sources, in-order. This result may be the same as that in FIG. 22, but conducted with two permute operations rather than two permutes and a blend operation.

The principles of this operation may be applied in the operations discussed further below.

Figure 24:
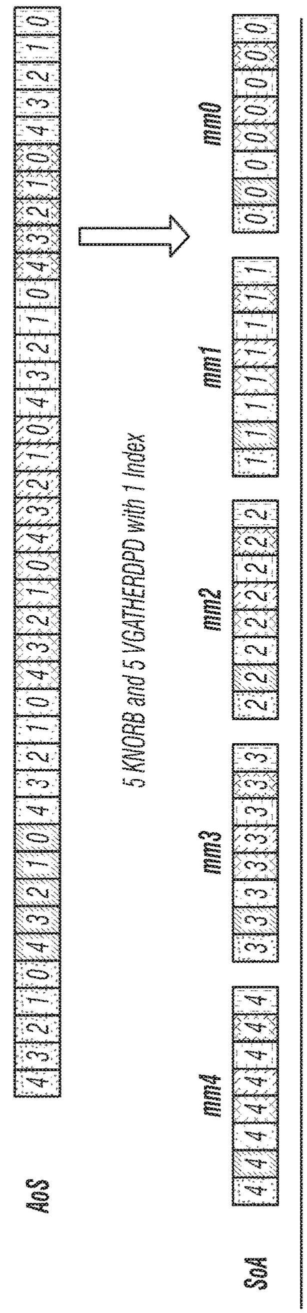
FIG. 24 is an illustration of operation of data conversion using multiple gathers for an array of eight structures, according to embodiment of the present disclosure.

FIG. 24 is an illustration of operation of AOS to SOA conversion using multiple gathers for an array of eight structures, wherein each structure includes five elements such as doubles, using gather operations.

The conversion shown in FIG. 24 may show a traditional sequence to perform the conversion with gather instructions. As with FIG. 21, the top row may show the layout of the structure in memory where the enumeration of 0 . . . 4 may identify equivalent elements of each vector. Different colors or shading may indicate different structures laid out consecutively in memory. Each structure element may be five doubles, yielding forty bytes. Eight such elements may be considered, for a total of 320 bytes of data. The final result will have all 0th elements in a first register, all 1st components in a second register, and so on.

The AOS may be loaded into the registers through the use of five gather instructions. Five KNORB operations may be used to set masks.

First, gather indices may be created. They may be created with the pseudocode:

```
_declspec (align(32)) const_int32 gather0_index[8] =
{0, 5, 10, 15, 20, 25, 30, 35};
_declspec (align(32)) const_int32 gather1_index[8] =
{1, 6, 11, 16, 21, 26, 31, 36};
_declspec (align(32)) const_int32 gather2_index[8] =
{2, 7, 12, 17, 22, 27, 32, 37};
_declspec (align(32)) const_int32 gather3_index[8] =
{3, 8, 13, 18, 23, 28, 33, 38};
_declspec (align(32)) const_int32 gather4 _index[8] =
{4, 9, 14, 19, 24, 29, 34, 39};
```

The index for gather0 may identify, in the AOS, the relative location of each “0” element. The index for gather1 may identify, in the AOS, the relative location of each “1” element. The index for gather2 may identify, in the AOS, the relative location of each “2” element. The index for gather3 may identify, in the AOS, the relative location of each “3” element. The index for gather5 may identify, in the AOS, the relative location of each “4” element.

Given these, KNORW may be called to generate masks, followed by five calls to VGATHERDPD. Each call to VGATHERDPD may gather packed values (in this case, of doubles) based upon the indices supplied to each call. The indices provided (r8+[ymm5->ymm9]*8) may be used to identify particular locations in memory (from a base address r8, scaled by the size of the doubles) from where the values will be gathered and loaded into respective registers. The calls may be expressed in the following pseudocode:

```
kxnorw k1, k0, k0
kxnorw k2, k0, k0
kxnorw k3, k0, k0
kxnorw k4, k0, k0
kxnorw k5, k0, k0
vgatherdpd zmm4{k1}, zmmword ptr [r8+ymm9*8]
vgatherdpd zmm3{k2}, zmmword ptr [r8+ymm8*8]
vgatherdpd zmm2{k3}, zmmword ptr [r8+ymm7*8]
vgatherdpd zmm1{k4}, zmmword ptr [r8+ymm6*8]
vgatherdpd zmm0{k5}, zmmword ptr [r8+ymm5*8]
```

Figure 25:
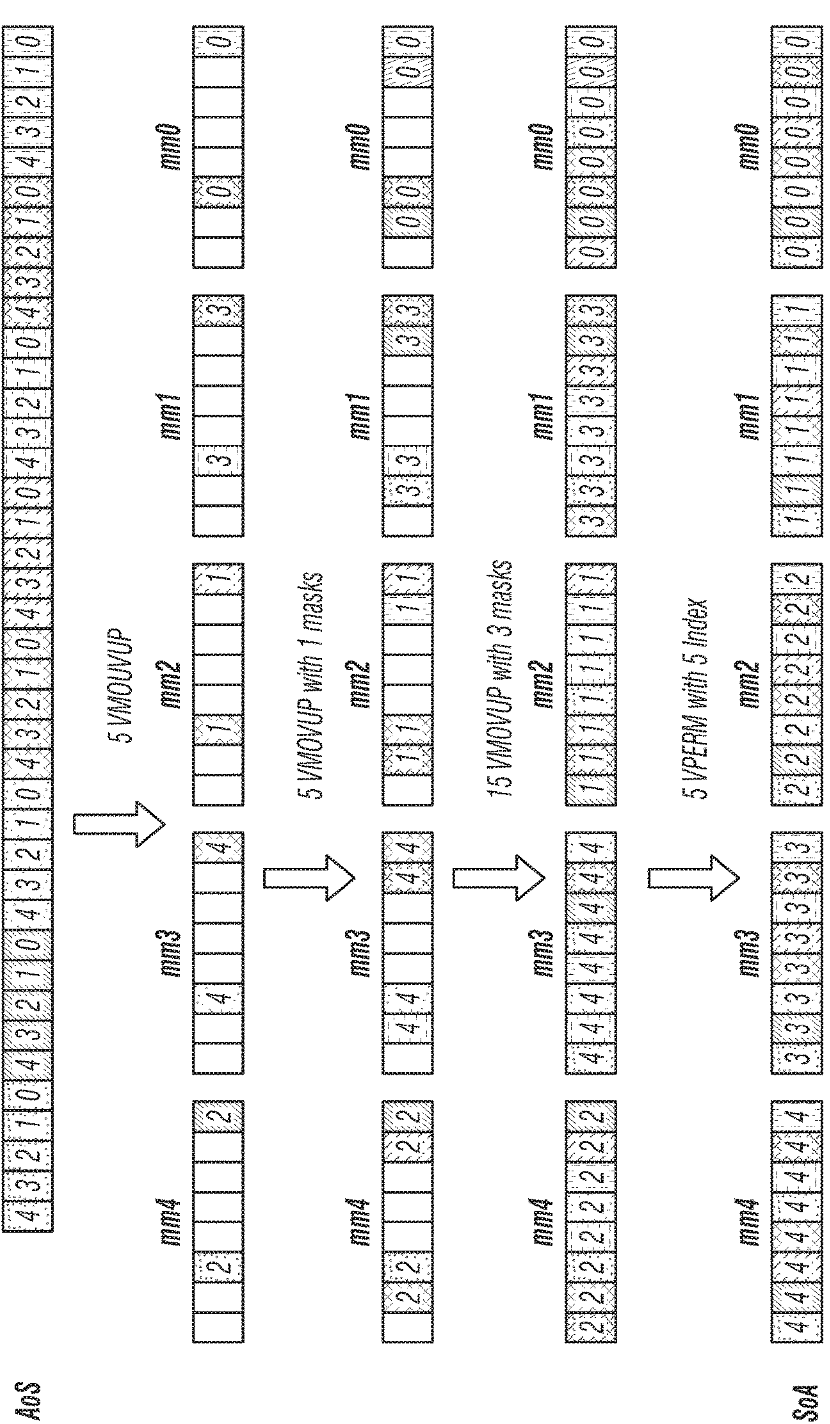
FIG. 25 is an illustration of naive operation of data conversion for an array of eight structures, according to embodiments of the present disclosure.

FIG. 25 is an illustration of operation of AOS to SOA conversion for an array of eight structures, wherein each structure includes five elements such as doubles, using gather operations. The conversion shown in FIG. 25 may be referred to as a naive implementation with gather operations, as such a conversion might not be as efficient as other conversions shown in later figures. The operation in FIG. 25 may implement the conversion shown in FIG. 24.

Given the AOS of eight doubles in memory, five load operations may be made to load data into registers. While each structure might include five elements, a load operation may be made in multiples of eight. Consequently, rather than load the eight structures into five registers wherein each register includes unused space, the eight structures may be loaded into five registers. Some structures may be broken up across multiple registers. The AOS to SOA conversion may then attempt to sort the contents of these eight registers so that all (eight) of the first elements of the structures are in a common register, all (eight) of the second elements of the structures are in a common register, and so on. In other examples, where structures with another number of elements (such as four) will be processed, four registers might be needed to be to store the results.

Five additional loads may be performed to load data from the memory into the registers. However, these loads may be performed with masks so that only some of the contents of a given memory section are loaded into the respective registers. The specific masks may be selected according to those that are needed to filter the correct element (such as the first, second, third, fourth, or fifth) from a given segment into the register. As a given register will only contain the same indexed element (that is, all first elements, all second elements, etc.), the mask is selected to filter only that element into a corresponding register. In some cases, such as in the present figure, the same mask might be used in all of these load operations. For example, it may be observed that for these particular structures, a mask of {01000010} may uniquely identify a different indexed element (first elements, second elements, etc.) for different memory segments. Thus, applying this same mask to the original memory segments that were loaded from memory will yield the application of indexed elements. Applying the mask, then, to the appropriate register may copy the required elements (that is, the first, second, or other elements).

The same process may be repeated for different masks and combination of sources, until the registers are each filled with respective elements (first elements, or second elements, and so on). The process may be repeated with five loads with a second mask, five loads with a third mask, and five loads with a fourth mask to accomplish the correct loading combinations. The result may be that each register is filled only with respective ones of first elements, second elements, third elements, fourth elements, or fifth elements of the original array of structures. However, the elements within a given register might not be ordered in the same way that they were ordered in the original array.

Accordingly, a number of permute operations may be performed to reorder the contents of the registers to match the original order of the array of structures. For example, five permute operations may be performed. Interim registers may be used as needed. A separate index vector may be needed for each permute to provide the order of the original array. As a result, the contents of each register may be reordered according to the order of the original array. The result may be the converted AOS resulting in a SOA. The arrays may be represented in each respective register. The structure may be the combination of the arrays.

In total, the operations of FIG. 25 may include twenty-five move or load operations, along with five permutes. Example pseudocode for FIG. 25 is shown below.

```
vmovups zmm5, zmmword ptr [r8]
vmovups zmm11, zmmword ptr [r8+0x40]
vmovups zmm7, zmmword ptr [r8+0x80]
vmovups zmm13, zmmword ptr [r8+0xc0]
vmovups zmm9, zmmword ptr [r8+0x100]
vmovapd zmm5{k4}, zmmword ptr [r8+0xc0]
vmovapd zmm11{k4}, zmmword ptr [r8+0x100]
vmovapd zmm7{k4}, zmmword ptr [r8]
vmovapd zmm13{k4}, zmmword ptr [r8+0x40]
vmovapd zmm9{k4}, zmmword ptr [r8+0x80]
vmovapd zmm5{k3}, zmmword ptr [r8+0x40]
vmovapd zmm11{k3}, zmmword ptr [r8+0x80]
vmovapd zmm7{k3}, zmmword ptr [r8+0xc0]
vmovapd zmm13{k3}, zmmword ptr [r8+0x100]
vmovapd zmm9{k3}, zmmword ptr [r8]
vmovapd zmm5{k2}, zmmword ptr [r8+0x100]
vmovapd zmm11{k2}, zmmword ptr [r8]
vmovapd zmm7{k2}, zmmword ptr [r8+0x40]
vmovapd zmm13{k2}, zmmword ptr [r8+0x80]
vmovapd zmm9{k2}, zmmword ptr [r8+0xc0]
vmovapd zmm5{k1}, zmmword ptr [r8+0x80]
vmovapd zmm11{k1}, zmmword ptr [r8+0xc0]
vmovapd zmm7{k1}, zmmword ptr [r8+0x100]
vmovapd zmm13{k1}, zmmword ptr [r8]
vmovapd zmm9{k1}, zmmword ptr [r8+0x40]
vpermpd zmm6, zmm4, zmm5
vpermpd zmm8, zmm3, zmm7
vpermpd zmm10, zmm2, zmm9
vpermpd zmm12, zmm1, zmm11
vpermpd zmm14, zmm0, zmm13
```

FIG. 26 is an illustration of operation of system 1800 to perform the conversion using blend and permute operations, in accordance with embodiments of the present disclosure. The same AOS source may be used.

First, the eight structures of the array may be loaded, unaligned, into five registers as previously shown. Second, a series of blend operations may be performed on the registers to distill each register down to its intended contents. A total of fifteen blend operations may be performed. The masks used in the blend operations may be based upon the relative position in the registers of the same element (such as the 0's, 1's, etc.). For example, comparing mm0 and mm1, the "0" element appear in mm0 at positions zero and five, and in mm1 at positions two and seven. The other elements can be ignored. Thus, a blend operation with mm0 and mm1 as the sources might be blended using a mask of {1 n 0 n n 0 n 1}, where "0" denotes mm0, "1" denotes mm1 and "n" denotes elements that can be ignored. The result may be stored to an interim register, but eventually copied back to mm0. The result may be {0 1 0 4 3 0 1 0}. In other words, mm0 has been half-populated. Notably, the same mask—{1 n 0 n n 0 n 1}—could be used in a blend operation to blend mm1 and mm2 with respect to the "3" elements. Moreover, the same mask could be used in a blend operation to blend mm3 and mm4 with respect to the "4" elements. The same mask could be used in a blend operation to blend mm4 and mm0 with respect to the "2" elements. The same mask could be used in a blend operation to blend mm2 and mm3 with respect to the "1" elements. Accordingly, because the same mask can be used in each of these blend operations, execution may be simplified.

After these first five blend operations have been performed to consolidate elements to pairs of registers, five more blend operations may be performed to further consolidate elements to other pairs of registers. These five blend operations may also share a same mask, based upon elements resident within similar locations in different pairs. For example, the combination of mm0 and mm1 have "1" elements located at the same indices that the combination of mm1 and mm2 have "4" elements. Thus, mm0 and mm1 could be blended with a mask of {n 1 n 0 n n 1 n} to consolidate the "1" elements and mm1 and mm2 could be blended with the same mask to consolidate the "4" elements therein. The registers mm2 and mm3 could be blended with a mask of {n 1 n 0 n n 1 n} to consolidate the "0" elements. This may be repeated for respective other combinations of the sources.

After the ten blend operations, the results of the ten blend operations may themselves be blended with five additional blend operations, each using the same, third mask. For example, in the first five blend operations, mm0 and mm1 were blended with the mask {1 n 0 n n 0 n 1} to consolidate "0" values. In the second five blend operations, mm2 and mm3 were blended with the mask {n 1 n 0 n n 1 n} to consolidate the "0" values from these registers. Accordingly, the results these two blend operations may themselves be blended. Suppose (blend {1 n 0 n n 0 n 1} mm0, mm1) yields {e7 n/a e5 n/a n/a e2 n/a e0} stored in, for example, mmX, wherein the "e" elements are the "0" elements denoted by current position. Suppose also that (blend {n 1 n 0 n n 1 n} mm2, mm3) yields {n/a e6 n/a e4 n/a n/a e1 n/a} stored in, for example, mmY, wherein the "e" elements are the "0" elements denoted by current position. Thus, a nearly-filled register mm0 may be created by a blend of mmX and mmY with a mask of {0 1 0 1 n 0 1 0} (0 indicating mmX, 1 indicating mmY). The result may be {e7 e6 e5 e4 n/a e2 e1 e0}. There may be a gap for the third element. This may be repeated for resulting pairs for the other elements.

The result may be that registers mm0 . . . mm4 are filled with all but one element from respective structures. This may arise from the fact that there are an odd number of registers, and blend operations require even inputs to a single, third output. Notably, the missing element may be within the same index in each register—index three. The masks may be chosen so that the same element is always missing from the registers at this stage of the conversion.

In order to correct the missing element, the individual missing element may be loaded from a register wherein it was previously stored. Thus, five load operations may be performed. The loads may each be masked to insert the value at the same index, and thus may share the same mask. Each register may now be a structure with a full complement of respective elements, converted from the array of structures. However, the elements within a given register might be out of order.

Accordingly, in order to fix the elements within their correct order, a permute operation might be called for each register. The permute may take as its input the single source of the register (or, if the contents of two registers need to be swapped, the two registers) along with an index vector denoting the correct relative position from the original array. As each register is jumbled in a different order from each other, a separate index might be needed for each. After the 5 permute operations, the data values may be in the correct order.

Pseudocode to perform these operations may include:

```
vmovups zmm18, zmmword ptr [r8]         // load mm0
vmovups zmm16, zmmword ptr [r8+0x40]    // load mm1
vmovups zmm19, zmmword ptr [r8+0x80]    // load mm2
vmovups zmm17, zmmword ptr [r8+0xc0]    // load mm3
vmovups zmm15, zmmword ptr [r8+0x100]   // load mm4
vblendmpd zmm5{k4}, zmm18, zmm16 //     blend mm0+mm1 to zmm5
vblendmpd zmm11{k4}, zmm16, zmm19//     blend mm1+mm2 to zmm11
vblendmpd zmm7{k4}, zmm19, zmm17 //     blend mm2+mm3 to zmm7
vblendmpd zmm13{k4}, zmm17, zmm15//     blend mm3+mm4 to zmm15
vblendmpd zmm9{k4}, zmm15, zmm18//      blend mm4+mm0 to zmm9
vblendmpd zmm14{k3}, zmm18, zmm16//     blend mm0+mm1 to zmm5
vblendmpd zmm10{k3}, zmm16, zmm19//     blend mm1+mm2 to zmm11
vblendmpd zmm6{k3}, zmm19, zmm17//      blend mm2+mm3 to zmm7
vblendmpd zmm12{k3}, zmm17, zmm15//     blend mm3+mm4 to zmm15
vblendmpd zmm8{k3}, zmm15, zmm18//      blend mm4+mm0 to zmm9
vblendmpd zmm24{k2}, zmm9, zmm10
  // blend (mm4+mm0 result)+(mm1+mm3 result) to zmm24
vblendmpd zmm20{k2}, zmm5, zmm6
  // blend (mm0+mm1 result)+(mm2+mm3 result) to zmm20
vblendmpd zmm26{k2}, zmm11, zmm12
  // blend (mm1+mm2 result)+(mm3+mm4 result) to zmm26
vblendmpd zmm22{k2}, zmm7, zmm8
  // blend (mm2+mm3 result)+(mm4+mm0 result) to zmm22
vblendmpd zmm28{k2}, zmm13, zmm14
  // blend (mm3+mm4 result)+(mm0+mm1 result) to zmm28
vmovapd zmm20{k1}, zmm15 // plug the missing third element for
each register
vmovapd zmm22{k1}, zmm16
vmovapd zmm24{k1}, zmm17
vmovapd zmm26{k1}, zmm18
vmovapd zmm28{k1}, zmm19
vpermpd zmm21, zmm4, zmm20 // reorganize each register according to
original order
vpermpd zmm23, zmm3, zmm22
vpermpd zmm25, zmm2, zmm24
vpermpd zmm27, zmm1, zmm26
vpermpd zmm29, zmm0, zmm28
// copy to original registers mm0...mm4, if needed
```

FIG. 27 is an illustration of further operation of system 1800 to perform the conversion using blend and permute operations, in accordance with embodiments of the present disclosure. The operation of FIG. 27 may be improved over the operation shown in FIG. 26 with respect to a reduced number of blend operations. However, it may require additional masks. Accordingly, a decision may be made by system 1800 of which scheme to use based upon available resources during execution.

The operation in FIG. 26 uses blend operations so that after the fifteen blend operations, all registers (mm0 . . . mm4) have a gap in the same index location. Specifically, they each have a gap at index three. As a result, a single index for the five load instructions can be used.

However, if the location of the gap in the index is allowed to float—able to appear in various indices among different registers—then the blend operations used to yield nearly complete registers may be used more flexibly. Specifically, the number of blend operations may be reduced. However, given that the location of the gap may change, then additional masks may be required to perform the load operations.

For example, the AOS-SOA conversion may be performed using eleven blend operations. The conversion may use a total of seven different masks.

The data may be loaded in a similar way as was performed in FIG. 26. Registers mm0 . . . mm4 may include unaligned portions of the structures in the original array.

For the first six of the eleven blend operations, two different masks may be used—k6, and k5. As the registers are permuted with each other on a first round, rather than all using the same blend mask, the two different masks may be used. As the results of the first round are permuted with each other in a second round, two additional masks may also be used—k4 and k3.

Masks may be selected so as to allow two different gaps in the resulting interim registers—gaps at index two and index three. Specifically, mm1 and mm2 may have the gap at the fourth index, rather than the third index as in mm0, mm3, and mm4.

Example values of the masks may be, for example:

k6: 0x8C k5: 0xC6 k4: 0x52 k3: 0x4A

Accordingly, two masks (rather than one, as performed in FIG. 26) may be used to appropriately load the missing element. Furthermore, the permute operations may be called to reorder the contents of each respective register to match the original order from the array.

Pseudocode for this operation may include:

```
vmovups zmm5, zmmword ptr [r8]          // load mm0
vmovups zmm6, zmmword ptr [r8+0x40]     // load mm1
vmovups zmm15, zmmword ptr [r8+0x80]    // load mm2
vmovups zmm14, zmmword ptr [r8+0xc0]    // load mm3
vmovups zmm13, zmmword ptr [r8+0x100]   // load mm4
vblendmpd zmm10{k6}, zmm5, zmm6         // blend mm0 and mm1
vblendmpd zmm11{k5}, zmm6, zmm15        // blend mm1 and mm2
vblendmpd zmm9{k5}, zmm15, zmm14        // blend mm2 and mm3
vblendmpd zmm12{k6}, zmm13, zmm5        // blend mm4 and mm0
vblendmpd zmm7{k6}, zmm14, zmm13        // blend mm3 and mm4
vblendmpd zmm8{k5}, zmm5, zmm6          // blend mm0 and mm1
vblendmpd zmm16{k4}, zmm10, zmm9
  // blend (mm0+mm1 result with k6 mask)+(mm2+mm3 result with
k5 mask)
vblendmpd zmm18{k3}, zmm9, zmm10
  // blend (mm2+mm3 result with k5 mask)+ (mm0+mm1 result with
k6 mask)
vblendmpd zmm20{k4}, zmm12, zmm11
  // blend (mm3+mm4 result with k6 mask)+(mm1+mm2 result with
k5 mask)
vblendmpd zmm24{k4}, zmm7, zmm8
  // blend (mm3+mm4 result with k6 mask)+(mm0+mm1 result with
k5 mask)
vblendmpd zmm22{k3}, zmm11, zmm12
  // blend (mm1+mm2 result with k5 mask)+(mm3+mm4 result with
k6 mask)
vmovapd zmm16{k2}, zmm13       // plug each register with missing
element.
vmovapd zmm18{k1}, zmm13
vmovapd zmm20{k2}, zmm14
vmovapd zmm22{k1}, zmm14
vmovapd zmm24{k2}, zmm15
vpermpd zmm17, zmm4, zmm16     // reorganize each register
vpermpd zmm19, zmm3, zmm18
vpermpd zmm21, zmm2, zmm20
vpermpd zmm23, zmm1, zmm22
vpermpd zmm25, zmm0, zmm24
```

Figure 28:
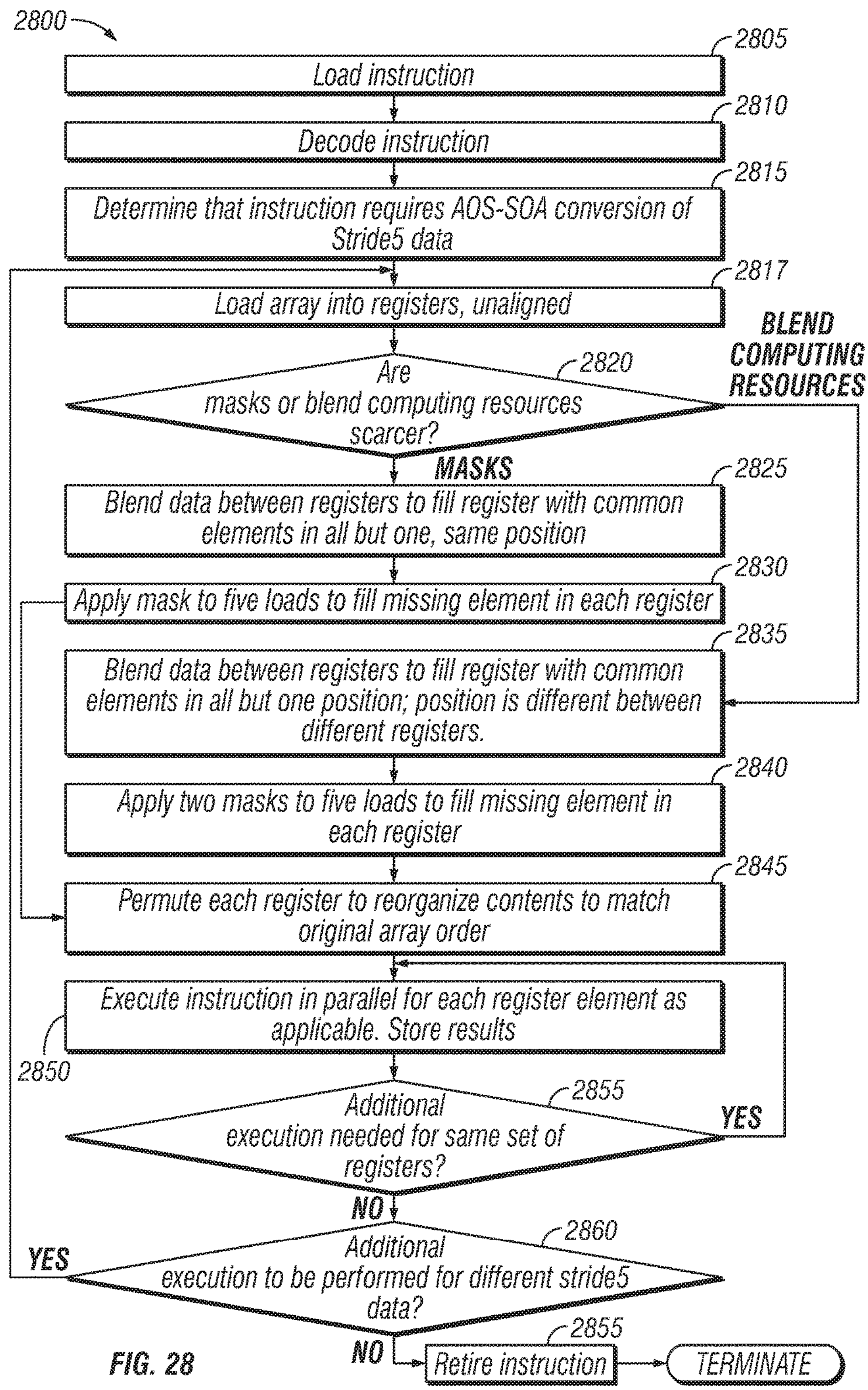
FIG. 28 illustrates an example method for performing blend and permute operations to fulfill data conversion, according to embodiments of the present disclosure.

FIG. 28 illustrates an example method 2800 for performing blend and permute operations to fulfill AOS to SOA conversion, according to embodiments of the present disclosure. Method 2800 may be implemented by any suitable elements shown in FIGS. 1-27. Method 2800 may be initiated by any suitable criteria and may initiate operation at any suitable point. In one embodiment, method 2800 may initiate operation at 2805. Method 2800 may include greater or fewer steps than those illustrated. Moreover, method 2800 may execute its steps in an order different than those illustrated below. Method 2800 may terminate at any suitable step. Moreover, method 2800 may repeat operation at any suitable step. Method 2800 may perform any of its steps in parallel with other steps of method 2800, or in parallel with steps of other methods. Furthermore, method 2800 may be executed multiple times to perform multiple operations requiring strided data that needs to be converted.

At 2805, in one embodiment, an instruction may be loaded and at 2810 the instruction may be decoded.

At 2815, it may be determined that the instruction requires AOS-SOA conversion of data. Such data may include strided data. In one embodiment, the stride data may include Stride5 data. The instruction may be determined to require such data because vector operations on the data are to be performed. The data conversion may result in the data being in an appropriate format so that a vectorized operation may be applied simultaneously, in a clock cycle, to each element of a bank of data. The instruction may specifically identify that the AOS-SOA conversion is to be performed or it may be inferred from the desire to execute an instruction that the AOS-SOA is needed.

At 2817, an array to be converted may be loaded into registers. The result of the loading may be unaligned data, wherein individual structures from the array are not evenly distributed among the registers. Method 2800 may convert such data so that the registers each include a single array of information from the structures.

At 2820, it may be determined what manner of AOS-SOA conversion is to be used. In one embodiment, a system performing method 2800 may have a preferred conversion technique. In another embodiment, a system performing method 2800 may determine which of several conversion techniques is to be used. In such an embodiment, it may be determined which technique best fits current operating conditions. For example, if computing resources needed to execute blend instructions are relatively scarce, method 2800 may proceed to 2835 to execute the conversion with relatively fewer blend operations. However, such a choice may incur the use of an increased number of masks. If computing resources needed to implement masks are relatively scarce, method 2800 may proceed to 2825 to execute the conversion with fewer masks, but more blend operations.

At 2825, data may be blended as shown in FIG. 26. Data may be blended with operations sufficient to leave a single gap in resulting registers. Moreover, the single gap might be in a consistent index across the registers. The number of blend operations may be fifteen for five registers, each to include corresponding portions of eight structures. The blend operations may be executed in three rounds of five blend operations, wherein each round includes a different mask, but the same mask is to be used in all five blend operations within the given round. Thus, three masks may be used to perform these blend operations.

At 2830, a single mask may be used to fill the missing element in each register when applied to a different load operation. Method 2800 may proceed to 2845.

At 2835, data may be blended as shown in FIG. 27. Data may be blended with operations sufficient to leave a single gap in resulting registers. Moreover, the single gap might be in one of several different places. The gap might be located in one of two locations. The number of blend operations may be eleven for five registers, each to include corresponding portions of eight structures. Several more masks may be used to perform these blend operations when compared with, for example, 2825.

At 2840, two masks may be needed to fill the missing elements in each register when applied to a different load operation. Method 2800 may proceed to 2845.

At 2845, the contents of each register may be permuted to restore the elements to their original relative order as presented in the array.

At 2850, the execution upon the different registers may be performed. As a given register is to be used with the vector instruction for execution, each element may be executed-upon in parallel. Results may be stored as necessary. At 2855, it may be determined if subsequent vector execution is to be performed on the same converted data. If so, method 2800 may return to 2850. Otherwise, method 2800 may proceed to 2860.

At 2860, it may be determined whether additional execution is needed for other stride5 data. If so, method 2800 may proceed to 2817. Otherwise, at 2865 the instruction may be retired. Method 2800 may optionally repeat or terminate.

Embodiments of the mechanisms disclosed herein may be implemented in hardware, software, firmware, or a combination of such implementation approaches. Embodiments of the disclosure may be implemented as computer programs or program code executing on programmable systems comprising at least one processor, a storage system (including volatile and non-volatile memory and/or storage elements), at least one input device, and at least one output device.

Program code may be applied to input instructions to perform the functions described herein and generate output information. The output information may be applied to one or more output devices, in known fashion. For purposes of this application, a processing system may include any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine-readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

Accordingly, embodiments of the disclosure may also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part-on and part-off processor.

Thus, techniques for performing one or more instructions according to at least one embodiment are disclosed. While certain exemplary embodiments have been described and shown in the accompanying drawings, it is to be understood that such embodiments are merely illustrative of and not restrictive on other embodiments, and that such embodiments not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

Some embodiments of the present disclosure include a processor. The processor may include a front end to receive an instruction, a decoder to decode the instruction, a core to execute the instruction, and a retirement unit to retire the instruction. The processor may include logic to determine that the instruction will require strided data converted from source data in memory. In combination with any of the above embodiments, the strided data is to include corresponding indexed elements from a plurality of structures in the source data to be loaded into a same register to be used to execute the instruction. In combination with any of the above embodiments, the core includes logic to load source data into a plurality of preliminary vector registers. In combination with any of the above embodiments, the source data is to be unaligned as resident in the vector registers. In combination with any of the above embodiments, the core includes logic to apply blend instructions to contents of the preliminary vector registers to cause corresponding indexed elements from the plurality of structures to be loaded into respective interim vector registers. In combination with any of the above embodiments, the core includes logic to apply further blend instructions to contents of the interim vector registers to cause further corresponding indexed elements from the plurality of structures to be loaded into respective source vector registers. In combination with any of the above embodiments, the core further includes logic to execute the instruction upon one or more source vector registers upon completion of conversion of source data to strided data. In combination with any of the above embodiments, the core further includes a logic to perform permute operations upon each respective source vector register to rearrange contents to match an original relative order in the source data. In combination with any of the above embodiments, each source vector register is to include a missing element from the source data. In combination with any of the above embodiments, the core further includes logic to perform a load for each source vector register from the source data to provide the missing element. In combination with any of the above embodiments, the strided data is to include eight registers of vectors, each vector to include five elements that correspond with the other vectors. In combination with any of the above embodiments, eleven blend operations are to be applied to contents of the preliminary vector registers and the interim vector registers to yield contents of the respective source vector registers. In combination with any of the above embodiments, the strided data is to include eight registers of vectors, each vector to include five elements that correspond with the other vectors. In combination with any of the above embodiments, fifteen blend operations are to be applied to contents of the preliminary vector registers and the interim vector registers to yield contents of the respective source vector registers. In combination with any of the above embodiments, the strided data is to include eight registers of vectors, each vector to include five elements that correspond with the other vectors, fifteen blend operations are to be applied to contents of the preliminary vector registers and the interim vector registers to yield contents of the respective source vector registers, and three masks are to be used in application of the fifteen blend operations to yield contents of the source vector registers.

Some embodiments of the present disclosure include a system. The system may include a front end to receive an instruction, a decoder to decode the instruction, a core to execute the instruction, and a retirement unit to retire the instruction. The system may include logic to determine that the instruction will require strided data converted from source data in memory. In combination with any of the above embodiments, the strided data is to include corresponding indexed elements from a plurality of structures in the source data to be loaded into a same register to be used to execute the instruction. In combination with any of the above embodiments, the core includes logic to load source data into a plurality of preliminary vector registers. In combination with any of the above embodiments, the source data is to be unaligned as resident in the vector registers. In combination with any of the above embodiments, the core includes logic to apply blend instructions to contents of the preliminary vector registers to cause corresponding indexed elements from the plurality of structures to be loaded into respective interim vector registers. In combination with any of the above embodiments, the core includes logic to apply further blend instructions to contents of the interim vector registers to cause further corresponding indexed elements from the plurality of structures to be loaded into respective source vector registers. In combination with any of the above embodiments, the core further includes logic to execute the instruction upon one or more source vector registers upon completion of conversion of source data to strided data. In combination with any of the above embodiments, the core further includes a logic to perform permute operations upon each respective source vector register to rearrange contents to match an original relative order in the source data. In combination with any of the above embodiments, each source vector register is to include a missing element from the source data. In combination with any of the above embodiments, the core further includes logic to perform a load for each source vector register from the source data to provide the missing element. In combination with any of the above embodiments, the strided data is to include eight registers of vectors, each vector to include five elements that correspond with the other vectors. In combination with any of the above embodiments, eleven blend operations are to be applied to contents of the preliminary vector registers and the interim vector registers to yield contents of the respective source vector registers. In combination with any of the above embodiments, the strided data is to include eight registers of vectors, each vector to include five elements that correspond with the other vectors. In combination with any of the above embodiments, fifteen blend operations are to be applied to contents of the preliminary vector registers and the interim vector registers to yield contents of the respective source vector registers. In combination with any of the above embodiments, the strided data is to include eight registers of vectors, each vector to include five elements that correspond with the other vectors, fifteen blend operations are to be applied to contents of the preliminary vector registers and the interim vector registers to yield contents of the respective source vector registers, and three masks are to be used in application of the fifteen blend operations to yield contents of the source vector registers.

Embodiments of the present disclosure may include an apparatus. The apparatus may include means for receiving an instruction, decoding the instruction, and retiring the instruction. The apparatus may include means for determining that the instruction will require strided data converted from source data in memory. In combination with any of the above embodiments, the strided data is to include corresponding indexed elements from a plurality of structures in the source data to be loaded into a same register to be used to execute the instruction. In combination with any of the above embodiments, the apparatus includes means for loading source data into a plurality of preliminary vector registers, the source data to be unaligned as resident in the vector registers. In combination with any of the above embodiments, the apparatus includes means for applying blend instructions to contents of the preliminary vector registers to cause corresponding indexed elements from the plurality of structures to be loaded into respective interim vector registers. In combination with any of the above embodiments, the apparatus includes means for applying further blend instructions to contents of the interim vector registers to cause further corresponding indexed elements from the plurality of structures to be loaded into respective source vector registers. In combination with any of the above embodiments, the apparatus includes means for executing the instruction upon one or more source vector registers upon completion of conversion of source data to strided data. In combination with any of the above embodiments, the apparatus includes means for performing permute operations upon each respective source vector register to rearrange contents to match an original relative order in the source data. In combination with any of the above embodiments, the apparatus includes means for applying further blend instructions, each source vector register to include a missing element from the source data. In combination with any of the above embodiments, the method further includes performing a load for each source vector register from the source data to provide the missing element. In combination with any of the above embodiments, the strided data includes eight registers of vectors and each vector to include five elements that correspond with the other vectors. In combination with any of the above embodiments, the apparatus includes means for performing eleven blend operations to contents of the preliminary vector registers and the interim vector registers to yield contents of the respective source vector registers. In combination with any of the above embodiments, the strided data is to include eight registers of vectors, each vector to include five elements that correspond with the other vectors, and the apparatus includes means for performing fifteen blend operations to contents of the preliminary vector registers and the interim vector registers to yield contents of the respective source vector registers. In combination with any of the above embodiments, the strided data is to include eight registers of vectors, each vector to include five elements that correspond with the other vectors, the apparatus includes means for performing fifteen blend operations to contents of the preliminary vector registers and the interim vector registers to yield contents of the respective source vector registers, and the apparatus includes means for applying three masks to be used in application of the fifteen blend operations to yield contents of the source vector registers.

Embodiments of the present disclosure may include a method operating within a processor. The apparatus may include means for receiving an instruction, decoding the instruction, and retiring the instruction. The apparatus may include means for determining that the instruction will require strided data converted from source data in memory. In combination with any of the above embodiments, the strided data is to include corresponding indexed elements from a plurality of structures in the source data to be loaded into a same register to be used to execute the instruction. In combination with any of the above embodiments, the method includes loading source data into a plurality of preliminary vector registers, the source data to be unaligned as resident in the vector registers. In combination with any of the above embodiments, the method includes applying blend instructions to contents of the preliminary vector registers to cause corresponding indexed elements from the plurality of structures to be loaded into respective interim vector registers. In combination with any of the above embodiments, the method includes applying further blend instructions to contents of the interim vector registers to cause further corresponding indexed elements from the plurality of structures to be loaded into respective source vector registers. In combination with any of the above embodiments, the method includes executing the instruction upon one or more source vector registers upon completion of conversion of source data to strided data. In combination with any of the above embodiments, the method includes performing permute operations upon each respective source vector register to rearrange contents to match an original relative order in the source data. In combination with any of the above embodiments, the method includes applying further blend instructions, each source vector register to include a missing element from the source data. In combination with any of the above embodiments, the method further includes performing a load for each source vector register from the source data to provide the missing element. In combination with any of the above embodiments, the strided data includes eight registers of vectors and each vector to include five elements that correspond with the other vectors. In combination with any of the above embodiments, the method includes performing eleven blend operations to contents of the preliminary vector registers and the interim vector registers to yield contents of the respective source vector registers. In combination with any of the above embodiments, the strided data is to include eight registers of vectors, each vector to include five elements that correspond with the other vectors, and the method includes performing fifteen blend operations to contents of the preliminary vector registers and the interim vector registers to yield contents of the respective source vector registers. In combination with any of the above embodiments, the strided data is to include eight registers of vectors, each vector to include five elements that correspond with the other vectors, the method includes performing fifteen blend operations to contents of the preliminary vector registers and the interim vector registers to yield contents of the respective source vector registers, and the method includes applying three masks to be used in application of the fifteen blend operations to yield contents of the source vector registers.

What is claimed is:

1. A processor, comprising:

a front end to receive an instruction;

a decoder to decode the instruction;

a core to execute the instruction, including circuitry to:

determine that the instruction will require strided data converted from source data in memory, the strided data to include corresponding indexed elements from a plurality of structures in the source data to be loaded into a same register to be used to execute the instruction;

load source data into a plurality of preliminary vector registers, the source data to be unaligned as resident in the vector registers;

apply blend instructions to contents of the preliminary vector registers to cause corresponding indexed elements from the plurality of structures to be loaded into respective interim vector registers; and apply further blend instructions to contents of the interim vector registers to cause further corresponding indexed elements from the plurality of structures to be loaded into respective source vector registers; and a retirement unit to retire the instruction.

2. The processor of claim 1, wherein the core includes circuitry to execute the instruction upon one or more source vector registers upon completion of conversion of source data to strided data.

3. The processor of claim 1, wherein the core includes circuitry to perform permute operations upon each respective source vector register to rearrange contents to match an original relative order in the source data.

4. The processor of claim 1, wherein:

after applying the further blend instructions, each source vector register is to include a missing element from the source data; and the core includes circuitry to perform a load for each source vector register from the source data to provide the missing element.

5. The processor of claim 1, wherein:

the strided data is to include eight registers of vectors, each vector to include five elements that correspond with the other vectors; and eleven blend operations are to be applied to contents of the preliminary vector registers and the interim vector registers to yield contents of the respective source vector registers.

6. The processor of claim 1, wherein:

the strided data is to include eight registers of vectors, each vector to include five elements that correspond with the other vectors; and fifteen blend operations are to be applied to contents of the preliminary vector registers and the interim vector registers to yield contents of the respective source vector registers.

7. The processor of claim 1, wherein:

the strided data is to include eight registers of vectors, each vector to include five elements that correspond with the other vectors;

fifteen blend operations are to be applied to contents of the preliminary vector registers and the interim vector registers to yield contents of the respective source vector registers; and three masks are to be used in application of the fifteen blend operations to yield contents of the source vector registers.

8. A system, comprising:

a processor core to execute an instruction, including circuitry to:

determine that the instruction will require strided data converted from source data in memory, the strided data to include corresponding indexed elements from a plurality of structures in the source data to be loaded into a same register to be used to execute the instruction;

load source data into a plurality of preliminary vector registers, the source data to be unaligned as resident in the vector registers;

apply blend instructions to contents of the preliminary vector registers to cause corresponding indexed elements from the plurality of structures to be loaded into respective interim vector registers; and apply further blend instructions to contents of the interim vector registers to cause further corresponding indexed elements from the plurality of structures to be loaded into respective source vector registers; and a retirement unit to retire the instruction.

9. The system of claim 8, wherein the core includes circuitry to execute the instruction upon one or more source vector registers upon completion of conversion of source data to strided data.

10. The system of claim 8, wherein the core includes a circuitry to perform permute operations upon each respective source vector register to rearrange contents to match an original relative order in the source data.

11. The system of claim 8, wherein:

after applying the further blend instructions, each source vector register is to include a missing element from the source data; and the core includes circuitry to perform a load for each source vector register from the source data to provide the missing element.

12. The system of claim 8, wherein:

the strided data is to include eight registers of vectors, each vector to include five elements that correspond with the other vectors; and eleven blend operations are to be applied to contents of the preliminary vector registers and the interim vector registers to yield contents of the respective source vector registers.

13. The system of claim 8, wherein:

the strided data is to include eight registers of vectors, each vector to include five elements that correspond with the other vectors; and fifteen blend operations are to be applied to contents of the preliminary vector registers and the interim vector registers to yield contents of the respective source vector registers.

14. The system of claim 8, wherein:

the strided data is to include eight registers of vectors, each vector to include five elements that correspond with the other vectors;

fifteen blend operations are to be applied to contents of the preliminary vector registers and the interim vector registers to yield contents of the respective source vector registers; and three masks are to be used in application of the fifteen blend operations to yield contents of the source vector registers.

15. A method comprising, within a processor:

receiving an instruction;

decoding the instruction;

determining that the instruction will require strided data converted from source data in memory, the strided data to include corresponding indexed elements from a plurality of structures in the source data to be loaded into a same register to be used to execute the instruction;

loading source data into a plurality of preliminary vector registers, the source data to be unaligned as resident in the vector registers;

applying blend instructions to contents of the preliminary vector registers to cause corresponding indexed elements from the plurality of structures to be loaded into respective interim vector registers;

applying further blend instructions to contents of the interim vector registers to cause further corresponding indexed elements from the plurality of structures to be loaded into respective source vector registers; and retiring the instruction.

16. The method of claim 15, further comprising executing the instruction upon one or more source vector registers upon completion of conversion of source data to strided data.

17. The method of claim 15, further comprising performing permute operations upon each respective source vector register to rearrange contents to match an original relative order in the source data.

18. The method of claim 15, wherein:

when applying further blend instructions, each source vector register includes a missing element from the source data; and the method further includes performing a load for each source vector register from the source data to provide the missing element.

19. The method of claim 15, wherein:

the strided data includes eight registers of vectors, each vector including five elements that correspond with the other vectors; and the method includes performing eleven blend operations to contents of the preliminary vector registers and the interim vector registers to yield contents of the respective source vector registers.

20. The method of claim 15, wherein:

the strided data includes eight registers of vectors, each vector including five elements that correspond with the other vectors; and the method includes performing fifteen blend operations to contents of the preliminary vector registers and the interim vector registers to yield contents of the respective source vector registers.

* * * * *